US007698308B2

(12) United States Patent
Kan et al.

(10) Patent No.: US 7,698,308 B2
(45) Date of Patent: Apr. 13, 2010

(54) STORAGE SYSTEM AND METHOD FOR DATA REPLICATION WITH REDUCED REDUNDANT DATA TRANSFER

(75) Inventors: Masaki Kan, Tokyo (JP); Jun-ichi Yamato, Tokyo (JP)

(73) Assignee: NEC Corporation, Tokyo (JP)

( * ) Notice: Subject to any disclaimer, the term of this patent is extended or adjusted under 35 U.S.C. 154(b) by 206 days.

(21) Appl. No.: 11/282,049

(22) Filed: Nov. 17, 2005

(65) Prior Publication Data
US 2006/0112149 A1 May 25, 2006

(30) Foreign Application Priority Data
Nov. 19, 2004 (JP) ............... 2004-336180

(51) Int. Cl.
G06F 12/00 (2006.01)
(52) U.S. Cl. .................. 707/201; 709/213; 709/230; 711/162
(58) Field of Classification Search ............ 707/201, 707/204; 709/213, 230; 711/162
See application file for complete search history.

(56) References Cited

U.S. PATENT DOCUMENTS

| 5,403,639 | A  | * | 4/1995 | Belsan et al. ............... 707/204 |
| 5,857,208 | A  | * | 1/1999 | Ofek .......................... 707/204 |
| 6,035,412 | A  | * | 3/2000 | Tamer et al. ................ 707/204 |
| 6,275,953 | B1 | * | 8/2001 | Vahalia et al. ................ 714/11 |
| 6,526,418 | B1 | * | 2/2003 | Midgley et al. ............. 707/204 |
| 6,549,920 | B1 |   | 4/2003 | Obara et al. |
| 7,058,731 | B2 | * | 6/2006 | Kodama ........................ 710/5 |
| 2004/0139128 | A1 | * | 7/2004 | Becker et al. ............... 707/204 |
| 2005/0125609 | A1 | * | 6/2005 | Satoyama et al. ........... 711/114 |
| 2005/0235016 | A1 | * | 10/2005 | Amano et al. ............... 707/204 |

FOREIGN PATENT DOCUMENTS

| JP | P2000-347917 A | 12/2000 |
| JP | P2003-085017 A | 3/2003 |
| JP | P2003-167684 A | 6/2003 |
| JP | P2003-323328 A | 11/2003 |

OTHER PUBLICATIONS

EMC Corporation, EMC SRDF, SRDF/A [Online] (Retrieved on Jul. 28, 2004, Internet <URL http://japan.emc.com/local/ja/jp/products/networking/srdf.jsp>.
Oracle, Oracle Data Guard 10G White Paper [Online] [Jul. 28, 2004] Internet <URL: http://otn.oracle.co.jp/cgi-bin/otn/auth_r.cgi?path=/download/products/database/oracle10g/pdf/twp_ha_dataguardoverview_10gr1_1103pdf>.

* cited by examiner

Primary Examiner—Hosain T Alam
Assistant Examiner—Jieying Tang
(74) Attorney, Agent, or Firm—Scully, Scott, Murphy & Presser, P.C.

(57) ABSTRACT

As in a normal storage system, an application run on a host issues a data write command or a data read command. A monitor unit monitors the host and a command issued by the host to detect a re-startable point to issue the re-startable point notification to a source storage system. Using the re-startable point as a momentum, the source storage system converts a command stored in a buffering unit into a command for transfer in which redundant data transfer has been curtailed to transfer the command for transfer to a destination storage system. The destination storage system applies the received command to a storage unit. At this time, the command for transfer is restored to an ordinary command which is applied.

14 Claims, 52 Drawing Sheets

POINTER TO DATA A

BUFFERING UNIT 24

BUFFERING UNIT 24

FIG . 18

| COMMAND X | ADDRESS A | ADDRESS B | ADDRESS C | ADDRESS D | ADDRESS E | ADDRESS F | ADDRESS G | ADDRESS H |
|---|---|---|---|---|---|---|---|---|

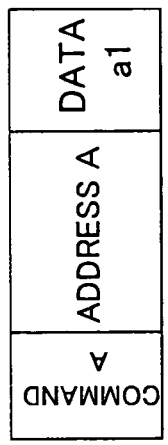
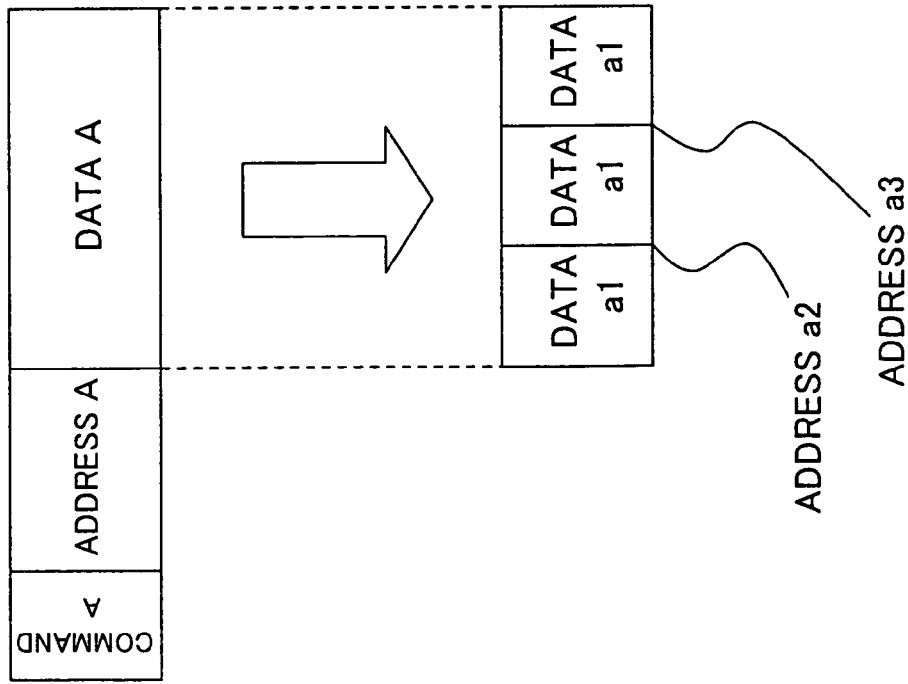

ORIGINAL COMMAND

COMMAND FOR TRANSFER

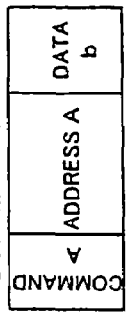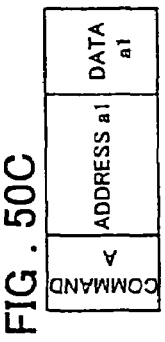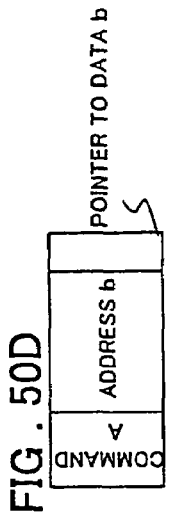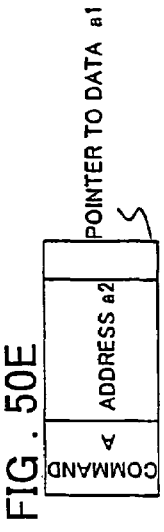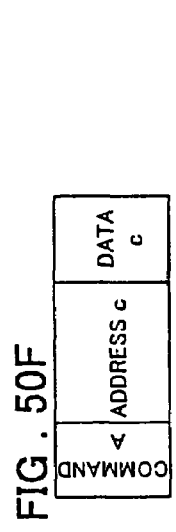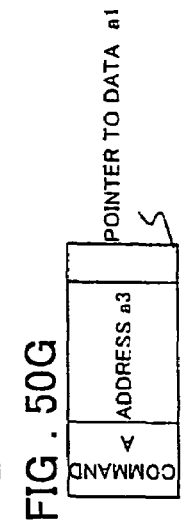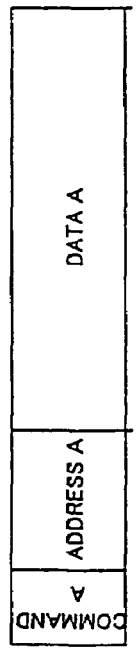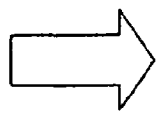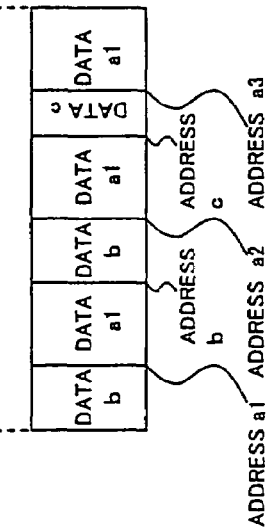

FIG. 51A ORIGINAL COMMAND
FIG. 51B COMMAND FOR TRANSFER

CONTROL INFORMATION : LOGICAL DISC NUMBER, LOGICAL BLOCK ADDRESS AND DATA LENGTH

STORAGE SYSTEM AND METHOD FOR DATA REPLICATION WITH REDUCED REDUNDANT DATA TRANSFER

FIELD OF THE INVENTION

This invention relates to a system for carrying out replication, a method for carrying out replication and a computer program for controlling replication. More particularly, it relates to a replication system, a replication method and a computer program for replication which may be convenient for reducing the amount of redundant data transfer.

BACKGROUND OF THE INVENTION

There has so far been used a computer system provided with a normal or operating site and a standby site for maintaining the system function even on outbreak of disasters. Such computer system is termed a replication system. During normal operation time, the normal site is performing operation for providing system functions and, in case the normal system is unable to operate as regularly, the standby site comes into operation to take the place of the normal site.

For providing the functions as the computer system, the operating site and the standby site have respective storage systems for storing data. In the replication system, data in the storage system of the operating site is replicated and retained in the storage system of the standby site, such that the standby site may come into operation to take the place of the operating site (for example, see Patent Documents 1 and 2). This processing is termed the 'replication'.

In the replication system, the normal site and the standby site may be 'synchronized', in which case the replication is termed 'synchronous replication'. Or, the normal site and the standby site may be 'non-synchronized', in which case the replication is termed 'asynchronous replication'.

If, in the synchronous replication, there occurs Write in a storage device in the normal site, the same data is written in the storage device of the stand-by site, with the Write for the normal site acting as a trigger. In the asynchronous replication, WRITE in the storage device of the stand-by site is carried out subsequently, with the WRITE for the normal site then not acting as a trigger.

Among the methods currently known for decreasing the band of the network, there is a method in which only the data updated latest in the storage is transmitted as update data for the same block (Non-Patent Document 1). The amount of data traffic over a network may be reduced more than in case of complete data copying by transferring and copying only the difference ('gap') between the data stored in the normal system and that stored in the standby system. However, in these systems, the amount of data transfer may be decreased only when update has occurred for the same area during predetermined time duration. The amount of data transfer cannot be decreased for data update for physically or logically differing areas.

In a system for implementing the replication with a middleware layer, such as a database, there is known a method which resides in transferring a REDO log to create a data file in the standby site (Non-Patent Document 3). If replication is used even with this system, data not in need of being sent to the stand-by site do not have to be sent, thereby diminishing the amount of data transferred on the network. However, there arises the necessity for a computer capacity for running the middleware, software or software license in the stand-by site. In addition, there is a possibility that the application run on the normal site may be lowered in performance as a result of the middleware or the replication function in the middleware being run on the host. There is also presented a problem that the application being run has to be developed using the middleware, and hence the system has to be modified for newly introducing the middleware in mirroring a pre-existing system.

Meanwhile, as a prior-art publication, the Patent Document 1 shows a method and a system for reducing the amount of data transfer necessary for copying DB data to assure data matched as DB table of the destination of copy. It is stated that, with use of the log, data to be copied to a remote device may be buffered with the amount of information less than with buffering on a cache. However, with the method and the system disclosed in Patent Document 1, if data of the same contents are written in plural distinct locations, it becomes necessary to transmit data per se.

In Patent Document 2, there is disclosed a system in which a frame from a central processing unit is temporally stored in a header converting buffer in a master side disc apparatus and in which the header part of the frame is converted into a header part for a remote side disc apparatus, and the resulting frame is then transmitted.

In Patent Document 3, there is disclosed the configuration in which copying means in a concentrator in a disc array device of a primary site copies update data on a cache in a manner of sequentially packing the data in a transmitting buffer from the leading end, a transmitting means transfers the packing data of the storage buffer to a disc array device of a secondary site, and in which a receiving means in the disc array device of the secondary site copies update data in the packing data in a multiplexed form in the packing sequence. In this case, the update data are transmitted in their entirety.

In Patent Document 4, there is disclosed a system reducing the amount of communication in multiplexing a master file and a duplicated file. In this system, a master file read in from a master area is cached in a cache area, a changed data part in the cache area is transferred to an associated part in a master area, and the changed data part is multiplexed in the master area and in the cache area, while the non-changed data part is multiplexed in the master area and the copying area. Finally, the non-changed data part is transferred to the cache area and the duplicated data is integrated in the cache area to provide a duplicated area. It is sufficient to transfer data only to the master area at the time of preparation of the duplicated file, and hence the volume of communication may be reduced for multiplication.

[Non-Patent Document 1]
EMC Corporation, EMC SRDF, SRDF/A [ONLINE] (Retrieved on Jul. 28, 2004, Internet <URL http://japan.emc.com/local/ja/jp/products/networking/srdf.jsp>

[Non-Patent Document 2]
NEC Corporation, SYSTEM GLOBE REMOTE DATA REPLICATION [ONLINE] [Retrieved on Jul. 28, 2004], Internet <URL http://www.sw.nec.co.jp/products/istorage/product/software/rdr/index.s html>

[Non-Patent Document 3]
Oracle, ORACLE DATA GUARD 10G White Paper [ONLINE] [Jul. 28, 2004] Internet <URL: http://otn.oracle.co.jp/cgi-bin/otn/auth_r.cgi?path=/download/products/database/oracle10g/pdf/twp_ha_dataguardoverview__10gr1__1103.pdf>

[Patent Document 1]
JP Patent Kokai Publication No. JP-P2000-347917A
[Patent Document 2]
JP Patent Kokai Publication No. JP-P2003-085017A
[Patent Document 3]
JP Patent Kokai Publication No. JP-P2003-167684A

[Patent Document 4]
JP Patent Kokai Publication No. JP-P2003-323328A

SUMMARY OF THE DISCLOSURE

The conventional replication system has such problems described below.

A first problem is that there is needed a network having a thick band in the replication system. The reason is that, if, in a replication system, storage devices of the normal site and the stand-by site are duplicated over a network, the totality of changed data has to be transmitted over the network within a prescribed time interval for the storage device of the normal site and hence a band allowing for completion of transmission needs to be provided in the network even under a high update density.

A second problem is that, if the same contents of data are to be stored in different locations in a storage device, the same data has to be transmitted a number of times even though the contents of data to be saved are the same. The reason is that, even though the data of the same contents are written from the server to different locations in the storage device, a number of data write commands equal to the number of times of writing need to be issued, while the storage device, which has received the write command, has to process the commands separately to transfer the same data a number of times.

A third problem is that when data copy is carried out in a storage device which performs replication, the data also stored in a storage device of a backup site has to be transmitted over the network. The reason is that, in order to execute closed data copy in a storage device, the server has to issue a combination of commands, however, the storage device, which receives the combination of commands from the server, cannot recognize that the combination of commands indicates the closed copy of the data stored in the storage device and recognizes the combination of instructions as write processing to carry out the data transfer again.

A fourth problem is that, in order to realize a replication system which reduces the amount of data transfer, it is necessary to provide a storage device configured for implementing the system adapted to reduce the amount of data transfer. The reason is that, for interpreting and processing commands issued to the storage device, it is necessary to provide a scheme performing a unique processing on the storage device side.

A fifth problem is that the intention of the application run on a server cannot be comprehended by the storage device. The reason is that the commands the server is able to issue to the storage device are limited e.g. to write and read commands.

A sixth problem is that, in carrying out replication of a write command, afforded with data for restoration, such as parity for RAID5, the amount of data transfer is increased by an amount corresponding to the volume of the added data. The reason is that entire data of the write command, afforded with data for replication, has to be transferred to the storage system of the destination of replication.

A seventh problem is that, for converting the write command for reducing the amount of data transfer, for conversion to the write command for diminishing the amount of data transfer, it is necessary to analyze the pattern of the command issued by the server so that the storage device will recognize that a command capable of being converted into a command for transfer has been issued. The reason is that the command that can be issued by the server issues only a command for write and read-in to the storage device.

An eighth problem is that, when data has been transferred to the destination of replication at an optional momentum as determined by the storage device, the post-disaster processing by the application is not minimized, because the application run on the host is not apprized with which momentum data has been transferred to the destination of replication.

Accordingly, it is an object of the present invention to provide a system, a method and a computer program for enabling the band for data replication to be reduced.

It is another object of the present invention to provide a system, a method and a computer program in which it is sufficient to transmit the contents of write data only once if the contents of data stored in a storage device are the same but the contents are stored in different locations in the storage device.

It is a further object of the present invention to provide a system, a method and a computer program in which, in copying data in a closed manner in a storage device, it may be recognized that the impending processing is the processing of copying the data as stored by the storage device, and a command for carrying out the processing for copy is sent to make it possible to realize the processing of copying the data in a closed fashion in the destination storage device.

It is a further object of the present invention to provide a system, a method and a computer program in which a normal storage device may be used to enable the replication to be carried out with a reduced volume of data transferred on the network.

It is a further object of the present invention to provide a system, a method and a computer program in which it is only sufficient for a server to issue usual write or read-in commands to a storage device to diminish the amount of data transfer.

It is a further object of the present invention to provide a system, a method and a computer program in which the replication processing of a write command afforded with data for restoration, such as parity in RAID5, may be implemented by transmitting only the necessary minimum quantity of data for restoration in the destination of replication.

It is a further object of the present invention to provide a system, a method and a computer program in which command conversion may be made for diminishing the amount of data transfer without the necessity of analyzing the pattern of the command issued by the host.

It is a further object of the present invention to provide a system, a method and a computer program in which a server issues to a storage device a predetermined sequence of commands, such as processing for duplication in the storage device, and the storage device processes the command to implement the replication.

It is yet another object of the present invention to provide a system, a method and a computer program in which it is possible to retain data owned by the storage device of the destination of replication in a state which permits it to be readily exploited by the application run on the host.

The above and other objects are attained by a system in accordance with a first aspect of the present invention which includes means for converting one or a plurality of commands for being transferred for replication from a source of replication to a destination of replication into one or a plurality of commands for transfer of a form in which the total amount of data transfer for replication becomes less than the amount of data transfer when said one or plural commands are directly transmitted from said source of replication to said destination of replication; and means for transmitting the one or more commands for transfer resulting from the conversion from said source of replication to said destination of replication.

Preferably in the storage system according to a second aspect of the present invention, said destination of replication receives said command for transfer from said source of replication, converts said command for transfer into a command of a form for said destination of replication, and executes said command, and wherein, if said destination of replication is able to execute the command for transfer, said destination of replication directly executes said command for transfer without conversion.

Preferably in the storage system according to a third aspect of the present invention, if a command issued from a host to a storage of said source of replication is a plurality of write commands for writing the same data in a plurality of respective distinct areas, said source of replication converts said plurality of write commands into a sole command for transfer instructing writing the same data in a plurality of areas and transfers said sole command for transfer to said destination of replication.

Preferably in the storage system according to a fourth aspect of the present invention, if a command issued from a host to a storage of said source of replication is a plurality of write commands for writing the same data in a plurality of respective distinct areas, said source of replication converts said write commands into a plurality of commands for transfer, at least one of which is a command for transfer not transmitting real data.

Preferably in the storage system according to a fifth aspect of the present invention, said command for transfer not transmitting real data includes a pointer pointing to data.

Preferably in the storage system according to a 6-th aspect of the present invention, said command for transfer includes a command part, an address part and a data part or includes a command part and a pointer pointing to data.

Preferably in the storage system according to a 7-th aspect of present invention, said command for transfer does not include a command part and includes an address part and a data part or includes a pointer pointing to data.

Preferably in the storage system according to an 8-th aspect of present invention, said data part includes compressed data.

Preferably in the storage system according to a 9-th aspect of present invention, said source of replication includes a buffer for temporally storing commands accompanied by data transfer for replication issued by said host; and transfer processing is commenced when any of the conditions that the storage amount of said buffer has exceeded a preset value, a preset command pattern is detected in plural commands stored in said buffer, a combination of commands that may be converted into said command for transfer has arrived, a preset time has elapsed as from last transfer processing, and that last transfer processing has come to a close is met.

A storage system in accordance with a 10-th aspect of the present invention comprises:

a host;

a source of replication;

a destination of replication; and means for converting one or a plurality of commands for being transferred for replication from a source of replication to a destination of replication, into one or a plurality of commands for transfer of a form in which the total amount of data transfer for replication becomes less than the amount of data transfer when said one or plural commands are directly transmitted from said source of replication to said destination of replication, in place of directly transmitting said one or plural commands; wherein said host issues said one or plural commands for transfer, obtained on conversion, to said source of replication;

said one or plural commands for transfer are transmitted from said source of replication to said destination of replication; and wherein said source of replication and said destination of replication apply said one or plural commands for transfer, either directly or following restoration, to respective storage devices.

A storage system in accordance with an 11-th aspect of the present invention comprises:

a host;

a storage device for a source of replication;

a storage device for a destination of replication;

said host pre-defining a command for which software mirroring processing is to be carried out;

said host issuing said pre-defined command;

means for converting said command, issued by said host, into a command of a form executable by said storage device of said source of replication, for issuing said command form to said storage device of said source of replication, and for directly transferring the issued command to said destination of restoration; and means for receiving said command transferred, for converting said transferred command into a command of a form executable by said storage device of said destination of replication, and for issuing the executable command to said storage device of said destination of restoration.

A storage system in accordance with a 12-th aspect of the present invention comprises:

a host;

one or a plurality of storage units; and converting means receiving a command issued from said host, for converting, in copying data in said storage unit or copying data across said plural storage units, said command issued from said host into a command of a form in which data written by said copying are not transferred.

Preferably, in the storage system according to a 13-th aspect of the present invention, said converting means in said 12-th aspect recognizes, based on a pattern of plural commands issued from said host, that the processing as commanded is the copy processing.

Preferably, in the storage system according to a 14-th aspect of the present invention, data is read from an address in said storage unit and wherein the write processing generated by said copying processing is converted into a command for transferring a pointer to data as contents of a write command related to said write processing.

Preferably, in the storage system according to a 15-th aspect of the present invention, the unit area of storage as a destination of said copying processing is pre-specified.

Preferably, in the storage system according to a 16-th aspect of the present invention, said converting means exploits a system log of said host in recognizing said copying processing.

A storage system according to a 17-th aspect of the present invention, comprises:

a host;

one or a plurality of storage units;

said host pre-defining a command for copying data in said storage unit or across a plurality of said storage units and issuing said pre-defined command; and means for converting said command issued from said host into a command of a form executable by said one or more storage units.

A storage system according to an 18-th aspect of the present invention, comprises:
a host;
a storage device of a source of replication; and
a storage device of a destination of replication connected for communication to said storage device of the source of replication;
said storage device of the source of replication includes a buffering unit for temporally storing commands accompanied by data transfer for replication and issued from said host to said storage of the source of replication, and
a first command converting unit for converting the command stored in said buffering unit into a preset command for transfer suited to transfer;
said storage device of the source of replication transferring said command for transfer to said storage device of the destination of replication;
said storage device of the destination of replication including a second command converting unit for receiving said command for transfer transmitted from said storage device of the source of replication and for converting said command for transfer into a command executable by said storage device of the destination of replication.

Preferably, in the storage system according to a 19-th aspect of the present invention, said first command converting unit on detection from a set of commands stored in said buffering unit of a combination of commands for writing the same data in a plurality of locations converts the commands into a command for transfer of a form in which said same data need not be transmitted a plural number of times, said first command converting unit then transmitting said command for transfer to said storage device of the destination of replication, and
said second command converting unit converts said command for transfer into a command for execution and applies said command for execution to said storage device of the destination of replication.

Preferably, in the storage system according to a 20-th aspect of the present invention, said first command converting unit finds, from a set of commands stored in said buffering unit, a set of commands for writing data already present in said storage device of the source of replication, and converts said set of commands found into a command for transfer which implements a target command by exploiting data already present in the storage device of the source of replication; and
said second command converting unit converts said command for transfer into a command for execution and applies the command for execution to said storage device of the destination of replication.

A storage system according to a 21-th aspect of the present invention, comprises:
a host;
a storage device for a source of replication;
a storage device for a destination of replication;
a first command receiving/converting layer provided in association with a storage device of a source of replication; and
a second command receiving/converting layer provided in association with a storage device of a destination of replication;
said first command receiving/converting layer including a buffering unit for temporally storing commands issued from said host to said storage of the source of replication, and a first command converting unit for converting the command stored in said buffering unit into a command for transfer suited for transfer;
said second command receiving/converting layer including a second command converting unit for converting the command for transfer sent from said first command receiving/converting layer into a command executable by said storage device of the destination of replication.

Preferably, in the storage system according to a 22-th aspect of the present invention, said first command converting unit converts a write command, afforded with the redundancy information present in said buffering unit, into a command for transfer in which data restorable in said storage device of the destination of replication are deleted, said first command converting unit transferring the command for transfer, obtained on conversion, to said storage device of the destination of replication; and
said second command converting unit directly executes said command for transfer or converting said command for transfer to a write command; said second command converting unit applying said write command to said storage device of the destination of replication.

Preferably, in the storage system according to a 23-th aspect of the present invention, said host includes a command issuing unit for issuing a command to said storage device of the source of replication;
said first command converting unit monitors the system log information and detects whether or not the processing of reducing the amount of data transfer may be carried out in replication; said first command converting unit effecting conversion into a command for transfer based on the detected information.

Preferably, the storage system according to a 24-th aspect of the present invention, comprises
monitor means for monitoring the host and the storage device of said source of replication;
said monitor means monitoring the operation of said host or the command received by said storage device of the source of replication to recognize the re-startable time point to issue a notification of the re-startable time point.

Preferably, in the storage system according to a 25-th aspect of the present invention, said monitor means monitors a command issued by said host and received by said source of replication and issues a notification of the re-startable time point on detection of generation of a command for accessing a predetermined file or storage area.

Preferably, in the storage system according to a 26-th aspect of the present invention, said monitor means notifies the re-startable time point on detection of a command for generation of a write point in the journal log.

Preferably, in the storage system according to a 27-th aspect of the present invention, said monitor means monitors the process of said host and, in case time is the re-startable time point when a predetermined process has come into operation, issues a notification of the re-startable time point at such time point.

Preferably, the storage system according to a 28-th aspect of the present invention, further comprises
monitor means for monitoring the host and the storage device of said source of replication; wherein
transfer processing is carried out as said first command converting unit exploits, as an momentum for transfer, the notification of the re-startable time point issued on monitoring the command to said storage device issued by said host or the notification of the re-startable time point issued by said host.

Preferably, in the storage system according to a 29-th aspect of the present invention, said second command converting unit confirms receipt of all commands up to the notification of the re-startable time point; said second command converting unit re-arraying those commands exhibiting the relationship of interdependence in the order in which they were issued and subsequently applies them to said storage device of the destination of replication.

A storage system according to a 30-th aspect of the present invention, comprises:

a storage device of a source of replication;

a storage device of a destination of replication;

a host exploiting said storage device of the source of replication;

a first command receiving layer provided in association with said storage device of the source of replication; and a second command receiving layer provided in association with said storage device of the destination of replication; wherein said first command receiving layer includes a first command converting unit for converting a command received into a command that may be executed by said storage device of the source of replication;

said second command receiving layer includes a second command converting unit for converting a command for transfer into a command that may be executed by said storage device of the destination of replication;

said host issues a predefined command for decreasing the amount of data transfer to be smaller than with a usual command;

said first command converting unit converts said command for decreasing the amount of data transfer, issued by said host, into a command of a form executable by said storage device of the source of replication, and delivers the command resulting from the conversion to said storage device of the source of replication;

said command for reducing the amount of data transfer per se, issued by said host, is transferred to said storage device of the destination of replication; and wherein said second command converting unit converts said command for reducing the amount of data transfer, issued by said host, into a command of a form executable by said storage device of the destination of replication, and delivers the command resulting from the conversion to said storage device of the destination of replication.

A method for replication according to a 31-th aspect of the present invention, comprises the steps of converting one or a plurality of commands for being transferred for replication from a source of replication to a destination of replication, into one or a plurality of commands for transfer of a form in which the total amount of data transfer for replication becomes less than the amount of data transfer when said one or plural commands are directly transmitted from said source of replication to said destination of replication; and transmitting said one or plural commands for transfer, resulting from the conversion from said source of replication to said destination of replication, in place of directly transmitting said one or plural commands.

The method for replication according to a 32-th aspect of the present invention, wherein said destination of replication receives said command for transfer from said source of replication, converts said command for transfer into a command of a form for said destination of replication, and executes said command or, if said destination of replication is able to execute the command for transfer, said destination of replication directly executes said command for transfer.

Preferably, in the method according to a 33-th aspect of the present invention, if a command issued from said host to said storage device of the source of replication is a plurality of write commands for writing the same data in a plurality of respective distinct areas, said source of replication converts said write commands into a sole command for transfer instructing writing the same data in a plurality of areas, and transfers said command for transfer to said destination of replication.

Preferably, in the method according to a 34-th aspect of the present invention, said source of replication includes a buffer for temporally storing commands accompanied by data transfer for replication and issued by said host; and transfer processing is initiated when any of the conditions that the storage amount of said buffer has exceeded a preset value, a preset command pattern is detected in plural commands stored in said buffer, a combination of commands that may be converted into said command for transfer has arrived, a preset time has elapsed as from last transfer processing; and that last transfer processing has come to a close is met.

A method according to a 35-th aspect of the present invention, is a method of replication for a system comprising a host; a source of replication; a destination of replication; said method comprising the steps of:

converting one or a plurality of commands for being transferred for replication from a source of replication to a destination of replication, into one or a plurality of commands for transfer of a form in which the total amount of data transfer for replication becomes less than the amount of data transfer when said one or plural commands are directly transmitted from said source of replication to said destination of replication, in place of directly transmitting said one or plural commands;

said host issuing said one or plural commands for transfer, obtained on conversion, to said source of replication;

transmitting said one or plural commands for transfer from said source of replication to said destination of replication; and said source of replication and said destination of replication directly executing said one or plural commands for transfer or restoring said one or plural commands for transfer and applying said one or plural commands restored to respective storage devices.

A method according to a 36-th aspect of the present invention, is a method of replication for a system comprising a host;

a storage device for a source of replication; and a storage device for a destination of replication;

said method comprising the steps of said host pre-defining a command for which software mirroring processing is to be carried out;

said host issuing said pre-defined command;

converting said command, issued by said host, into a command of a form executable by said storage device of said source of replication, issuing said command, resulting from the conversion, to said storage device of said source of replication, and directly transferring the issued command to said destination of restoration; and receiving said command transferred, converting said transferred command into a command of a form executable by said storage device of said destination of replication, and issuing the executable command to said storage device of said destination of restoration.

A method for duplication according to a 37-th aspect of the present invention, comprises the steps of:

one or a plurality of storage units receiving a command issued from a host; and converting, in copying or mirroring data in said storage unit or across said storage units, the command issued from said host into at least one command of the form not transferring data written in said copying or mirroring.

Preferably, in the method for duplication according to a 38-th aspect of the present invention, given processing is recognized to be copying processing based on a pattern of plural commands issued from said host.

Preferably, in the method for duplication according to a 39-th aspect of the present invention, data is read out from an address of said storage unit and wherein write processing resulting from said copying or mirroring is converted into a command for transmitting a pointer of data corresponding to contents of a write command associated with said write processing.

Preferably, in the method for duplication according to a 40-th aspect of the present invention, the volume as a subject of processing of copying or mirroring is pre-specified.

Preferably, in the method for duplication according to a 41-th aspect of the present invention, in recognizing said processing of copying, a system log of said host is exploited.

Preferably, in the method for duplication according to a 42-th aspect of the present invention, a command for performing the write processing of copying or mirroring in said storage unit or across a plurality of said storage units is pre-defined in a host; said method comprising the steps of:

said host issuing said pre-defined command; and converting said command issued from said host into a command of a form executable by said one or more storage units and issuing the latter command to said storage unit or storage units.

A method according to a 43-th aspect of the present invention, is a method for replication for a storage system comprising a host;

a storage device of a source of replication; and a storage device of a destination of replication connected for communication to said storage device of the source of replication;

said method comprising a first step of said storage device of the source of replication temporally storing a command issued from said host to said storage device of the source of replication in a buffer;

a second step of converting the command stored in said buffer into a preset command for transfer suited to transfer;

a third step of said storage device of the source of replication transferring said command for transfer to said storage device of the destination of replication; and a fourth step of said storage device of the destination of replication receiving said command for transfer transmitted from said storage device of the source of replication and for converting said command for transfer into a command executable by said storage device of the destination of replication.

Preferably, in the method for duplication according to a 44-th aspect of the present invention, said second step on detection from a set of commands stored in said buffer of a combination of commands for writing the same data in a plurality of locations converts the commands into a command for transfer of a form in which said same data need not be transmitted a plural number of times, said second step then transmitting said command for transfer to said storage device of the destination of replication, and said fourth converts said command for transfer into a command for execution and applies said command for execution to said storage device of the destination of replication.

Preferably, in the method for duplication according to a 45-th aspect of the present invention, said second step detects, from a set of commands stored in said buffering unit, a set of commands for writing data already present in said storage device of the source of replication, and converts said set of commands found into a command for transfer which implements a target command by exploiting data already present in the storage device of the source of replication; and said fourth step converts said command for transfer into a command for execution and applies the command for execution to said storage device of the destination of replication.

A method according to a 46-th aspect of the present invention, is a method of replication for a system comprising a host;

a storage device for a source of replication; and a storage device for a destination of replication;

said method comprising:

a first step of a command receiving/converting layer provided in association with a storage device of a source of replication temporally storing a command issued from said host to said storage device of the source of replication in a buffer;

a second step of said first command receiving/converting layer converting a command stored in said buffer into a command for transfer suited to transfer:

a third step of transferring said command for transfer transmitted from said command receiving/converting layer to a second command receiving/converting layer provided in association with said device of the destination of replication; and a fourth step of said second command receiving/converting layer converting the command for transfer transmitted from said first command receiving/converting layer into a command executable by said storage device of the destination of replication.

Preferably, in the method for duplication according to a 47-th aspect of the present invention, in said second step, a write command, afforded with the redundancy information present in said buffering unit, is converted into a command for transfer in which data restorable in said storage device of the destination of replication are deleted, and the command for transfer, obtained on conversion, is transferred to said storage device of the destination of replication; and, in said fourth step, said command for transfer is directly executed or restored to an original write command which is applied to said storage device of the destination of replication.

Preferably, in the method for duplication according to a 48-th aspect of the present invention, said host includes a command issuing unit for issuing a command to said storage device of the source of replication, and a storage unit; and said second step monitors the system log information written in said storage unit of said host or in said storage unit of said storage device of said destination of replication and detects whether or not the processing of reducing the amount of data transfer may be carried out; said second step effecting conversion into a command for transfer based on the detected information.

Preferably, in the method for duplication according to a 49-th aspect of the present invention, transfer processing is carried out as the notification of the re-startable time point issued by monitor means monitoring the host and the storage device of said source of replication, as said monitor means monitors a command issued by said host to said storage device, or the notification of the re-startable time point issued by said host, is used by said first command converting unit as an momentum for transfer.

Preferably, in the method for duplication according to a 50-th aspect of the present invention, said fourth step confirms receipt of all commands up to the notification of the re-startable time point; said fourth step re-arraying those commands exhibiting the relationship of interdependence in the order in which they were issued and subsequently applying them to said storage device of the destination of replication.

A method according to a 50-th aspect of the present invention, is a method of replication for a system comprising
a storage device of a source of replication;
a storage device of a destination of replication; and
a host exploiting said storage device of the source of replication;
said method comprising the steps of:
a first command receiving layer provided in association with said storage device of the source of replication converting a command received from said host into a command executable by said storage device of the source of replication; and
a second command receiving layer provided in association with said storage device of the destination of replication converting said command for transfer into a command executable by said storage device of the destination of replication;
said host issuing a storage device of a command for decreasing the amount of data transfer to be smaller than with a usual command;
said first command receiving layer converting said command for decreasing the amount of data transfer, issued by said host, into a command of a form executable by said storage device of the source of replication, and delivering the command resulting from the conversion to said storage device of the source of replication;
said first command receiving layer transferring said command for decreasing the amount of data transfer per se, issued by said host, to said storage device of the destination of replication; and
said second command receiving layer converting said command for reducing the amount of data transfer, issued by said host, into a command of a form executable by said storage device of the destination of replication, and delivering the command resulting from the conversion to said storage device of the destination of replication.

A computer program according to a 52-th aspect of the present invention is a program for causing a computer, constituting a system for replication from a source of replication to a destination of replication, to execute the processing of
converting one or a plurality of commands for being transferred for replication from said source of replication to said destination of replication, into one or a plurality of commands for transfer of a form in which the total amount of data transfer for replication becomes less than the amount of data transfer when said one or plural commands are directly transmitted from said source of replication to said destination of replication, in place of directly transmitting said one or plural commands; and
transmitting said one or plural commands for transfer resulting from the conversion from said source of replication to said destination of replication.

The program according to a 53-th aspect of the present invention is a program for causing said computer to execute the processing of said destination of replication receiving said command for transfer from said source of replication and executing said command per se, if said destination of replication is able to execute the command for transfer, or for causing said computer to execute the processing of said destination of replication converting said command for transfer into a command of a form for execution on said destination of replication, and the processing of said destination of replication executing the command resulting from the conversion.

The program according to a 54-th aspect of the present invention is a program for causing said computer to execute the processing in which, if a command issued from said host to said storage device of the source of replication is a plurality of write commands for writing the same data in a plurality of respective distinct areas, said source of replication converts said write commands into a sole command for transfer instructing writing the same data in a plurality of distinct areas, and transfers said command for transfer to said destination of replication.

In the program according to a 55-th aspect of the present invention, there is provided in said source of replication a buffer for temporally storing a command accompanied with a transfer by replication issued by said host; and
said program has said computer execute the processing of initiating transfer processing when any of the conditions that
the storage amount of said buffer has exceeded a preset value,
a preset command pattern is detected in plural commands stored in said buffer,
a combination of commands that may be converted into said command for transfer has arrived,
a preset time has elapsed as from last transfer processing, and that
last transfer processing has come to a close is met.

A computer program according to a 56-th aspect of the present invention, is a program for causing a computer, constituting a system comprising
a storage device of a source of replication, and
a storage device of a destination of replication, to execute the processing of
converting one or a plurality of commands for being transferred for replication from a source of replication to a destination of replication, into one or a plurality of commands for transfer of a form in which the total amount of data transfer for replication becomes less than the amount of data transfer when said one or plural commands are directly transmitted from said source of replication to said destination of replication, in place of directly transmitting said one or plural commands;
issuing said one or plural commands for transfer, obtained on conversion, to said source of replication;
transmitting said one or plural commands for transfer from said source of replication to said destination of replication; and
said source of replication and said destination of replication directly executing or restoring said one or plural commands for transfer obtained on conversion and applying them to respective storage devices.

A computer program according to a 57-th aspect of the present invention, is a program for causing a computer constituting a system comprising
a storage device for a source of replication; and
a storage device for a destination of replication;
to execute the processing of
pre-defining a command for which software mirroring processing is to be carried out;
issuing said pre-defined command;

converting said command, issued by said host, into a command of a form executable by said storage device of said source of replication, issuing said command, resulting from the conversion, to said storage device of said source of replication, and directly transferring the issued command to said destination of restoration; and receiving said command transferred, converting said transferred command into a command of a form executable by said storage device of the source of replication, and issuing the executable command to said storage device of said destination of restoration.

A computer program according to a 58-th aspect of the present invention is a program for causing a computer forming a storage system to execute the processing of receiving a command issued from a host; and converting, in copying data in a storage unit or across plural storage units, a command issued from said host into a command of a form not transferring data written in said copying.

The program according to a 59-th aspect of the present invention, is a program for causing said computer to recognize that given processing is copying processing, based on a pattern of plural commands issued from said host.

In the program according to a 60-th aspect of the present invention, data is read out from an address of said storage unit and wherein write processing resulting from said copying is converted into a command for transmitting a pointer of data corresponding to contents of a write command associated with said write processing.

In the program according to a 61-th aspect of the present invention, a recording unit as a subject of processing of copying or mirroring is pre-specified.

In the program according to a 62-th aspect of the present invention, in recognizing said processing of copying, a system log of said host is exploited.

A computer program according to a 63-th aspect of the present invention, is a program for causing a computer forming a storage system to execute the processing comprising the steps of:

pre-defining a command for performing the writing of copying data in said storage unit or across said storage units in a host;

said host issuing said pre-defined command; and converting said command issued from said host into a command of a form executable by said one or more storage units and issuing the latter command to said storage unit or storage units.

A computer program according to a 64-th aspect of the present invention, is a program for causing a computer, constituting a system comprising a storage device of a source of replication, and a storage device of a destination of replication connected for communication to said storage device of the source of replication, to execute the processing comprising a first step of said storage device of the source of replication temporally storing a command issued from said host to said storage device of the source of replication in a buffer;

a second step of converting the command stored in said buffer into a preset command for transfer suited to transfer;

a third step of said storage device of the source of replication transferring said command for transfer to said storage device of the destination of replication; and a fourth step of said storage device of the destination of replication receiving said command for transfer transmitted from said storage device of the source of replication and for converting said command for transfer into a command executable by said storage device of the destination of replication.

In the program according to a 65-th aspect of the present invention, said second step on detection from a set of commands stored in said buffer of a combination of commands for writing the same data in a plurality of locations converts the commands into a command for transfer of a form in which said same data need not be transmitted a plural number of times, said second step then transmitting said command for transfer to said storage device of the destination of replication, and said fourth step converts said command for transfer into a command for execution and applies said command for execution to said storage device of the destination of replication.

In the program according to a 66-th aspect of the present invention, said second step detects, from a set of commands stored in said buffering unit, a set of commands for writing data already present in said storage device of the source of replication, and converts said set of commands found into a command for transfer which implements a target command by exploiting data already present in the storage device of the source of replication; and said fourth step converts said command for transfer into a command for execution and applies the command for execution to said storage device of the destination of replication.

A computer program according to a 67-th aspect of the present invention, is a program for causing a computer constituting a system comprising a storage device for a source of replication; and a storage device for a destination of replication;

to execute the processing comprising a first step of a command receiving/converting layer provided in association with a storage device of a source of replication temporally storing a command issued from said host to said storage device of the source of replication in a buffer;

a second step of said first command receiving/converting layer converting a command stored in said buffer into a command for transfer suited to transfer:

a third step of transferring said command for transfer from said command receiving/converting layer to a second command receiving/converting layer provided in association with said storage device of the destination of replication; and a fourth step of said second command receiving/converting layer converting the command for transfer transmitted from said first command receiving/converting layer into a command executable by said storage device of the destination of replication.

In the program according to a 68-th aspect of the present invention, in said second step, a write command, afforded with the redundancy information present in said buffering unit, is converted into a command for transfer in which data restorable in said storage device of the destination of replication are deleted, and the command for transfer, obtained on conversion, is transferred to said storage device of the destination of replication; and in said fourth step, said command for transfer is directly executed or restored to an original write command which is applied to said storage device of the destination of replication.

In the program according to a 69-th aspect of the present invention, said second step monitors the system log information and detects whether or not the processing of reducing the amount of data transfer may be carried out; said second step effecting conversion into a command for transfer based on the detected information.

The program according to a 70-th aspect of the present invention, is a program for causing said computer to execute the processing of carrying out transfer processing as the notification of the re-startable time point issued by monitoring a command issued by a host to said storage device or the notification of the re-startable time point issued by said host is used by said first command converting unit as an momentum for transfer.

In the program according to a 71-th aspect of the present invention, said fourth step confirms receipt of all commands up to the notification of the re-startable time point; said fourth step re-arraying those commands exhibiting the relationship of interdependence in the order in which they were issued and subsequently applies them to said storage device of the destination of replication.

A computer program according to a 72-th aspect of the present invention, is a program for causing a computer constituting a system comprising a storage device of a source of replication;

a storage device of a destination of replication;

to execute the processing comprising the steps of a first command receiving layer, provided in association with said storage device of the source of replication, converting a command received from a host into a command executable by said storage device of the source of replication; and a second command receiving layer, provided in association with said storage device of the destination of replication, converting said command for transfer into a command executable by said storage device of the destination of replication;

said host issuing a predefined command for decreasing the amount of data transfer to be smaller than with a usual command;

said first command receiving layer converting said command for decreasing the amount of data transfer, issued by said host, into a command of a form executable by said storage device of the source of replication, and delivering the command resulting from the conversion to said storage device of the source of replication; and said first command receiving layer converting said command for reducing the amount of data transfer, issued by said host, into a command of a form executable by said storage device of the destination of replication, and delivering the command resulting from the conversion to said storage device of the destination of replication.

An information processing apparatus according to a 73-th aspect of the present invention, comprises:

means for receiving a plurality of write commands that store the same data in a plurality of addresses; and means for converting said plurality of write commands to a write command having a plurality of addresses and data in an operand.

An information processing apparatus according to a 74-th aspect of the present invention, comprises:

means for converting a write command for writing data in a storage unit into one or more write commands having a command for writing said data in a first address and one or more commands having a pointer to said data and an i'th address (i being an integer from 2 to N) in an operand in case said write command is a command for storing the same data in a plurality of addresses (N addresses).

An information processing apparatus according to a 75-th aspect of the present invention, comprises:

means for converting a read command for reading data from one address, in case the write command for writing said data in another address is received, into a command having an operand pointing to said data.

In the information processing apparatus according to a 76-th aspect of the present invention, said data is an immediate value data contained in a command or data separated from said command.

In a method for transferring data according to a 77-th aspect of the present invention, in transferring a plurality of commands for storing the same data in a plurality of addresses, from one node to the next, said commands are converted into a command containing said data and plural areas in an operand and the command resulting from the conversion is transmitted.

In the present invention, a storage system (2 of FIG. 1) as a source of replication and a storage system (4 of FIG. 1) as a destination of replication. The storage system of the source of replication includes a buffering unit (24 of FIG. 2) in which to store commands issued to the storage system and a converter into a command for transfer, also termed a transfer command converter (25 of FIG. 2) for converting the command stored in the buffering unit into a command suited to transfer. The storage system of the destination of replication includes a converter to a command for execution, also termed a transfer command converter (42 of FIG. 2), configured for carrying out the processing of converting the command for transfer into a command executable by the storage system.

In the above configuration, the transfer command converter detects, from a set of commands, stored in the buffering unit, a combination of commands for writing the same data in plural locations (FIGS. 8A and 8B), and converts the command set into a command for transfer in which it is unnecessary to send the same data a plural number of times (FIGS. 9 and 10).

The storage system of the source of replication transfers the command for transfer to the destination of replication where the converter to the command for execution converts the command for transfer into a command for execution to apply it to the storage system of the destination of replication.

This accomplishes the first, second and fifth objects of the present invention.

The system in a second aspect of the present invention includes a storage system (2 of FIG. 1) as a source of replication and a storage system (4 of FIG. 1) as a destination of replication. The storage system of the source of replication includes a buffering unit (24 of FIG. 2) in which commands issued to the storage system are temporally stored, and a transfer command converter (25 of FIG. 2) for converting the command stored in the buffering unit into a command suited to transfer. The storage system of the destination of replication includes a transfer command converter (42 of FIG. 2) for converting the command for transfer into a command executable by the storage system. In this configuration, the transfer command converter finds a set of commands for writing data already present in the storage system (FIGS. 14 and 15), from the set of commands stored in the buffering unit, and exploits the data already present in the storage system for conversion to a command for transfer for accomplishing the target command (FIGS. 17 and 18). An executable command converter in the storage system of the destination of replication converts the command for transfer into a command for execution (FIG. 19) to apply it to the storage system of the destination of replication. This accomplishes the first, second and fifth objects of the present invention.

The system in a third aspect of the present invention includes a storage system (2 of FIG. 32) as a source of replication, a storage system (4 of FIG. 32) as a destination of replication, and command receiving/converting layers (70, 80 of FIG. 32). The command receiving/converting layer of the source of replication includes a buffering unit (24 of FIG. 33)

in which to store commands issued to the storage system and a transfer command converter (25 of FIG. 33) for converting the command stored in the buffering unit into a command suited to transfer. The storage system of the destination of replication includes an executable command converter (42 of FIG. 33) for converting the command for transfer into a command executable by the storage system. The first to fifth objects of the present invention may be accomplished by the same sequence of operations as those of the first and second replication systems with the aid of this configuration.

The system in the fourth aspect of the present invention has the same configuration as that of the first to third replication systems. With this configuration, the transfer command converter converts the write command, afforded with the redundancy information, present in the buffering unit (FIG. 12), into a command for transfer (FIG. 13) in which data restorable in the destination of replication are deleted, and transmits the resulting command for transfer to the storage system of the destination of replication. This storage system restores the original write command from the command for transfer to carry out the processing for storage. This accomplished the first, fifth and sixth objects of the present invention.

The system in a fifth aspect of the present invention includes a storage system (2 of FIG. 1) as a source of replication, and a storage system (4 of FIG. 1) as a destination of replication. The storage system of the source of replication includes a buffering unit (24 of FIG. 16) in which commands issued to the storage system are temporally stored, a transfer command converter (25 of FIG. 16) for converting the command stored in the buffering unit into a command suited to transfer, and a storage unit (13 of FIG. 16) connected to the host 1. The storage system of the destination of replication includes an executable command converter (42 of FIG. 16) for converting the command for transfer into a command executable by the storage system. Using this configuration, the transfer command converter monitors the system log information written in the storage unit connected to the host 1 or in the storage unit of the storage system 2 to detect whether or not the processing for reducing the amount of data transfer is to be carried out. Using the resulting information, the transfer command converter converts the command into a command for transfer. This accomplishes the seventh object of the present invention.

The system in a six-th aspect of the present invention includes a storage system (2 of FIG. 1) as a source of replication, and a storage system (4 of FIG. 1) as a destination of replication. The storage system of the source of replication includes a buffering unit (24 of FIG. 23) in which commands issued to the storage system are temporally stored, a transfer command converter (25 of FIG. 23) for converting the command stored in the buffering unit into a command suited to transfer, and a storage unit (13 of FIG. 23) connected to the host 1. The storage system of the destination of replication includes a converter for converting the command for transfer into a command executable by the storage system (42 of FIG. 16). The system also includes a monitor means (7 of FIG. 23) for monitoring the host or the storage. Using this configuration, the transfer command converter proceeds to transfer processing, as the transfer command converter exploits the notification of the re-startable time point issued by the monitor means, monitoring the command issued by the host to the storage system, or the notification of the re-startable time point issued by the host, as an momentum for transfer. On receipt of commands up to the notification of the re-startable time point, the converter to an executable command 42 of the storage system of the destination of replication confirms receipt of the commands and re-arrays the commands exhibiting the relationship of interdependence in the sequence in which they were issued to proceed to the processing of storage in the storage system. This accomplishes the ninth object of the present invention.

The system in a nine-th aspect of the present invention includes a storage system (2 of FIG. 35) as a source of replication, a storage system (4 of FIG. 35) as a destination of replication, a host (1 of FIG. 35) exploiting the storage of the source of replication, and command receiving layers (51, 52 of FIG. 35). The command receiving layer of the source of replication includes a command converter for converting a received command into a command executable by the storage system (512 of FIG. 36), while the command receiving layer of the destination of replication includes an executable command converter for converting a command for transfer into a command executable by the storage system (522 of FIG. 36). With this configuration, the host 1 issues a pre-defined command for reducing the amount of data transfer to be smaller than with a usual command (FIGS. 37 and 38). The command executing unit of the source of replication converts the command into a command executable by the storage system (FIGS. 39 and 43) which is then delivered to the storage system. The command capable of reducing the amount of data transfer, issued by the host, is transferred as it is to the destination of replication, and the command converter of the destination of replication converts the command into a command of a form executable by the storage system and delivers the resulting command to the storage system of the destination of replication. This accomplishes the ninth object of the present invention.

In a further aspect, the present invention provides a method comprising the steps of converting one or a plurality of commands for being transferred for replication from a source of replication to a destination of replication, into one or a plurality of commands for transfer of a form in which the total amount of data transfer for replication becomes less than the amount of data transfer when the one or more commands are directly transmitted from the source of replication to the destination of replication, and transmitting the one or more commands for transfer resulting from the conversion from the source of replication to the destination of replication, in place of directly transmitting the one or more commands.

In a further aspect, the present invention provides a computer program for causing a computer, constituting a system for replication from a source of replication to a destination of replication, to execute the processing of converting one or a plurality of commands for being transferred for replication from a source of replication to a destination of replication, into one or a plurality of commands for transfer of a form in which the total amount of data transfer for replication becomes less than the amount of data transfer when the one or more commands are directly transmitted from the source of replication to the destination of replication, in place of directly transmitting the one or more commands, and transmitting the one or more commands for transfer resulting from the conversion from the source of replication to the destination of replication.

The meritorious effects of the present invention are summarized as follows.

The first meritorious effect of the present invention is that the amount of data transfer may be reduced in case of writing the data of the same contents in different locations. The reason is that data per se needs to be sent only once with the use of a command for writing the data of the same contents in plural locations.

The second meritorious effect of the present invention is that the amount of data transfer may be reduced in case of writing data retained by the storage system of the destination of replication in other location(s) of the storage system of the destination of replication.

The reason is that a command set for writing data already present in a storage system is converted into a command for copying data already present in the destination storage system to other location(s) in the destination storage system without transferring real data from the source storage system to the destination storage system.

The third meritorious effect of the present invention is that the band of the network required by the replication system may be reduced.

The third meritorious effect may be achieved by the first and second meritorious effects and by the seventh meritorious effect as later described.

The fourth meritorious effect of the present invention is that the number of times of data transfer may be reduced in case there are present plural commands of writing the data of the same contents in plural locations.

The reason is that plural write operations are converted into a sole command of writing the data of the same contents in plural locations and this sole write command is transferred.

The fifth meritorious effect of the present invention is that, in doing the replication, the amount of data transfer on the network may be decreased by exploiting the normal storage system.

The reason is that the first and second meritorious effects may be achieved by holding the command receiving/converting layer between the host and the storage system and by having the functions of the present invention by the command receiving/converting layer.

The sixth meritorious effect of the present invention is that the amount of data transfer on the network for replication may be reduced without modifying the application run on the server or without the necessity of developing the functions by a new application.

The reason is that there are provided a buffering unit for buffering unit for temporally storing the command storage of the command issued to the storage system and a transfer command converter for converting the command stored in the buffering unit into a command suited to the transfer, and a command for write or read-in, usually issued by a server, is converted into a command suited to transfer to achieve the first and second meritorious effects.

The seventh meritorious effect of the present invention is that the replication processing for a write command, afforded with data for restoration, such as parity in RAID5, may be achieved by transferring necessary minimum data for restoration by the storage system of the destination of replication.

The reason is that the write command, afforded with the information for restoration, is converted into a command for transfer, in which the data restorable in the destination of replication are deleted, and the resulting command for transfer is transmitted to the storage system of the destination of replication, which storage system restores the command for transfer to an original write command to apply the resulting command.

The eighth meritorious effect of the present invention is that the replication system may be such that the amount of data transfer may be reduced without the necessity of analyzing the pattern of the command issued by the server.

The reason is that, by monitoring the system log information, written in a storage unit connected to the host or in a storage unit of the storage system, it may be recognized whether or not the processing for reducing the amount of data transfer has been carried out, and conversion to the command for transfer is made using the corresponding information. The tenth meritorious effect, as later described, is also operating favorably.

The ninth meritorious effect of the present invention is that post-disaster processing may be minimized in a system of asynchronous replication.

The reason is that, since transfer is made with the re-startable time point, specified by the application, as an momentum, the data state in the storage system of the destination of replication becomes equal to that of the storage system of the source of replication at the re-startable time point, such that the processing to be carried out after disaster may be minimized by the application issuing the notification of the re-startable time point in a storage state which will minimize the post-disaster processing.

The tenth meritorious effect of the present invention is that the server issues a special command for reducing the amount of data transfer to be smaller than with a usual command, and that this special command is processed by the storage system in doing the replication.

The reason is that the server issues a pre-defined command which reduces the amount of data transfer to be smaller than with a normal command and that the command receiving layer between the host and the storage system converts the command into a command form executable by the storage system to deliver the resulting command to the storage system. It is the command per se issued by the host and which is capable of reducing the amount of data transfer that is transferred to the destination of replication. The command receiving layer of the destination of replication is converted into a command executable by the storage system to deliver the executable command to the storage system of the destination of replication.

The eleventh meritorious effect of the present invention is that the volume of processing in the storage system for diminishing the amount of data transfer may be reduced.

The reason is that, in comparing the commands for accomplishing the second effect, it is only sufficient to verify whether or not the data contents are coincident, and hence the processing volume may be smaller than with compression.

The twelfth meritorious effect of the present invention is that a replication system lower in the cost of the communication network may be achieved by introducing a server in which a pre-existing application may be run and the pre-existing storage system.

The reason is the same as that for the third and fifth meritorious effects.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 18 is a diagram for illustrating a command for transfer as converted from the command of FIG. 14, which command is distinct from that of FIGS. 17A-17D, in the second modification of the first embodiment of the present invention.

FIGS. 48A-48D are diagrams for illustrating another example of conversion to a command for transfer in the first embodiment of the present invention.

FIGS. 50A-50G are diagrams for illustrating a further example of conversion to a command for transfer in the first embodiment of the present invention.

FIGS. 51A-51D are diagrams for illustrating a further example of conversion to a command for transfer in the first embodiment of the present invention.

PREFERRED EMBODIMENTS OF THE INVENTION

Preferred embodiments of the present invention will now be described in detail with reference to the drawings.

Figure 1:
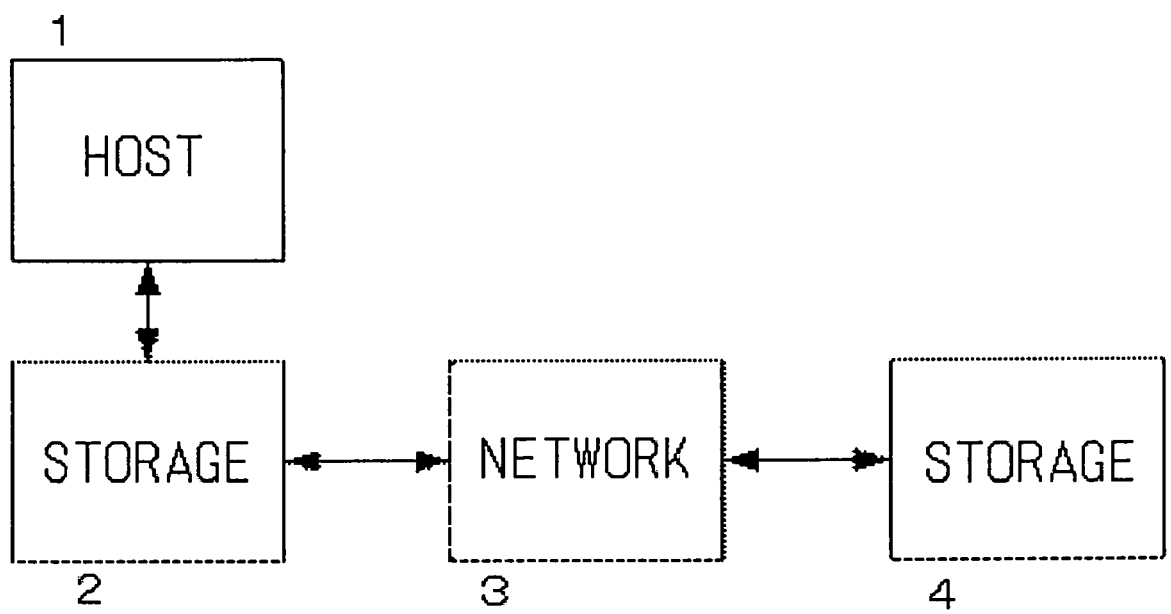
FIG. 1 is a block diagram showing the configuration of a first embodiment of the present invention.

A first embodiment of the present invention will be described. In the first embodiment of the present invention, a command is buffered in a storage system and converted into a command for transfer. FIG. 1 is a diagram showing the configuration of a replication system according to the first embodiment of the present invention. The replication system according to the first embodiment is a computer system which includes a host 1, a storage system 2, a network 3 and a storage system 4, and which provides services. The storage systems 2 and 4 are interconnected over the network 3.

The storage systems 2 and 4 respectively store data. As an example, the storage systems 2 and 4 may each includes a disc unit or a disc array device composed of plural disc units. Alternatively, the storages systems 2 and 4 may each include a magneto-optical storage device or an array of plural magneto-optical storage devices. Still alternatively, the storages systems 2 and 4 may each include the combination of these storage systems, for example, a system made up by an expensive disc array device, a relatively inexpensive disc array device and a tape library.

The host 1 is a computer on which an application, a middleware, such as a database and an operating system are executed for implementing services provided by the present computer system, and performs processing using the storage 2. Although the host 1 is shown in FIG. 1 as a sole computer, it may be composed by plural computers.

The storage 4 replicates and holds data of the storage system 2 to use the data as necessary. The storage system 2 stores data, created or used, by a computer program run on the host 1. The storage system 2 allows the replica of data, stored in the storage system 2, to be retained on the storage system 4.

The objective of creating the replica in the storage system 4 is e.g. to use the data as backup data for the storage system 4, for any reason whatsoever. For example, should any malfunction have occurred in the host 1 or the storage system 2, the services provided by the host 1 and the storage system 2 are supplied in succession even after the malfunction, using data retained by the storage system 4, with the aid of the host connected to the storage system 4 and of the storage system 4. This host may be the host 1, another host previously connected, or a host newly connected after the malfunction. The objective of creating the replica may also be to hold data of the storage system 2 at a past time point as backup in the storage system 4 or to use data of the storage system 2 as data of another application, such as data mining.

The network 3 is a communication network, such as the Internet or a dedicated line, and interconnects the storage systems 2 and 4.

The host 1 and the storage system 2 are similarly interconnected by a communication network. The communication network, used here, may, for example, be SCSI, fiber channel (FIBRE CHANNEL), ATA, S-ATA, Ethernet (ETHERNET, registered trademark), or INFINIBAND.

In FIG. 1, there are shown each one of the host 1, storage system 2 and the storage system 4. Alternatively, the number of these devices may be plural. For example, there may be two of the storage systems 4 as the destination of replication.

Figure 2:
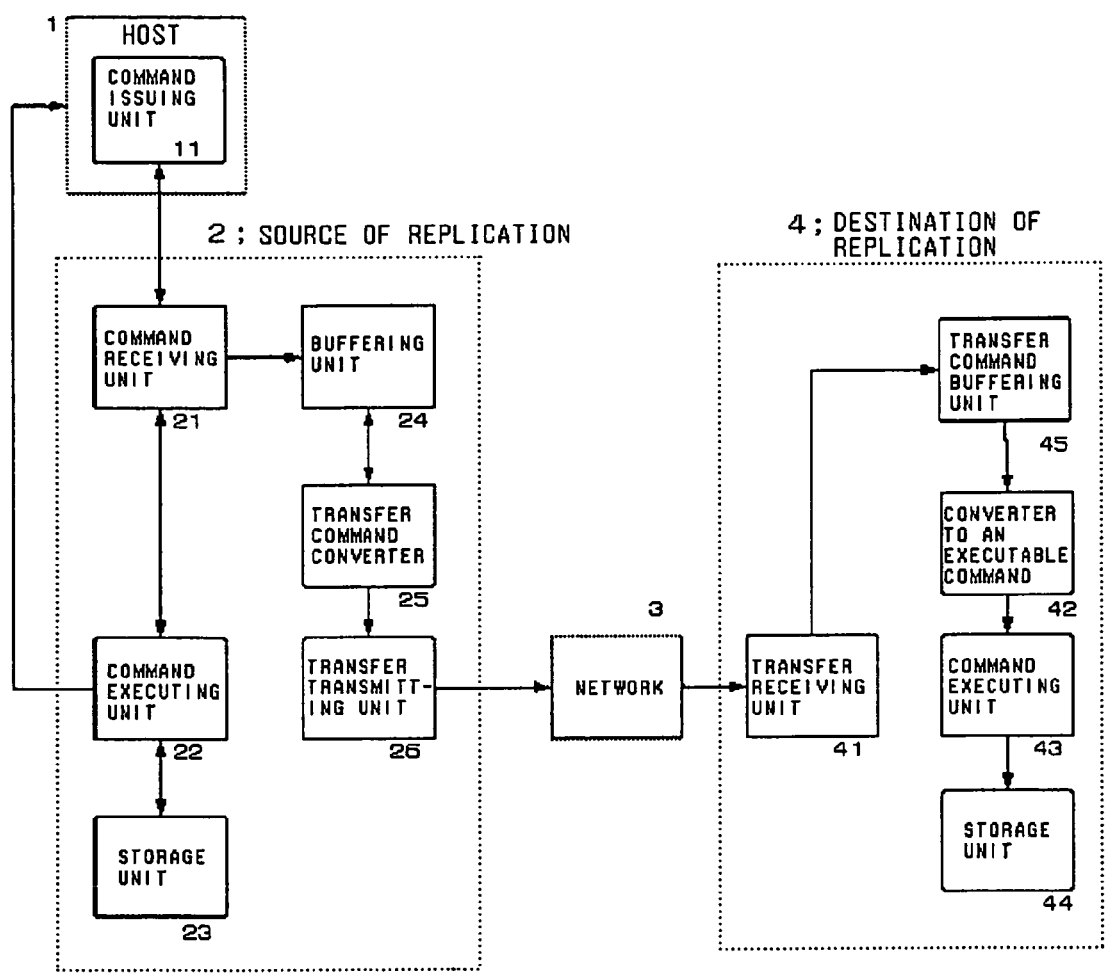
FIG. 2 is a block diagram showing the configuration of a host and storage systems in the first embodiment of the present invention.

FIG. 2 is a block diagram showing a detailed configuration of the host and the storage systems according to the first embodiment.

Referring to FIG. 2, the host 1 includes a command issuing unit 11. The command issuing unit 11 issues commands, such as READ or WRITE or other control commands, responsive to the request from an application, middleware, such as database, or an operating system, which run on the host 1.

The storage system 2 of the source of replication, also simply termed 'storage 2', includes a command receiving unit 21, a command executing unit 22, a storage unit 23, a buffering unit 24, a unit for conversion to a command for transfer, simply termed a transfer command converter 25, and a transfer transmitting unit 26. These units may be arranged as one as the storage system 2 or arranged distributed as separate units. The functions of these units may, of course, be implemented by the program of a computer forming the storage system 2.

A command receiving unit 21 receives commands issued by the command issuing unit 11.

The command executing unit 22 executes the commands, received by the command receiving unit 21, for the storage unit 23, and returns the result to the host 1 if necessary. For example, a WRITE command, issued by the command issuing unit 11, is received by the command receiving unit 21, and the command executing unit 22 applies the so received WRITE command to the storage unit 23. On completion of the command, the command executing unit 22 returns a notification of the completion to the host 1.

The buffering unit 23 which has the function of storing data is a storage medium for storing data retained by the storage system 2.

The buffering unit 24 is a storage medium for storing commands received by the command receiving unit 21.

The transfer command converter 25 converts the set of commands, temporally stored in the buffering unit 24, into a command for transfer, and delivers the converted command to the transfer transmitting unit 26. The commands may be converted by the transfer command converter 25 directly before transfer or may be converted at once and stored when a needed quantity of the commands has been accumulated in the buffering unit 24.

The transfer transmitting unit 26 has the function of transferring the command for transfer, received from the transfer command converter 25, to the storage system 4 as the destination of replication.

The storage system 4 as the destination of replication, referred to simply as 'storage 4', includes a transfer receiving unit 41, a unit for conversion to the received command to a executable command to the storage 4, referred to simply as a converter to an executable command 42, a command executing unit 22 and a storage unit 23. These units may be arranged as one or arranged distributed as separate units. The functions of these units may, of course, be implemented by the program of a computer forming the storage system 2. The same applies for modifications and other embodiments which will be described subsequently.

The transfer receiving unit 41 receives the command for transfer sent thereto from the transfer transmitting unit 26, and delivers the so received command for transfer to a transfer command buffering unit 45.

The converter to an executable command 42 takes out the received command for transfer from the transfer command buffering unit 45 and analyzes the command to convert the so analyzed command into a command for execution. The executable command for conversion may directly be the same as the command received by the storage system 2, a distinct command which may yield logically the same result, or may be a distinct command optimized for writing in the backup storage. The converter to an executable command 42 delivers the so converted command to a command executing unit 43. Meanwhile, if the command for transfer received is directly executable by the command executing unit 43, the conversion by the converter to an executable command 42 may be dispensed with.

The command executing unit 43 performs the function of receiving the command for execution and applying the so received command to the storage unit 44. The command executing unit 43 may be of the same configuration as that of the command executing unit 22 of the storage system 2.

Similarly to the storage unit 23 of the storage system 2, the storage unit 44 is a storage medium for storing data. The storage unit 44 performs the role similar to that of the storage unit 23 in the storage system 2, provided, however, that the storage unit 44 does not have to hold the physically completely same data as that of the storage unit 23 held by the storage system 2. For example, a storage system employing a disc less expensive than one owned by the storage system 2 may be adopted as the storage system 4.

The transfer command buffering unit 45 is a storage medium for temporally storing commands received by the transfer receiving unit 41.

Figure 3:
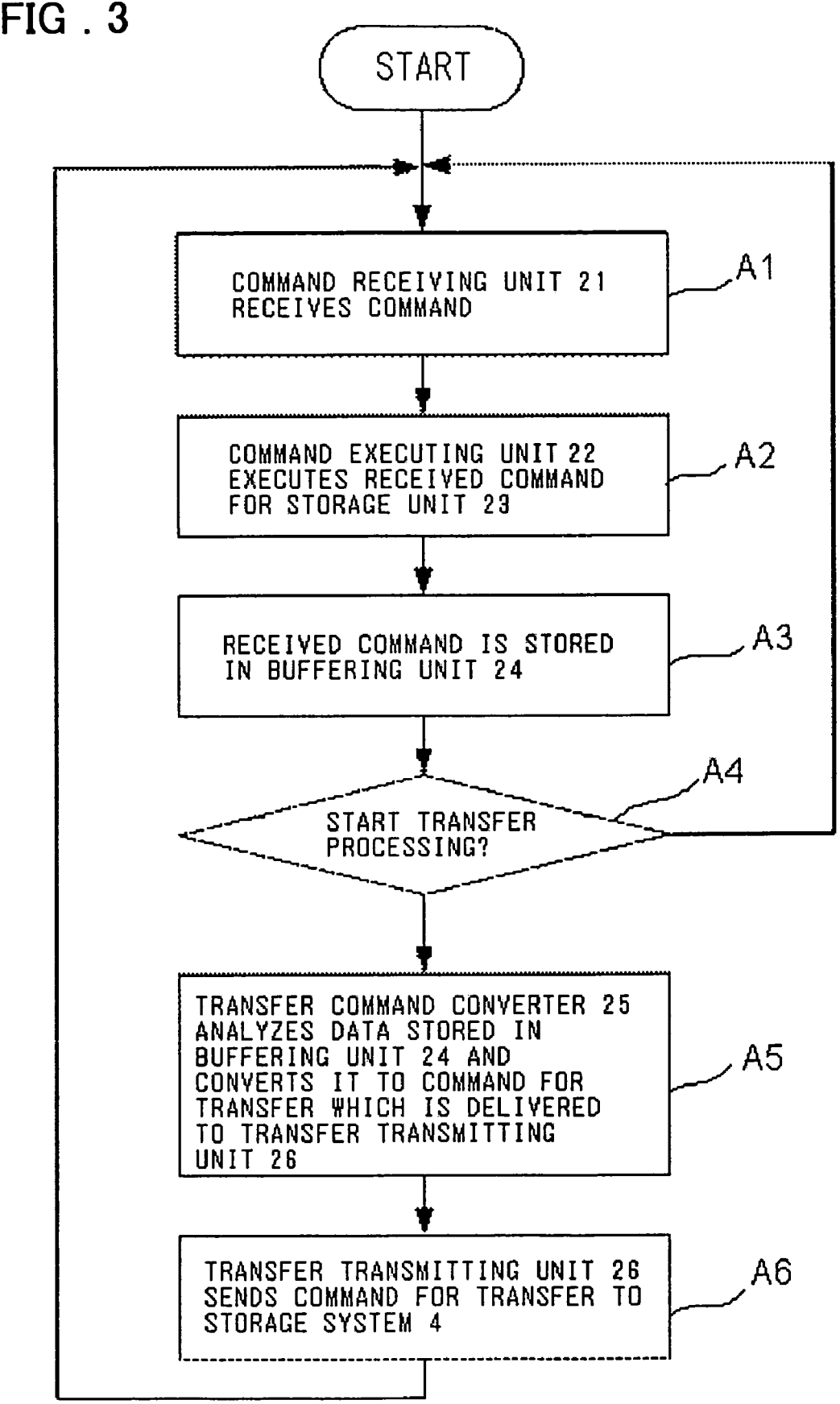
FIG. 3 is a flowchart for illustrating the operation of a storage system 2 in the first embodiment of the present invention.

FIG. 3 is a flowchart for illustrating the operation of the storage system 2, as the source of replication, in replication operation according to the first embodiment of the present invention. In the following exemplary operations, it is assumed that the command issuing unit 11 of the host 1 has issued a command to the storage system 2. The command herein means e.g. a command, such as READ, for reading data from the storage system 2, a command, such as WRITE, for writing data in the storage system 2, and a control command for performing various control operations for the storage system 2.

Initially, a command issued by the command issuing unit 11 of the host 1 is received by the command receiving unit 21 of the storage system 2 (step A1).

The command executing unit 22 of the storage system 2 executes the command, received by the command receiving unit 21, and returns the result of execution of the command to the host 1 as necessary. The result of execution of the command may be returned via the command receiving unit 21, or the command executing unit 22 may directly return the result to the host 1. For example, with the WRITE command, the contents of the WRITE command are written in the storage unit 23 and, on completion of the write operation, the completion of the Write command is notified to the host 1. In case of the READ command, the information of the relevant address is read from the storage unit 23 and the read data are returned to the host 1 (step A2).

The processing of returning the result to the host 1 may be carried out in the step A1 by the command receiving unit 21 having a cache.

After the step S92, the command received by the command receiving unit 21 is stored in the buffering unit 24 (step A3). The method for storage is arbitrary.

However, for assuring the update sequence for the storage unit 23 of the storage system 2, it is necessary to store or manage the sequence in which commands have arrived. Specifically, this may be accomplished by (a1) saving the commands in a processing queue by a FIFO (FIRST-IN FIRST-OUT), (a2) according an arrival number to each command, or by (a3) creating a table for discriminating commands by some or other method for controlling and managing the arrival sequence.

Alternatively, the totality of the commands may be saved in the buffering unit 24, or only specified commands, such as commands accompanied by write data such as WRITE or commands for a predetermined particular area, may be stored.

The reason for this is that it is only necessary to store commands that need to be transferred and the commands necessary for the transfer command converter 25 to make an analysis in a step A5 of FIG. 6 which will be described subsequently.

It is determined whether or not the conditions for staring the transfer is met (step A4).

The conditions for starting the processing for transfer may be arbitrary, such that the transfer processing may be stared when (b1) the transfer command converter 25 has detected that a quantity more than a preset quantity has been stored in the buffering unit 24, (b2) such an access pattern which will yield a high effect by conversion to a command for transfer has been detected, (b3) the combination of commands that may be converted into a command for transfer has arrived, (b4) a preset time interval has elapsed as from the last transfer processing, or when (b5) the last transfer processing has come to a close.

If the result of the decision step A4 is NO and the transfer processing has not commenced, processing waits for receipt by the command receiving unit 21 of a command from the host 1 again and, on receipt of the new command, processing returns to the step A1.

If the result of the step A4 indicates that the transfer processing is to be commenced, processing transfers to the next step. Here, the transfer command converter 25 analyzes data in the buffering unit 24, and the command stored in the buffering unit 24 is converted into a command for transfer with a conversion algorithm by the transfer command converter 25. The so converted command for transfer is delivered to the transfer transmitting unit 26. The conversion algorithm will be described later.

The transfer transmitting unit 26 transmits the transfer command, received from the transfer command converter 25, over the network 3 to the storage system 4 (step A6).

The command for transfer may be transmitted
(c1) immediately after receipt of the command for transfer from the transfer command converter 25, or
(c2) after storing for some time in the transfer transmitting unit 26.

Since there is no causality relationship between the step A2 and the steps A3-A6, processing of the step A3 may be carried out before the step A2, or the respective steps may be carried out by parallel operations simultaneously. Although the processing of returning the result to the host 1 is carried out in the step A2, this processing of returning the result may be carried out not after the end of the step A2 but at any arbitrary timing of any of the other steps. If, in particular, the processing for returning the result to the host 1 is carried out after the end of transfer of the command for transfer in the step A6, data transfer to the storage system 4 is assured, and hence the characteristic of synchronous replication is incorporated.

Consequently, freedom from data loss may be guaranteed in case malfunctions occur only in the storage system 2.

Figure 4:
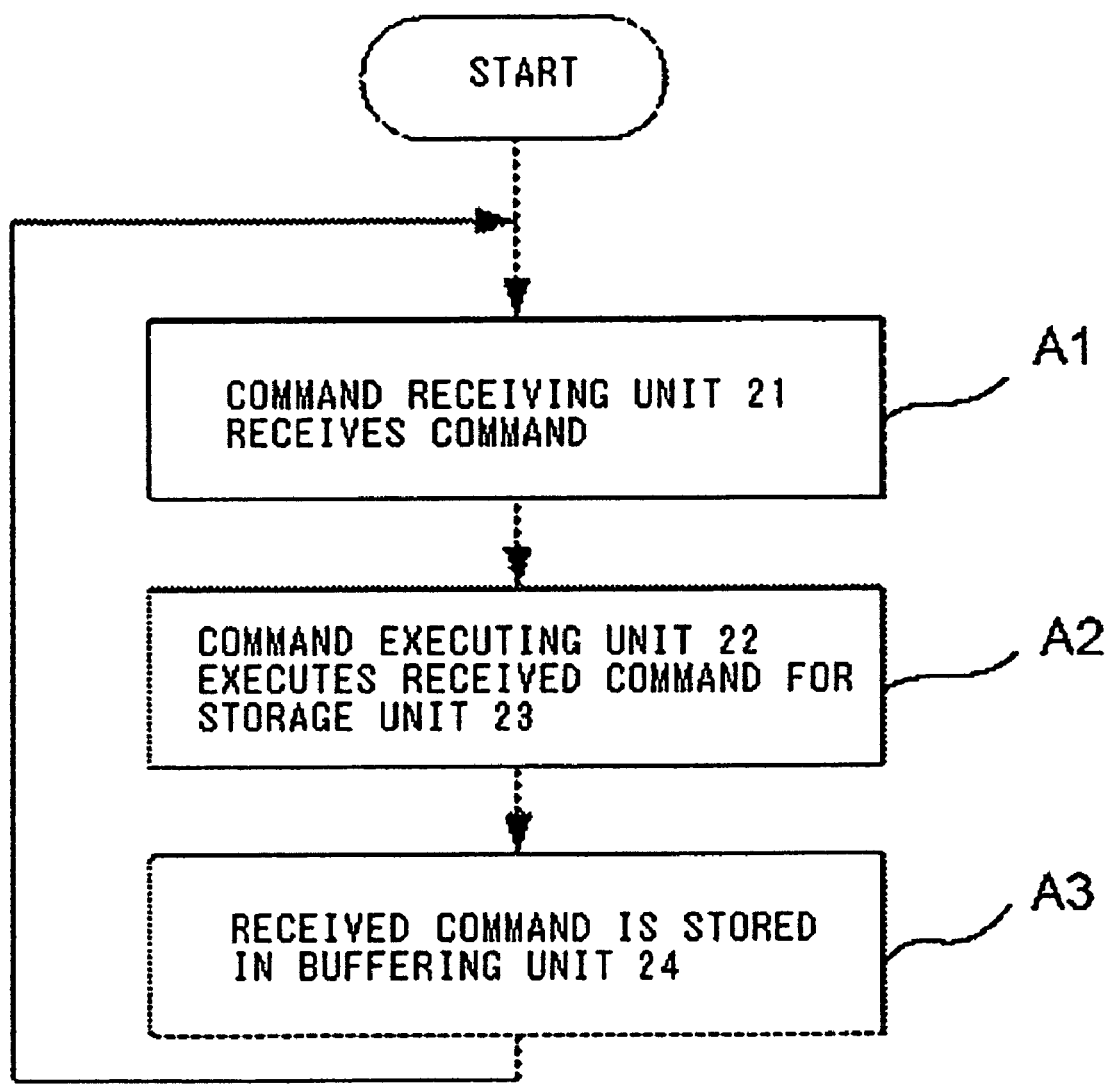
FIG. 4 is a flowchart for illustrating, in the operation of a storage system 2 in the first embodiment of the present invention, the processing for command execution in case the operation is divided into the flow of command execution and into the flow of the command transfer.
Figure 5:
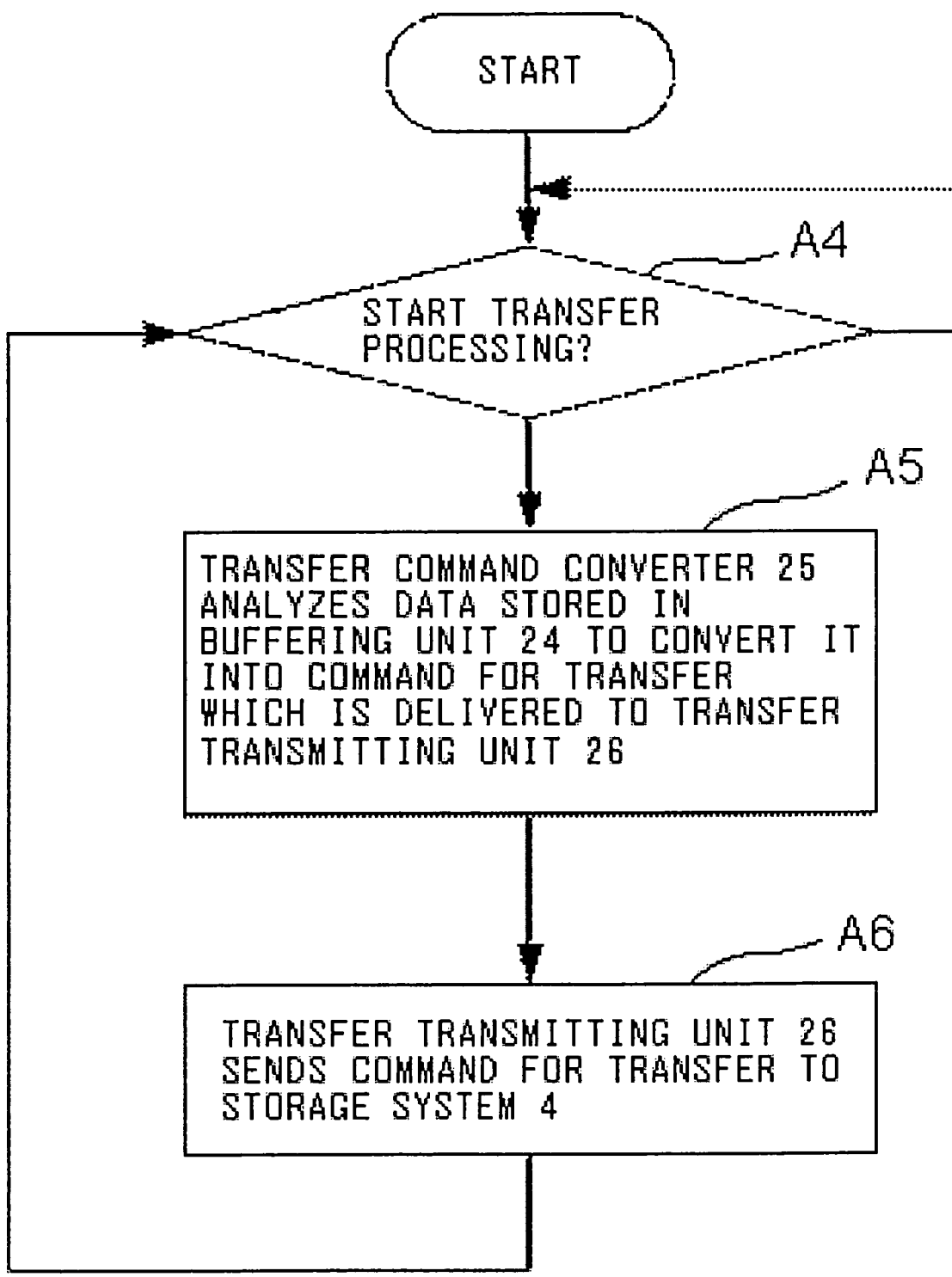
FIG. 5 is a flowchart for illustrating, in the operation of a storage system 2 in the first embodiment of the present invention, the processing for command transfer in case the operation is divided into the flow of command execution and into the flow of the processing for transfer.

The steps A1-A3 and A4-A6 may also be carried out as independent operations. FIGS. 4 and 5 show the flowchart for this case.

FIG. 4 is the flow chart of receiving commands issued from the host 1 and applying them to the storage unit 23, with the flow being centered about the command receiving unit 21, command executing unit 22 and the storage unit 23. FIG. 5 is the flow chart of data transfer. The respective steps are the same as those shown in FIG. 3.

Figure 6:
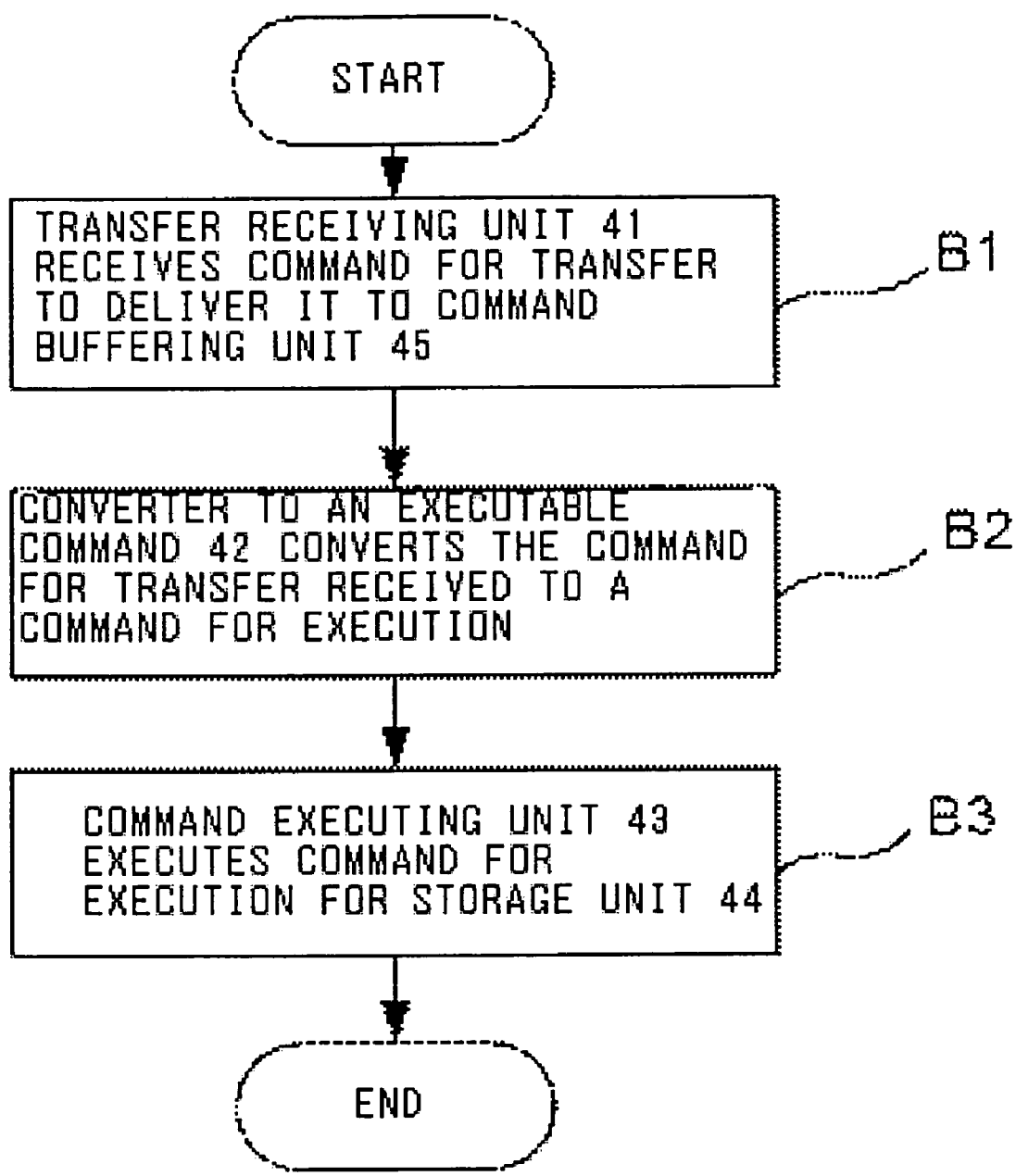
FIG. 6 is a flowchart for illustrating the operation of a storage system 4 in the first embodiment of the present invention.

Referring to FIG. 6, the operation of the storage system 4, as the destination of replication, will be described. Initially, the transfer receiving unit 41 of the storage system 4 receives a command for transfer transmitted by the transfer transmitting unit 26 of the storage system 2 as the source of replication (step B1).

The converter to an executable command 42 then converts the command for transfer, received by the transfer receiving unit 41 and stored by the transfer command buffering unit 45, into a command for execution, in accordance with the conversion algorithm (step B2). As typical of the conversion algorithm, there is such an algorithm which executes reverse conversion of the conversion algorithm utilized in the step A5 and restores the command for transfer to the original command. Alternatively, conversion may be made into an optimized command, instead of restoration to the original command, on the basis of the configuration of the storage system 4, as a backup storage. For example, conversion may be made to a command that data may be written in an area for replication of a main site, such as partition or volume, or to a command that data may be written in an inexpensive storage system or disc.

The command executing unit 43 then interprets the converted command for execution and applies the converted command to the storage unit 44 (step B3). Similarly to the command executing unit 22 of the storage system 2, the command executing unit 43 needs only to have the function of executing the command ordinarily issued from the host 1. Although the command executing unit 43 may have the function of independently executing the command for transfer received, the command executing unit needs to be an independent command executing unit capable of interpreting a conversion pattern for the command for transfer or the conversion algorithm. In such case, the converter to an executable command 42 is unnecessary and the command for transfer received may directly be executed by the command executing unit 43.

Figure 7:
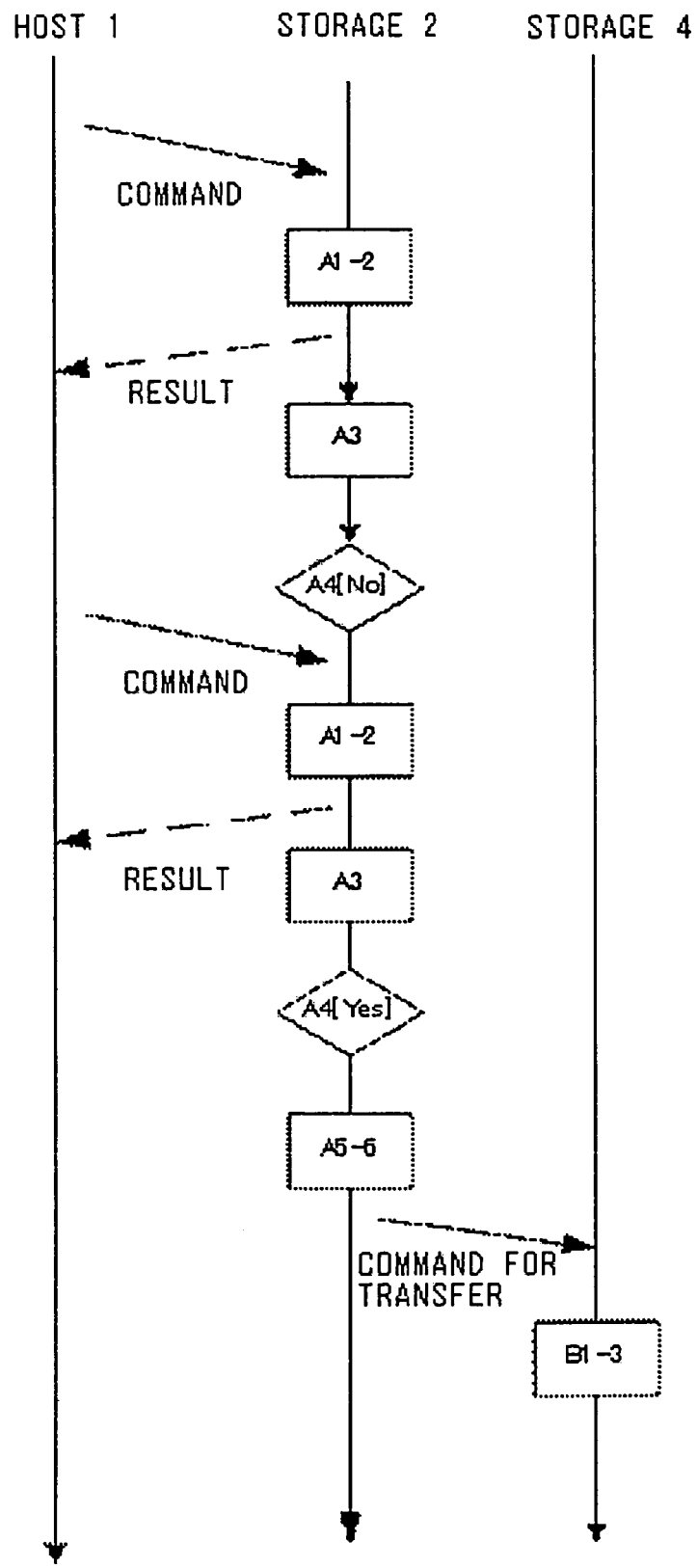
FIG. 7 is a sequence diagram for illustrating the operation among the host 1, storage system 2 and the storage system 4 in the first embodiment of the present invention.

FIG. 7 is a sequence diagram for illustrating the operation among the respective devices of the host 1, and the storage systems 2 and 4, shown by the flowcharts of FIGS. 3 and 6. FIG. 7 initially shows a case where the result of decision of the first step A4 (see FIG. 3) is NO and the result of decision of the second step A4 (see FIG. 3) is YES. Referring to FIG. 7, the host 1 initially issues a command to the storage system 2.

The storage system 2 receives the command to perform the processing of the steps A1-A2 of FIG. 3 to return the result to the host 1.

The storage system 2 then performs the processing of the step A3 to determine whether or not transfer processing is to be carried out (step A4).

Since the step A4, to which processing comes for the first time, stands for a case where no transfer processing is necessary. Thus, processing again waits for a command arriving from the host 1.

When the command is issued from the host 1, the storage system 2 receives the command to carry out the processing of the steps A1 and A2 to return the result to the host 1.

The processing of the step A3 is carried out to make the condition decision of the step A-4 again. Since the transfer processing needs to be carried out this time, the storage system 2 carries out the processing of the steps A5 and A6 and sends the command for transfer resulting from the conversion to the storage system 4.

The storage system 4 receives the command for transfer, resulting from the conversion, and carries out the processing of the steps B1 to B3.

The algorithm for conversion in the step A5 and in the step B2 according to the first embodiment will now be described.

Initially, the processing for conversion in the step A5 of FIG. 3 (processing for conversion to a command for transfer) is described.

Figure 8A:
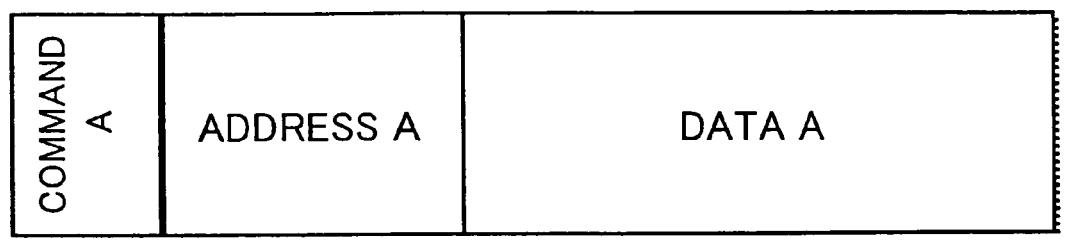
FIGS. 8A and 8B are diagrams illustrating two sorts of commands stored in a buffering unit in the first embodiment of the present invention.
Figure 8B:
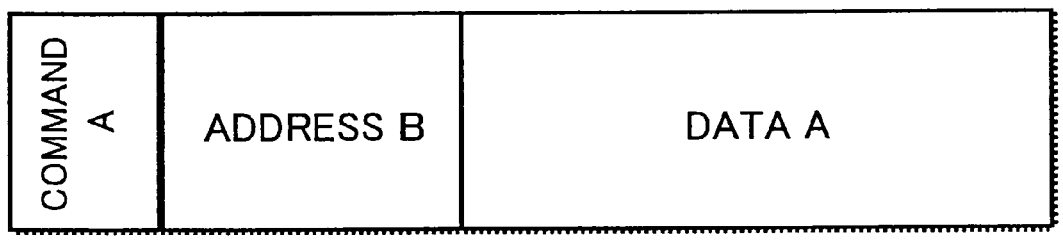

FIGS. 8A and 8B are diagrams showing that two sorts of commands, yet to be transferred, are stored in the buffering unit 24 of the storage system 2.

In the present embodiment, a command issued by the host 1 is of a command format which has a field for specifying the sort of the command (command A), an address field (addresses A and B), and data field (data A). For example, in the case of a CDB command for SCSI, the sort of the command is e.g. the OP-CODE, the address field of the command is e.g. LBA and the data filed of the command is write data in the WRITE command or data of DATA-IN command.

In the present embodiment, a set of commands for having the same command executed on different subject addresses is stored, as shown in FIGS. 8A and 8B. This presents itself under a situation in which the same data are written in plural addresses. Such situation arises when the same file is created on the host side for improving reliability, as in the case of a journal log of a database.

The transfer command converter 25 retrieves, in the processing for conversion, whether or not the two sorts of the command, shown in FIGS. 8A and 8B, are stored in the buffering unit 24. When such command set has been found, the transfer command converter 25 converts the command, shown in FIGS. 8A and 8B, into the command for transfer shown in FIG. 9.

Figure 9:
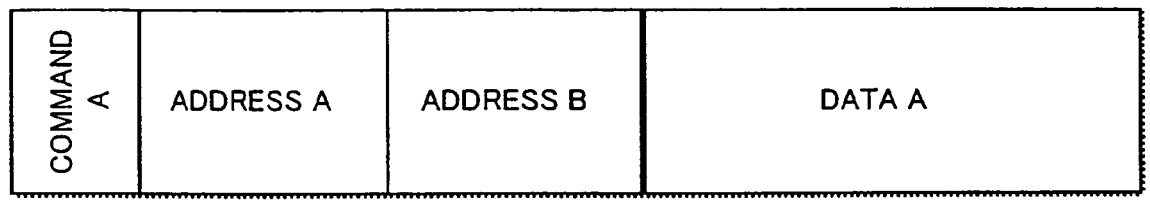
FIG. 9 is a diagram for illustrating a command for transfer as converted from the command of FIGS. 8A and 8B.

FIG. 9 is a diagram showing the configuration of the converted command for transfer. The command for transfer includes at least the command A and the data A, which are common in the two commands of FIGS. 8A and 8B, and two respective addresses A and B in address fields thereof.

Figure 10A:
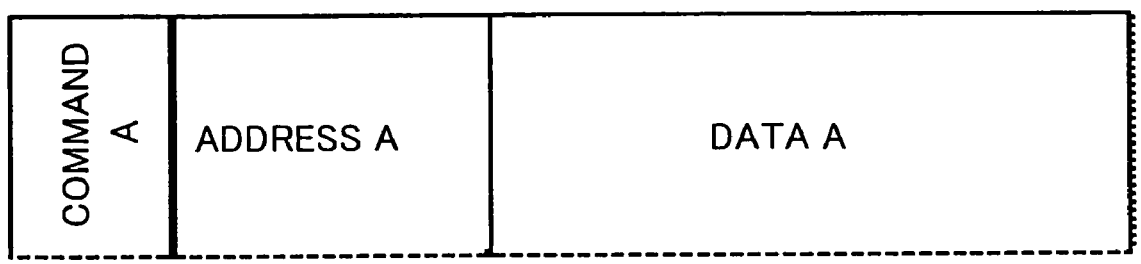
FIGS. 10A and 10B are diagrams for illustrating commands for transfer as converted from the command of FIGS. 8A and 8B.
Figure 10B:
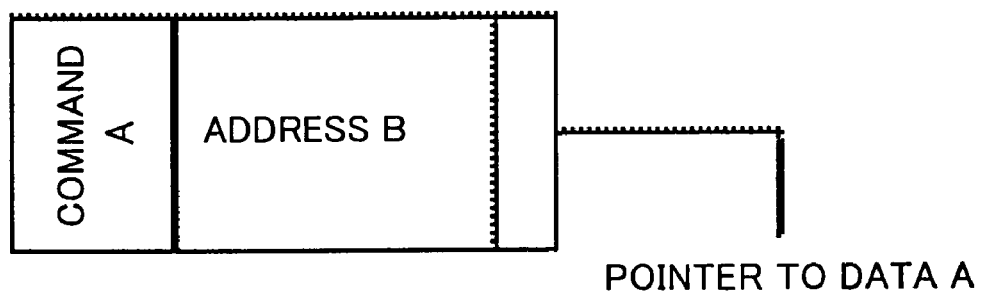

Or, the command for transfer may be converted into first and second commands for transfer shown in FIGS. 10A and 10B respectively. In this case, the first command (command A, address A and data A) shown in FIG. 10A is directly sent, while the entity of the data A of the second command shown in FIG. 10B is not sent. In the second command, instead of sending the entity of the data A, a pointer to data A (e.g. an address of the destination where the data A has been written in the storage system 4) is specified. For example, if the transfer sequence of the command for transfer is secured, the data A has already been written beginning from the address A first, at the time of processing the second command shown in FIG. 10B, and hence the address A is indicated as the pointer. Or, the data of the first command for transfer (data A) may be specified, in which case it is sufficient to specify e.g. an ID of the first command for transfer shown in FIG. 10A.

The conversion algorithm in the step B2 will now be described.

In this step B2, the command for transfer, received by the transfer receiving unit 41, is converted by the converter to an executable command 42 into a command desirable to be executed by the command executing unit 43. It is assumed here that the command for transfer, shown in FIG. 9, has been sent. The converter to an executable command 42 decomposes the command for transfer received and restores it to the command for execution shown in FIGS. 8A and 8B.

In restoring the command for transfer, one of the addresses may be converted, for example, the address B may be converted to an address C, in place of restoring the command to the perfectly same structure as that in the storage system 2, so that an inexpensive disc will be used for one of the addresses. In such case, corresponding instructions may be issued in advance to the converter to an executable command 42. For example, an address conversion table may be provided. In this case, conversion rules may be set not only for the commands for execution but also for the commands that inherently need not be converted, for carrying out the processing for conversion.

There are a variety of methods for the converter to an executable command 42 to detect that the command received is the command for transfer and is a command in need of conversion. In one of these methods, command codes may be set so that the sort of the command for transfer is not the command A but a command A' and, in case of such command, preset conversion is to be carried out. In another method, a flag may be appended for indicating whether or not the command in question is a command for conversion. In yet another method, conversion may be made if the address included in the command for transfer is comprised in the address range as specified by the converter to an executable command 42.

If, in the processing for conversion in the step A5, the command for transfer for conversion affects another command, such as when an irrelevant command is sandwiched between two commands shown in FIGS. 8A and 8B, and the update sequence is to be guaranteed correctly, it is necessary to give to the command for transfer for conversion the information which will permit restoration of the sequence to the original sequence. Processing then waits until the sandwiched command is stored in the buffering unit 45 and, after setting the sequence into order, the command executing unit 43 applies the command to the storage unit 44. Or, the information given in the interim may also be arranged into a single command for transfer to guarantee the update sequence.

If the processing for adjusting the sequence is not carried out, the transfer command buffering unit 45 is not specifically necessary. That is, if processing may be carried out in the sequence of receipt by the storage system 44, the command for transfer may be directly delivered from the transfer receiving unit 41 to the converter to an executable command 42 to carry out the processing. Alternatively, the transfer command converter 25 or the transfer transmitting unit 26 may carry out transfer processing so that it will be unnecessary to interchange the sequence, such as by confirming receipt by the storage system 4 and by subsequently proceeding to the next processing.

The operation and effect of the first embodiment will now be described. If, in the conventional system, the original commands, shown in FIGS. 8A and 8B, are to be transferred, it is necessary to send the command A and the data A twice. By converting the original command into a command for transfer, as described above, data transfer may be completed by transmitting the data A, overlapping in two commands, only once. The band required for transferring the data over the network may therefore become substantially one-half of that for the original command.

Moreover, by converting original plural commands into a single command for transfer, the communication processing necessary for transferring the commands may be reduced, thereby achieving a higher throughput.

It is also unnecessary for the application, database or the operating system of the host 1 to issue special commands for reducing the amount of data transfer of the replication. Thus, for accomplishing the above mentioned effect of the present invention, it is unnecessary to modify the application, setting of databases or operating systems or to modify e.g. the data structure.

On the other hand, a command received from the host 1 is stored once in the buffering unit 24. Before carrying out transfer processing, the command received from the host 1 is executed for the storage unit 23 and the result is returned to the host 1. Hence, the application run on the host 1 is not affected by carrying out replication in the storage system 4.

Since it is sufficient for the command executing unit 22 and the storage unit 23 to be equipped with the function of executing the commands issued in general by the host 1, in both the storage system 2 and the storage system 4, storage systems similar to pre-existing or off-the shelf storage systems may be used.

Moreover, since the converter to an executable command 42 of the storage system 4 is able to carry out the processing for command conversion, commands can be converted so as to write data in locations optimum for the configuration of the storage system 4.

It is also possible for the transfer command buffering unit 45 to buffer temporally the command received by the transfer receiving unit 41 to guarantee the update sequence that may possibly be changed by a command for transfer.

In converting an original command into a command for transfer, it is only necessary to compare the data part. Hence, a smaller processing volume suffices both at the time of compression and at the time of restoration.

The instance of converting plural commands from the host (FIGS. 8A and 8B) into a sole command for transfer (FIG. 9) has been described. However, the present invention may, of course, be applied to a case where the plural number (n) of the commands from the host is converted into (n+1) or more commands for transfer, in order to reduce the volume of data transfer. If the command from the host (original command) is a command of the format shown in FIG. 48A (command made up by the command A, address A and data A) and the data A includes a number of repetitions (three repetitions in FIG. 48A) of data a1, the commands are converted into the following commands, viz., the original command is converted into three commands, namely the initial command of the format of the command A, address A and data a1 shown in FIG. 48B, the next command of the format of the command A, address a2 and a pointer to address a1 shown in FIG. 48C and the second next command of the format of the command A, address a3 and a pointer to data a1 shown in FIG. 48D, whereby the amount of data transfer is one-third of that for the original command.

Figure 49A:
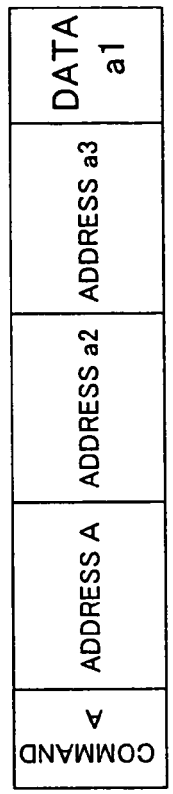
FIGS. 49A and 49B are diagrams for illustrating a further example of conversion to a command for transfer in the first embodiment of the present invention.
Figure 49B:
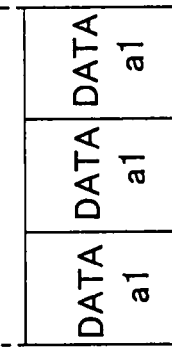

The command for transfer, converted from the original command (same as the original command of FIG. 48A) may also be of the format of the command A, address A, address a2, address a3, data a1, as shown in FIG. 49B. In this case, data a1 is transmitted only once, such that it is avoided to send the original data a1 thrice.

If the original command is (command A, address A and data A) and the data A includes data b, data a1, data b, data a1, address C and data a1 as shown in FIG. 50A, it may be converted into six commands for transfer, in accordance with the format as shown in FIGS. 50B-50G, namely, (command A, address A, data b)
(command A, address a1, data a1)
(command A, address b, and a pointer to data b)
(command A, address a2, and a pointer to data a1)
(command A, address c, data c)
(command A, address a3 and a pointer to data a1)

in which the data b of the original command is converted into a command composed of data b and two commands having the pointer to the data b, as a converted command for transfer, with the amount of data transfer being one-half of that of the original command and with the amount of data transfer of the data a1 being one-third of that of the original command.

Figures 51C, 51D:
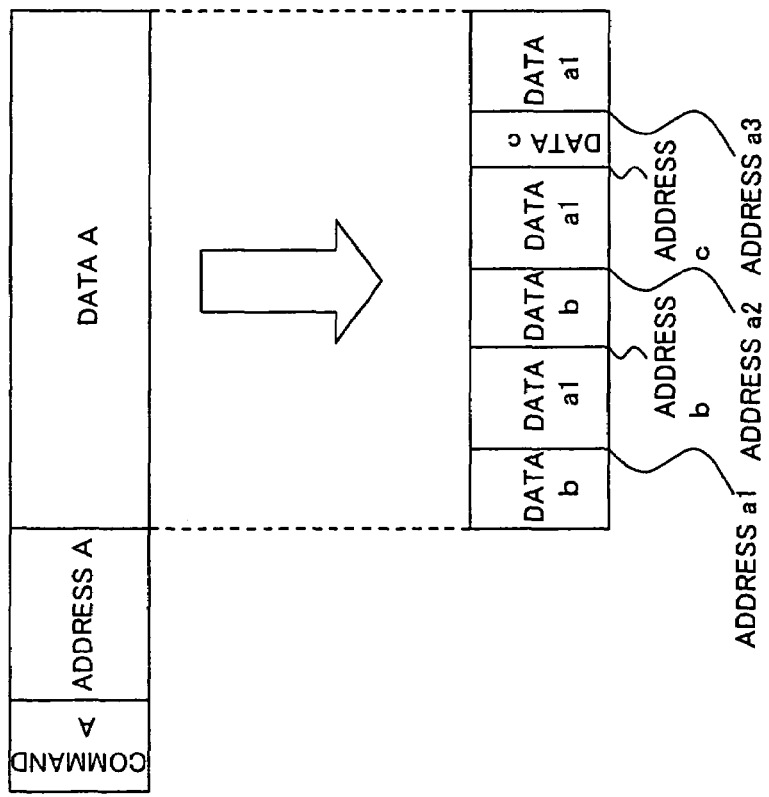

The original command shown in FIG. 51A which is the same as that of FIG. 50A, may be converted into (command A, address A, address b and data b),
(command A, address a1, address a2, address a3 and data a1)
(command A, address c and data c1)

as shown in FIGS. 51B-51D. That is, the original command is converted into a command for writing the same data b in the address A and in the address b, a command for writing the data a1 into addresses a1, a2 and a3 and a command for writing the data c into address c.

In the present embodiment, the command is as a matter of course, not limited to the above-described format of the command field, address field, data (or pointer) filed. That is, the command is not limited to the command field (OP-code), the control information filed, such as or address field, and the data field, and may be composed of the data filed and the control information filed. The data filed may also includes compressed data or data processed or converted. The command field may be more simplified. The command field may be omitted because the command transmitted for replication is only the WRITE-based command.

Figure 52:
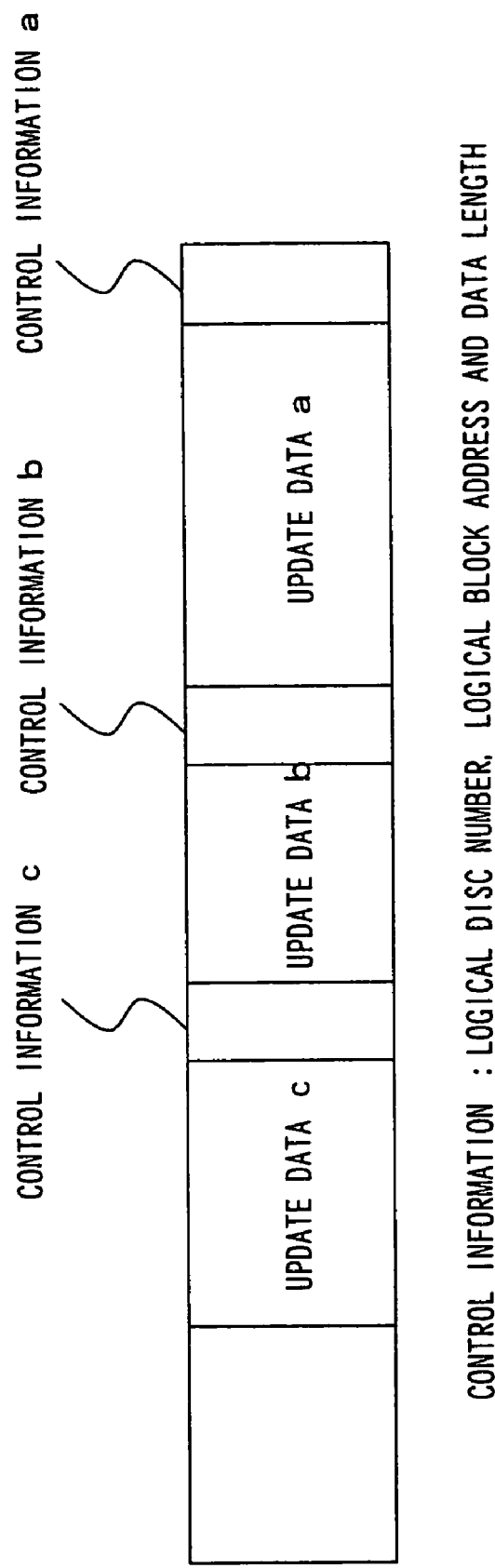
FIG. 52 is a diagram for illustrating another example of a data part in the first embodiment of the present invention.

It is also possible to manage the differential information between the source of replication and the destination of replication and to transfer only the differential information. FIG. 52 shows, as an example, a data part of the command for transfer of the differential information including updated data and the control information. The control information may includes a logical disc number, a logical block address and the data length.

Moreover, in the commands shown FIGS. 8A and 8B, FIG. 9 and FIGS. 10A and 10B, the data field may is the immediate data included in the command. Alternatively, the command may be made up of the command field and the data filed, separated from each other.

A first embodiment of the present invention will now be described in more detail with reference to the drawings. It is assumed that, in the replication system, exploiting the present invention, the database is being executed on the host 1. The host 1 exploits the storage system 2 as the destination of storage of data of the database and the data is replicated for the storage system 4 over the network 3.

In general, a database system has a journal log as data, and the journal log is duplicated and saved in physically distinct discs on the host side for improving fault-tolerance. The destination of duplication and storage may be a distinct volume, virtualized on the storage system side, in addition to being the physically distinct discs. Or, the destination of duplication and storage may be by duplication on the same disc.

Figure 11:
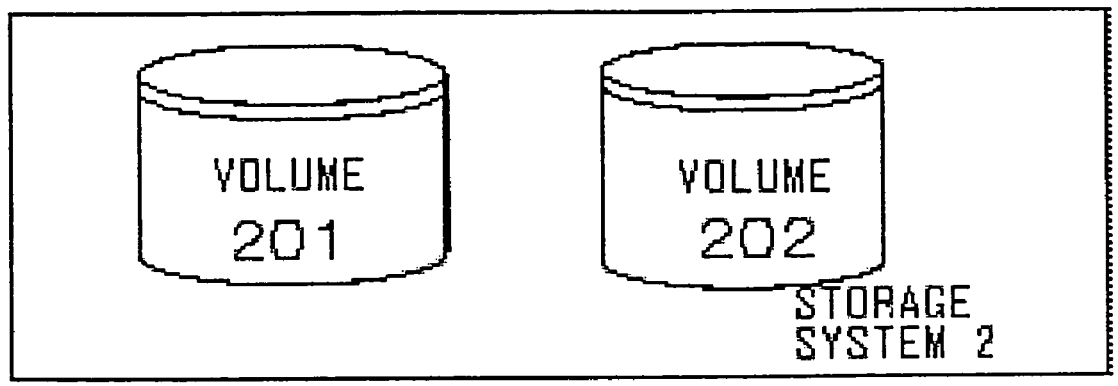
FIG. 11 is a diagram showing the configuration of a storage area of the storage system 2 in the first embodiment of the present invention.
Figure 12A:
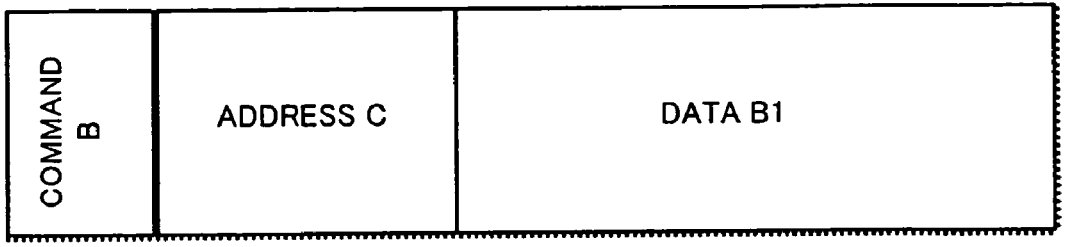
FIGS. 12A-12E are diagrams for illustrating commands issued after processing RAID5 in a first modification of the first embodiment of the present invention.
Figure 12B:
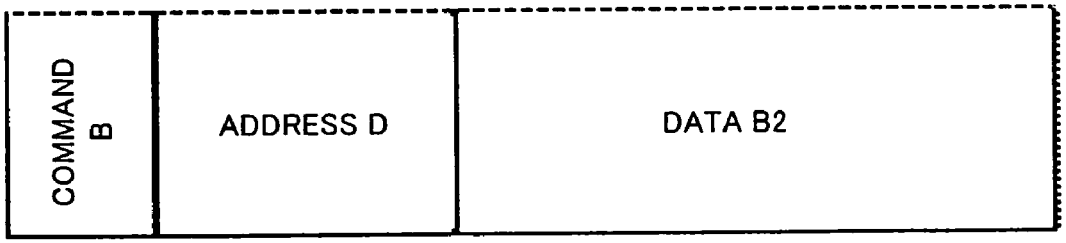
Figure 12C:
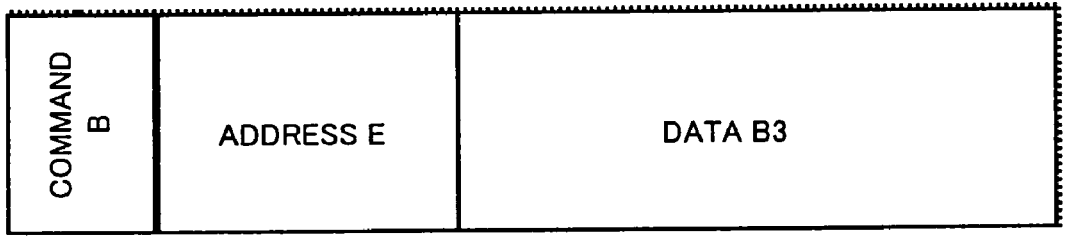
Figure 12D:
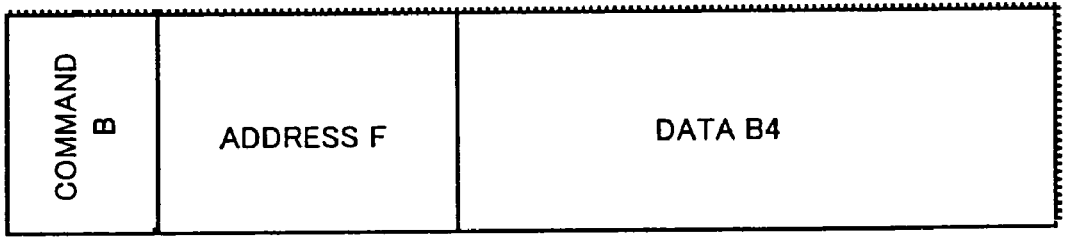
Figure 12E:
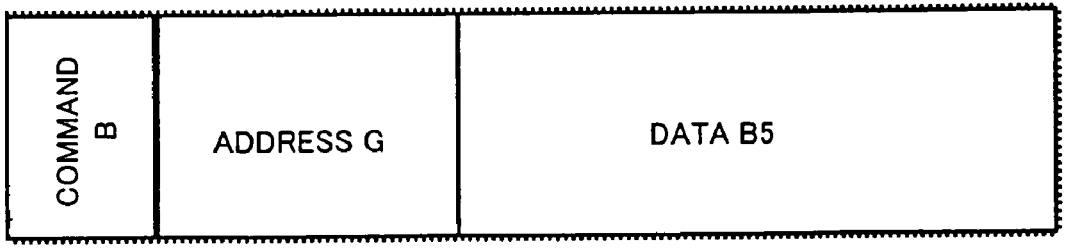

FIG. 11 shows a storage area in the storage system 2. It is assumed in FIG. 11 that the storage system 2 has volumes 201 and 202 and plural storage areas. In the present embodiment, the database program, run on the host 1, records one of the journal logs in a volume 201 and the other on a volume 202. Each time update occurs on the database, the database program add the update to the journal log. Hence, when there has occurred the adding operation to the journal log, the command issuing unit 11 issues a command for writing identical data in the volumes 201 and 202.

It is assumed that the command issued is the combination of the commands shown in FIGS. 8A and 8B. The commands of FIGS. 8A and 8B will now be described in connection with the present embodiment.

The command A in FIGS. 8A and 8B is a command for writing data, the address A in FIG. 8A is the address of the volume 201 and the address B in FIG. 8B is the address of the volume 202. The data A denotes data to be written and are common data to the two commands.

The commands of FIGS. 8A and 8B are converted into a command for transfer, shown in FIG. 9, and transferred to the storage system 4.

Thus, in the present embodiment, as data to be stored in the buffering unit 24, only a write command suffices. On the other hand, in the processing for converting the commands into the command for transfer, it is sufficient to retrieve whether or not conversion to the transfer command may be made in connection with the volumes in which data are written in duplicates and with the processing for writing in the addresses of the physical discs.

In case data which are recorded in duplicates are to be written on the predetermined volume, the WRITE command generated for the volume is made redundant and hence it suffices to execute the processing for converting only the WRITE command into the command for transfer.

In the present embodiment, the case of creating the same data in duplicates based on the configuration of database data has been described. The present invention may, however, be applied to any file subjected to mirroring by the host 1.

The present invention may also be applied to a case where the same data is written repeatedly, with large amount of data being written in a single volume. This write pattern is likely to occur in an storage area for storing a table in the database, in case of running an application by which the same data is likely to be written in each row in the table.

The operation and the meritorious effect of the present invention will now be described. The following operation and the meritorious effect may be demonstrated in addition to the meritorious effect derived from the first embodiment.

In the present embodiment, only a write command suffices as the data stored in the buffering unit 24. Consequently, a smaller storage capacity required for the buffering unit 24 suffices as compared to the case of storing the totality of data in the buffering unit 24.

If the command to be converted by the transfer command converter 25 is decided to be issued for a predetermined volume, the quantity of commands in the buffering unit 24, which are to be scanned by the transfer command converter 25, is decreased, and hence the speed of the processing for conversion is increased.

A modification of the first embodiment will now be described.

First Modification of the First Embodiment

In the first modification, the amount of data transfer is reduced for write data to which has been appended redundancy data, such as in RAID5 and the like. The configuration of the first modification of the first embodiment is similar to that of the first embodiment and hence the explanation thereof is dispensed with. The processing flow shown in FIGS. 3, 6 and 7 is similar to that of the first embodiment.

The present modification differs from the first embodiment in the conversion algorithm in the step A5 of FIG. 3. In the present modification, it is assumed that the RAID5 processing is carried out on the host 1 or in a layer higher than the command receiving unit 21 to write data in the storage system 2. The write command, issued after RAID5 processing from the host 1, is then a command shown in FIGS. 12A-12E. It is noted that FIGS. 12A-12E show the formats of the same commands as shown in FIGS. 8A and 8B, in a simpler manner.

The command B in FIGS. 12A-12E is a command for write following the RAID5 processing, and the addresses C-G in FIGS. 12A-12E denote addresses to which data are written in a distributed fashion following the RAID5 processing, while data B1 to B5 denote four striped data following the RAID5 processing and one parity data.

In the step A5, these commands are converted into a command for transfer in accordance with a conversion algorithm. It is noted that, with the conversion algorithm in the first embodiment, none of the commands of FIGS. 12A-12E are subjected to conversion. However, with the conversion algorithm of the present first modification, the amount of data may be reduced by the conversion as hereinafter described.

Figure 13A:
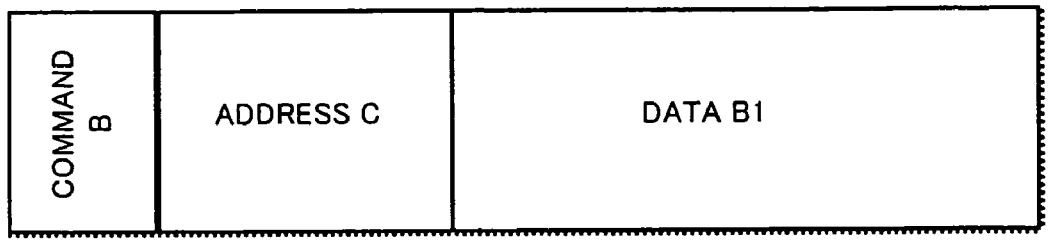
FIGS. 13A-13E are diagrams for illustrating commands for transfer as converted from the commands of FIGS. 12A-12E in the first modification of the first embodiment of the present invention.
Figure 13B:
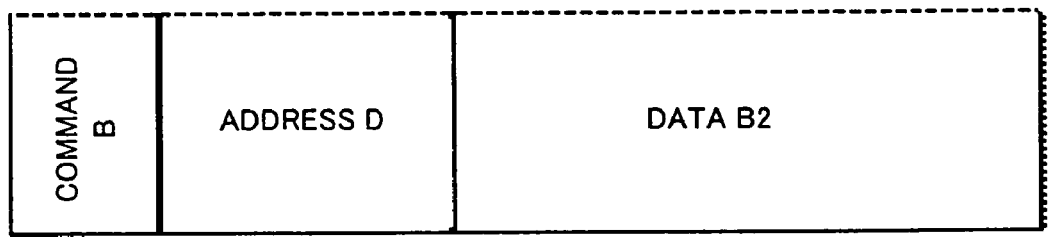
Figure 13C:
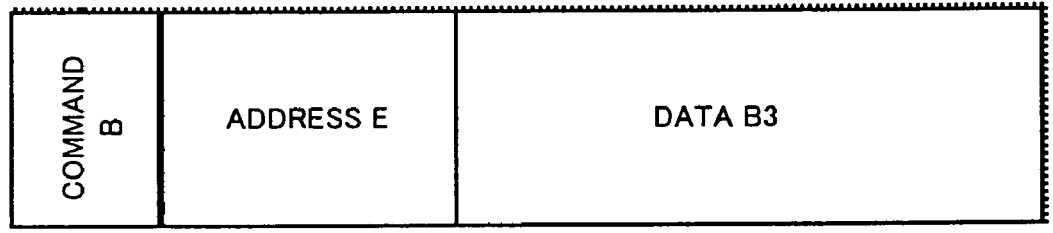
Figure 13D:
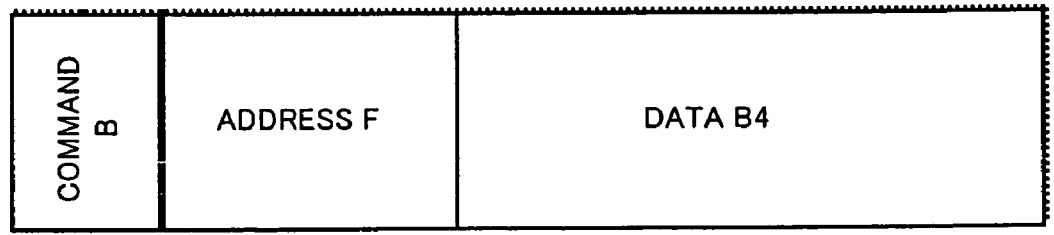
Figure 13E:
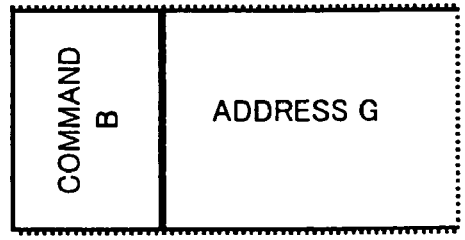

In the conversion algorithm of the present first modification, the set of commands of FIGS. 12A-12E are converted into a set of commands shown in FIGS. 13A-13E. In the present modification, since the data has been processed with RAID5 and distributed into the data B1 to B5, to which has been appended the parity, the data may be recovered even if one of the data is lost. Thus, the data B5 may be deleted as shown in FIG. 13E and recovered by carrying out parity calculations and restoration of the data B5 in the step B2 which is the processing for conversion on the storage system 4. This reduces the amount of data transfer to approximately four fifths (⅘). If e.g. the volume address processed with RAID5 is grasped from the outset, it is unnecessary to transmit commands devoid of data (command of address G).

The data deleted need not be the data B5. Since it is unnecessary for the deleted data to be a parity part, four commands arriving earlier out of the five divided data may be transmitted and the last arriving command may be deleted. Also, in the present modification of the first embodiment, RAID5 processing is referred to for explanation. However, the data may be processed with RAID6, RAID4 or RAID3 creating redundant data to carry out the writing. The conversion algorithm of the first embodiment may be applied in connection with RAID1.

Not only RAID1 but also any other processing for creating redundant data for restoration later to effect writing may be applied. The reason is that it is unnecessary to transmit data of the codes, such as parity codes, for redundancy processing, or data that may be recovered as a result of the redundancy processing, need not be transmitted to the storage system 4.

The meritorious effect of the present first modification will now be described.

In addition to the meritorious effect of the first embodiment and its example of execution, such meritorious effects may be obtained that the meritorious effect of reducing the amount of data transfer may be achieved not only for writing the same data in different locations but also for writing data appended with the redundancy data.

Second Modification of the First Embodiment

A second modification of the first embodiment will now be described. This second modification achieves the processing of local copying, such as archive logging, without sending real data. In this second modification of the first embodiment, when the host 1 issues a command for copying data stored in the volume 201 from the volume 201 to the volume 202 in the storage system 2 which has the configuration shown in FIG. 1, the amount of data may be reduced.

Although the case of copying from the volume 201 to the volume 202 has been described, copying may be made in the same volume. The copying may be copying of a simple file, or may be copying in which only part of the original data is changed and the majority of the original data remains the same. Such processing which effects data copying in the storage system 2 is referred to below as 'local copying processing'.

For example the following processing may be made by way of the local copying processing. A database application generally has journal log data, and saves past journal log data. The processing of saving in other locations by affording an archive filename is carried out periodically. This processing can be thought of as being a processing for copying journal log data, already written in the storage 2, in an archiving destination, and hence is an example of the local copying processing.

There may be occasions where data created in the disc array device is being referenced less frequently and hence is copied in an inexpensive disc device or in a storage unit for storage. This processing is also among the instances of the local copying processing. The copying from a data center of a source of replication to another device may also be performed in similar manner.

The configuration of the present second modification is similar to that of the first embodiment shown in FIGS. 1 and 2 and hence is not described here specifically. The processing flow shown in FIGS. 3, 6 and 7 is also similar to that of the first embodiment described above.

The point of difference of the present second modification is the conversion algorithm in the step A5.

The conversion algorithm of the present second modification converts the set of commands, issued from the host 1 by local copying processing, into a command for transfer for not transferring data written by the local copying processing.

Figure 14:
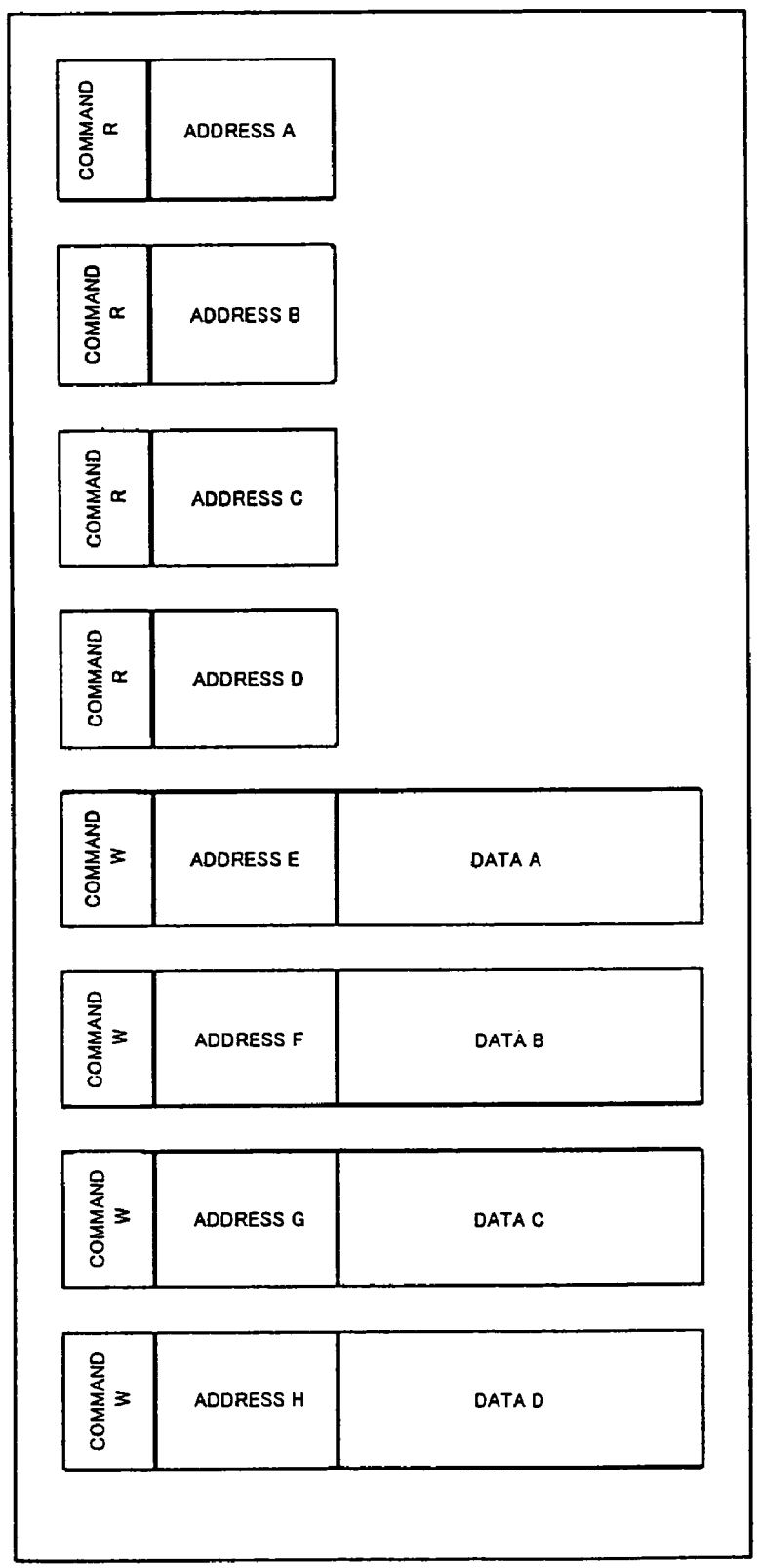
FIG. 14 is a diagram for illustrating commands issued from a host 1 by local copy processing in a second modification of the first embodiment of the present invention.

An instance of the conversion algorithm for local copying processing will now be described. FIG. 14 illustrates how commands issued from the host 1 have been stored in the buffering unit 24 (buffer storage unit) by the local copying processing. The command initially received by the command receiving unit 21, made up by a command R and an address A, is shown in an uppermost part of FIG. 14. The command R is a command for reading out data by a READ-related command. A command W is a command for writing data by a WRITE-related command. The host 1 is about to read in data A-D recorded in a location of the addresses A to D to write the data A to D in addresses E to H, by way of performing the local copying processing.

The transfer command converter 25 detects the pattern as shown in FIG. 14 and converts the command into a command for transfer. While data A to D are obtained as a result of executing the command R, the commands stored in the buffering unit 24, by themselves, are not sufficient to confirm that these data are to be used as data of the command R. Thus, if it is necessary for the conversion algorithm to confirm that the respective results of the plurality of commands R (read command) are data A to D, the processing of sending the results obtained by the commands R to the buffering unit 24 is added in the step A2 of FIG. 6. In case it can be recognized that the processing in question is the local copying processing, from the characteristic set of commands shown in FIG. 14, the results obtained with the commands R need not be sent to the buffering unit 24.

Figure 15:
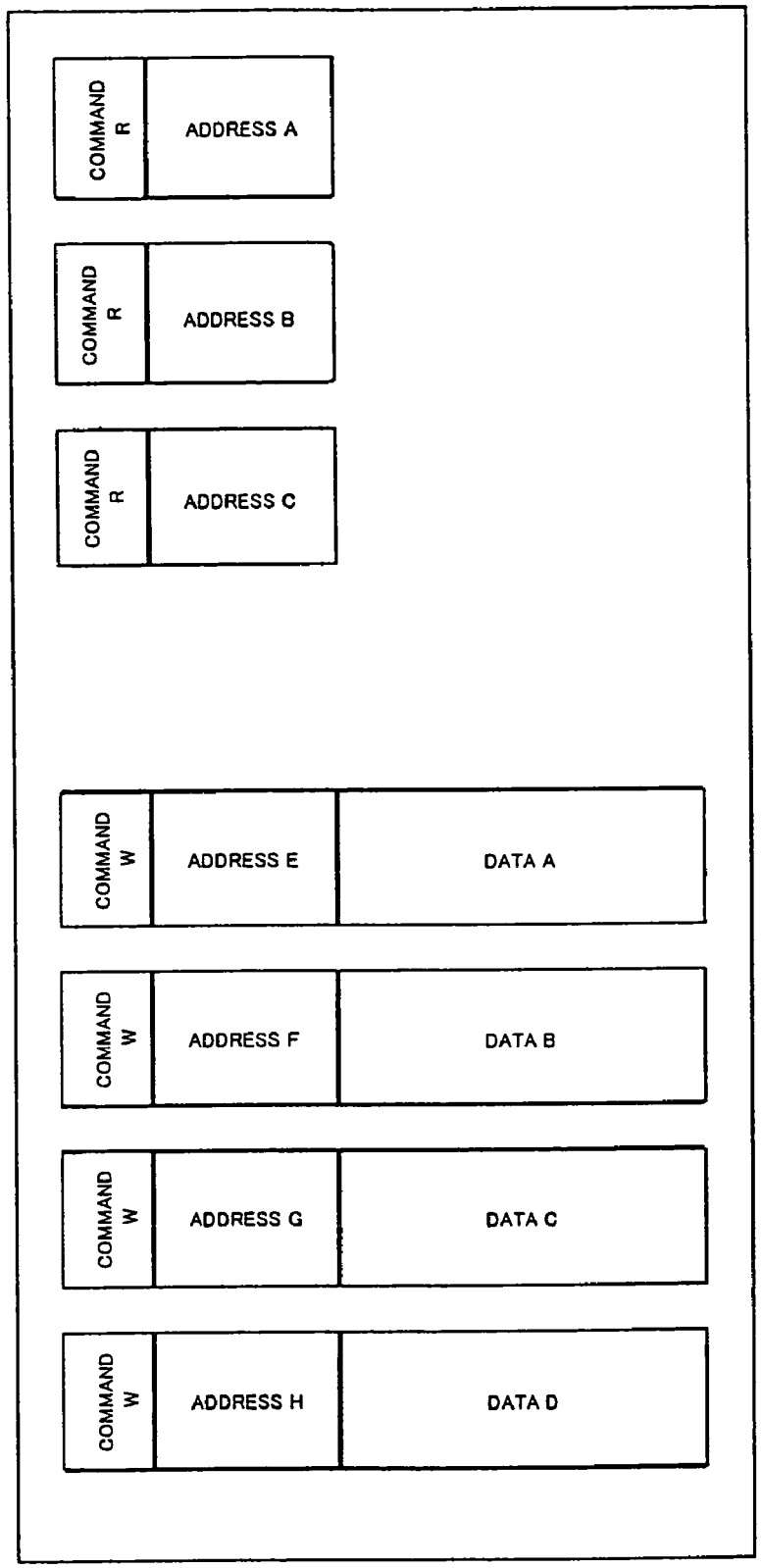
FIG. 15 is a diagram for illustrating a case where there lacks one READ command of the commands of FIG. 14 in the second modification of the first embodiment of the present invention.

The commands R, as the command issued from the host 1, do not necessarily read in the totality of data, as shown in FIG. 14. It is because such an event may occur in which data stored in the buffer of the host 1 are not read from the storage system 2. Hence, there is a probability that a command is lacking, as shown in FIG. 15. Since it is thought that characteristic patterns proper to the local copying processing are retained, the conversion algorithm may recognize the processing as being the local copying processing of the data A to D. The processing may also be deemed to be the local copying of data A to C which might directly be recognized as the local copying processing.

There are a large variety of methods for recognizing that the command patterns as shown in FIG. 14, stored in the buffering unit 24, correspond to the local copying processing. There is such a method comprising having the transfer command converter 25 recognize the patterns occurring frequently as local copying processing, through manual operations, from the characteristics of the application run on the host 1. These patterns may also be automatically recognized based on learning from the log of the access patterns of the commands issued from the host 1. In addition, since the WRITE processing of the local copying processing may presumably be carried out for a certain predetermined volume, the WRITE command for the volume may be deemed to be subjected to conversion.

There is such a method which will allow for recognition of a command pattern as being the local copying processing. It is highly likely that an application or an operating system running on the host 1 has recorded the processing, such as the local copying processing, in some log or other. Hence, a given log is recognized as being the local copying processing, by the transfer command converter 25 detecting the log either periodically or at the time of carrying out the processing for conversion.

The log of the host 1 may be recorded in the storage unit 23 of the storage system 2 or in a local storage unit of the host 1 and hence it is necessary to confirm the log of the needed site. In case this method is used, the detailed configuration of the replication system, shown in FIG. 2, is as shown in FIG. 16.

Figure 16:
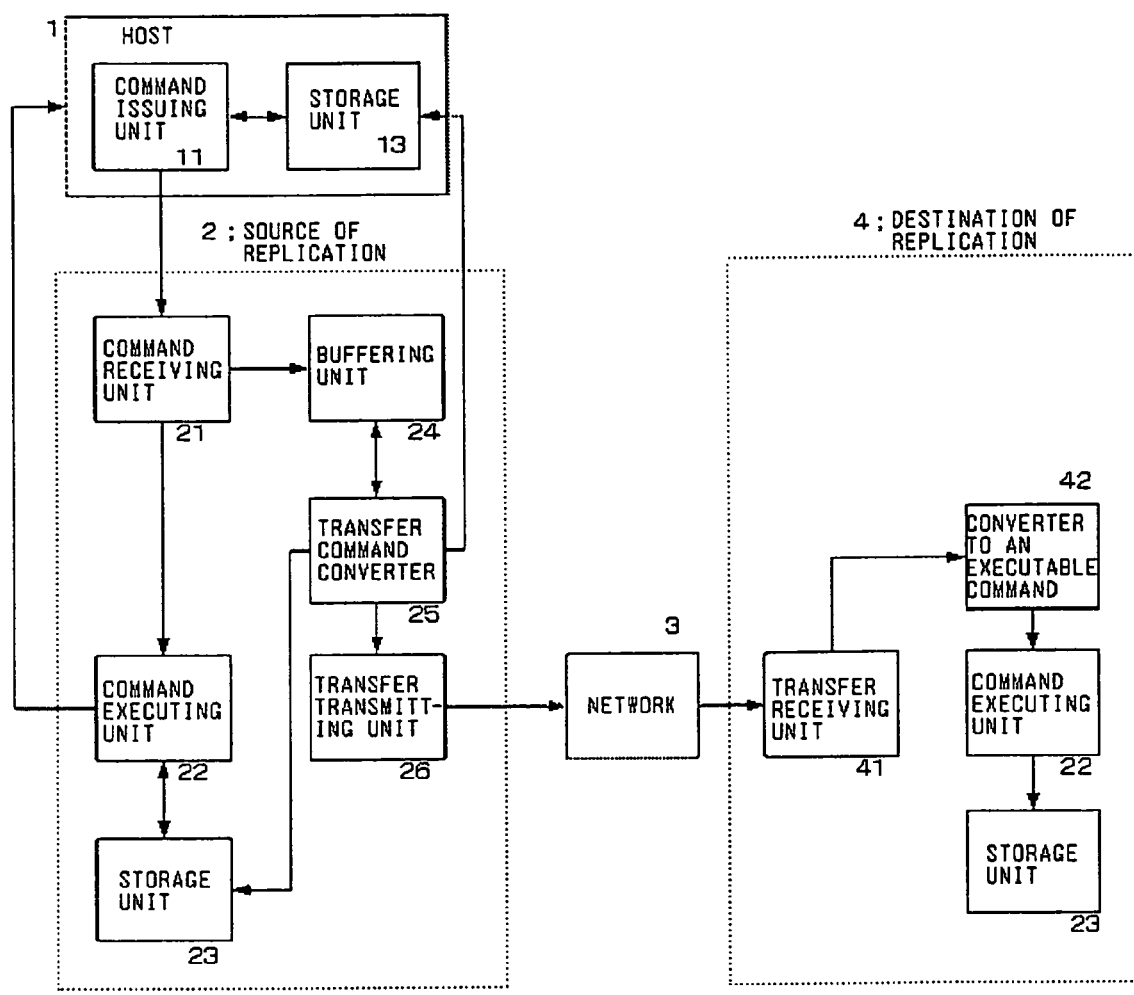
FIG. 16 shows another instance of a block diagram showing a detailed configuration of a host and a storage system in the second modification of the first embodiment of the present invention.
Figure 17A:
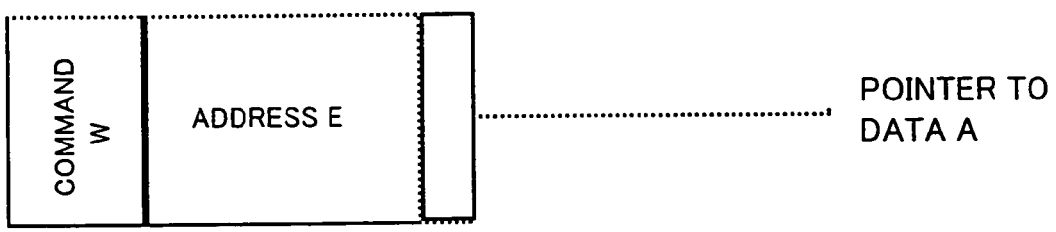
FIGS. 17A-17D are diagrams for illustrating a command for transfer as converted from the command of FIG. 14 in the second modification of the first embodiment of the present invention.
Figure 17B:
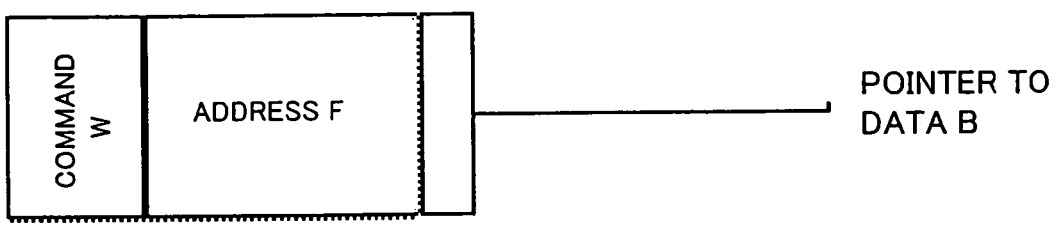
Figure 17C:
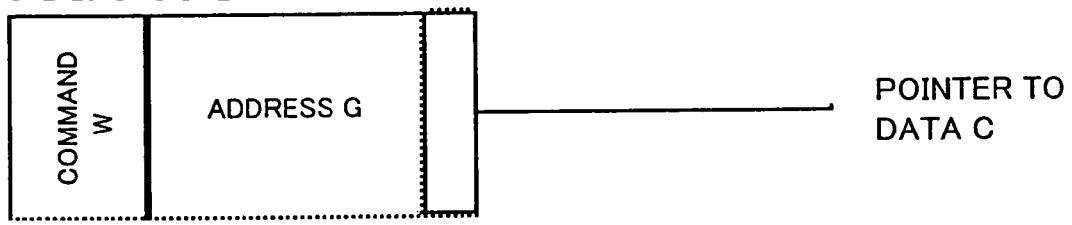
Figure 17D:
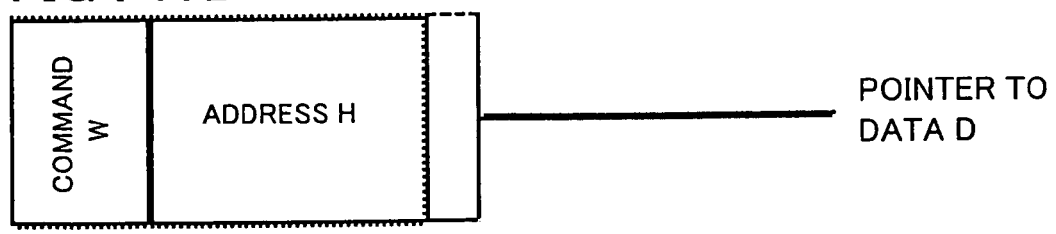
Figure 19A:
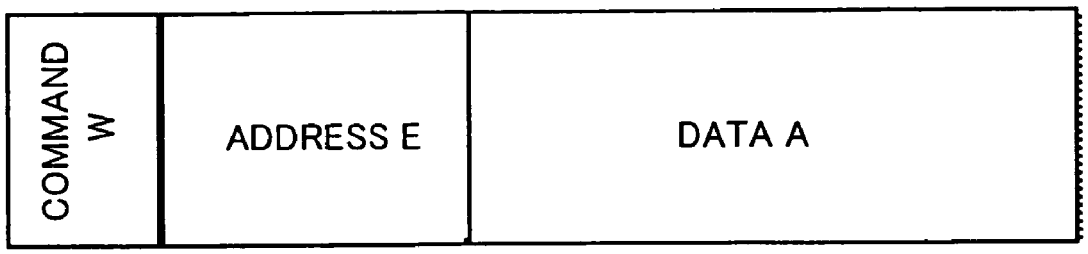
FIGS. 19A-19D are diagrams for illustrating the commands for transfer, shown in FIGS. 17A-17D and 18, into a form for execution in the storage system 4, in the second modification of the first embodiment of the present invention.
Figure 19B:
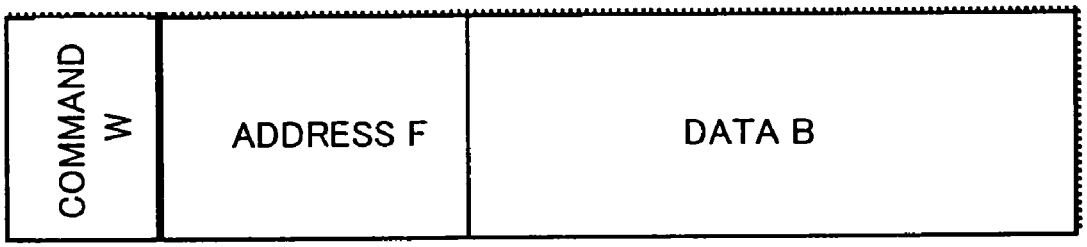
Figure 19C:
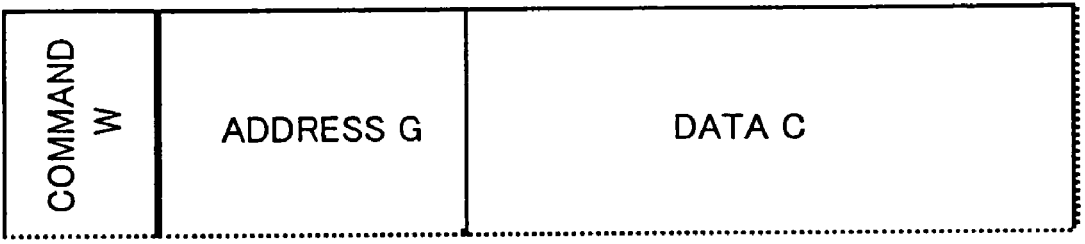
Figure 19D:
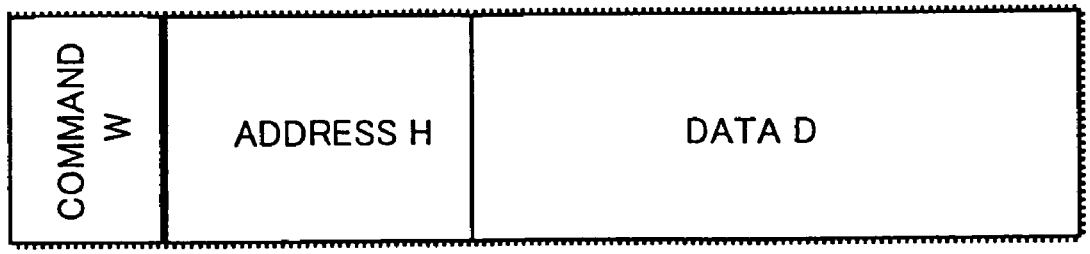

Referring to FIG. 16, the replication system will now be described. The host 1 differs from the configuration of FIG. 2 in having a storage unit 13. This storage unit 13 is a storage unit used by the host 1. For example, the storage unit 13 may be a magnetic storage unit, a semiconductor storage unit or a storage unit connected over a network. Additionally, the configuration of FIG. 16 differs from that of FIG. 2 in that the transfer command converter 25 refers to the storage units 23 and 13.

In case the transfer command converter 25 has recognized that the processing is the local copying processing, by the method described above, it converts the command into a command for transfer. The command for transfer, into which the command is converted, may be exemplified by the following commands.

FIGS. 17A-17D show examples of the commands for transfer, as converted from the commands shown in FIG. 14. In these examples, the entities of data A to D of the command W are not transmitted. The pointers indicating the presence of data A to D are entered in place of sending the data A to D. In the commands in FIG. 14, data A to D are read immediately before from the addresses A to D. Hence, it is sufficient to specify the addresses A to D as pointers to the data A to D as shown in FIGS. 17A-17D, respectively.

FIG. 18 shows another example of the command for transfer as converted from FIG. 14. In this instance, a special command, that is, a command X, is defined. Here, the command X is assumed to be a command by which data of the addresses A to D shall be written in addresses E to H. If the area from the addresses A to D and the area from the addresses E to H are continues area, such a command specifying the addresses A and E and separately specifying the size may be used.

The converter to an executable command 42 of the storage system 4 converts the commands for transfer in FIGS. 17A-17D and FIG. 18 into a command shown in FIG. 19 to execute the command. The conversion may be made so that the command R is executed first and the result thereof is received to execute the command W.

In the present modification, the number of commands is four. However, there is no limitation to the number of commands, that is, the number of commands is arbitrary.

The present modification may be implemented in combination with the first embodiment and other modifications thereof.

The meritorious effect in the second modification of the first embodiment will now be described. The following meritorious effects may be obtained in addition to those of the first embodiment.

In the present modification, the WRITE processing, generated by the local copying processing, may be implemented by simply transferring the pointer of data, representing the contents of the WRITE command, thus dispensing with a large transfer volume.

The amount of computation for the conversion by the transfer command converter 25 may be reduced by specifying the storage volume of the local copying processing when recognizing the local copying processing. An address space, a partition or a file, specifying a virtualized or physical write space, may be optionally used in place of the volume of the storage.

Also, the processing of the transfer command converter 25 may be appreciably reduced to facilitate the processing, by exploiting e.g. the system log information in recognizing the local copying processing. The system log information may include the recording of the write processing by the operating system, database software or the application software, and error alarms.

Third Modification of the First Embodiment

A third modification of the first embodiment will now be described. This third modification of the first embodiment is related to a variant of the transfer momentum. The configuration of the third modification of the first embodiment is similar to the configuration of the first embodiment shown in FIG. 1 or 2 and hence the explanation is dispensed with. The processing flow shown in FIGS. 3, 6 and 7 is also similar to that of the first embodiment.

In the present third modification, the conditions for starting the transfer processing in the step A4 of FIGS. 3 and 5 will be described.

Basically, the condition under which the transfer processing in the step A4 is started is arbitrarily defined. For example, the storage area of the buffering unit 24 is temporally periodically partitioned to start the transfer processing. Specifically, the storage area of the buffering unit is partitioned every 30 seconds, every minute or every hour to carry out the transfer processing. The processing at this time will now be described with reference to FIGS. 20 and 21.

Figure 20:
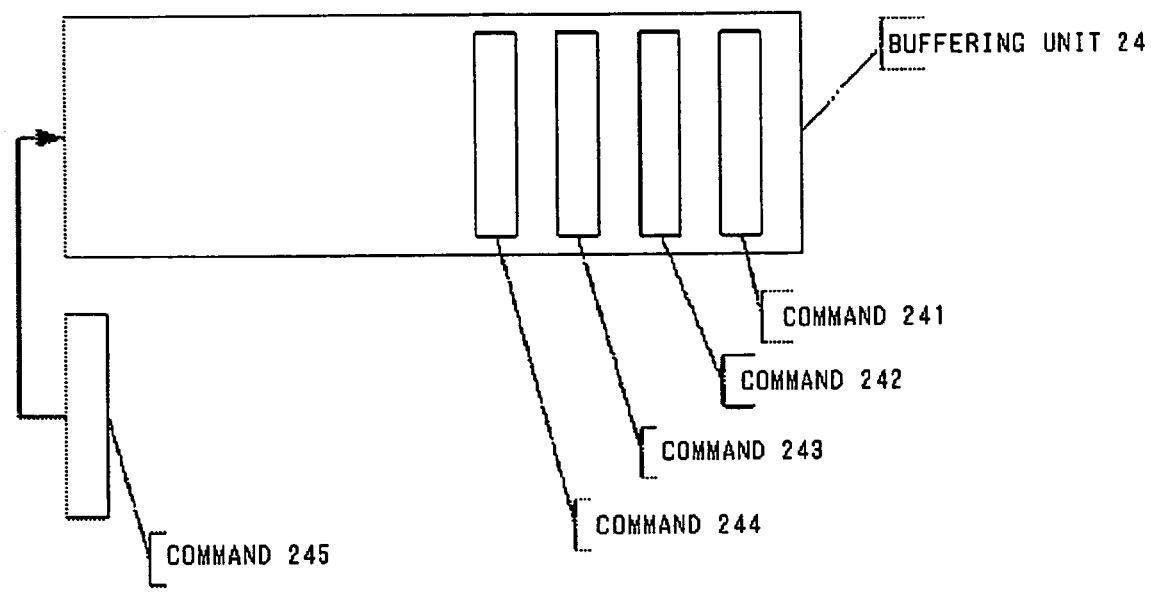
FIG. 20 illustrates an exemplary state of a buffering unit 24 at a certain time point in a third modification of the first embodiment of the present invention.

FIG. 20 shows an instance of the state of the buffering unit 24. It is assumed that, in this instance, the command receiving unit 21 is implemented as a queue for performing FIFO processing.

Meanwhile, commands 241 to 244 are the commands received by the command receiving unit 21 and stored in the buffering unit 24.

In FIG. 20, the commands 241 to 244 are stored in the buffering unit 24 in the order they are received. The next following command 245 is stored next to these commands. It is assumed that, in the state of FIG. 20, the time is ripe for starting the transfer processing.

Figure 21:
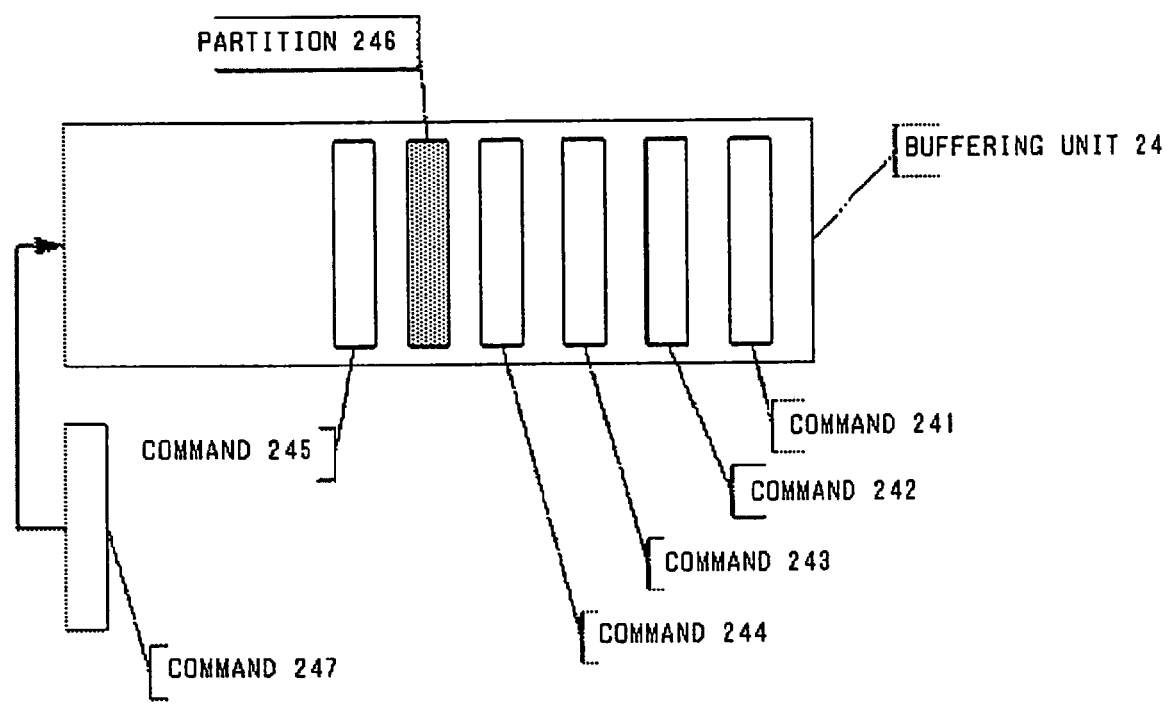
FIG. 21 illustrates a state in which a division 246 has been inserted from the state of FIG. 20 and a command 245 has then arrived in the third modification of the first embodiment of the present invention.

At this time, the transfer command converter 25 inserts a partition 246, as shown in FIG. 21. The transfer command converter then proceeds to transferring the commands 241 to 244. If, in the commands 242 to 244, there is the combination of commands with which it is possible to reduce the amount of data transfer, the corresponding processing for conversion is carried out. Even if there is a combination of the command 245 or the command 247, arriving after the partition 246, and the commands 241 to 244, with which combination it is possible to reduce the amount of data transfer, the processing for conversion is not carried out.

If, in the processing on the storage system 4, no storage processing is carried out until the totality of the commands 241 to 244, which are the commands prior to the partition 246, has reached the transfer command buffering unit 45 of the storage system 4, it may be assured that the state of the storage unit 23 of the storage system 2 is the same as that of the storage unit 44 of the storage system 4 at a time point of FIG. 20 corresponding to the transfer start timing.

If no particular transfer momentum or trigger is not provided and the commands stored in the buffering unit 24 are sent each time they are stored. If, in the commands unable to be sent and stored in the buffering unit 24, there is the combination of commands that can be reduced, those commands are converted into a command for transfer.

Figure 22:
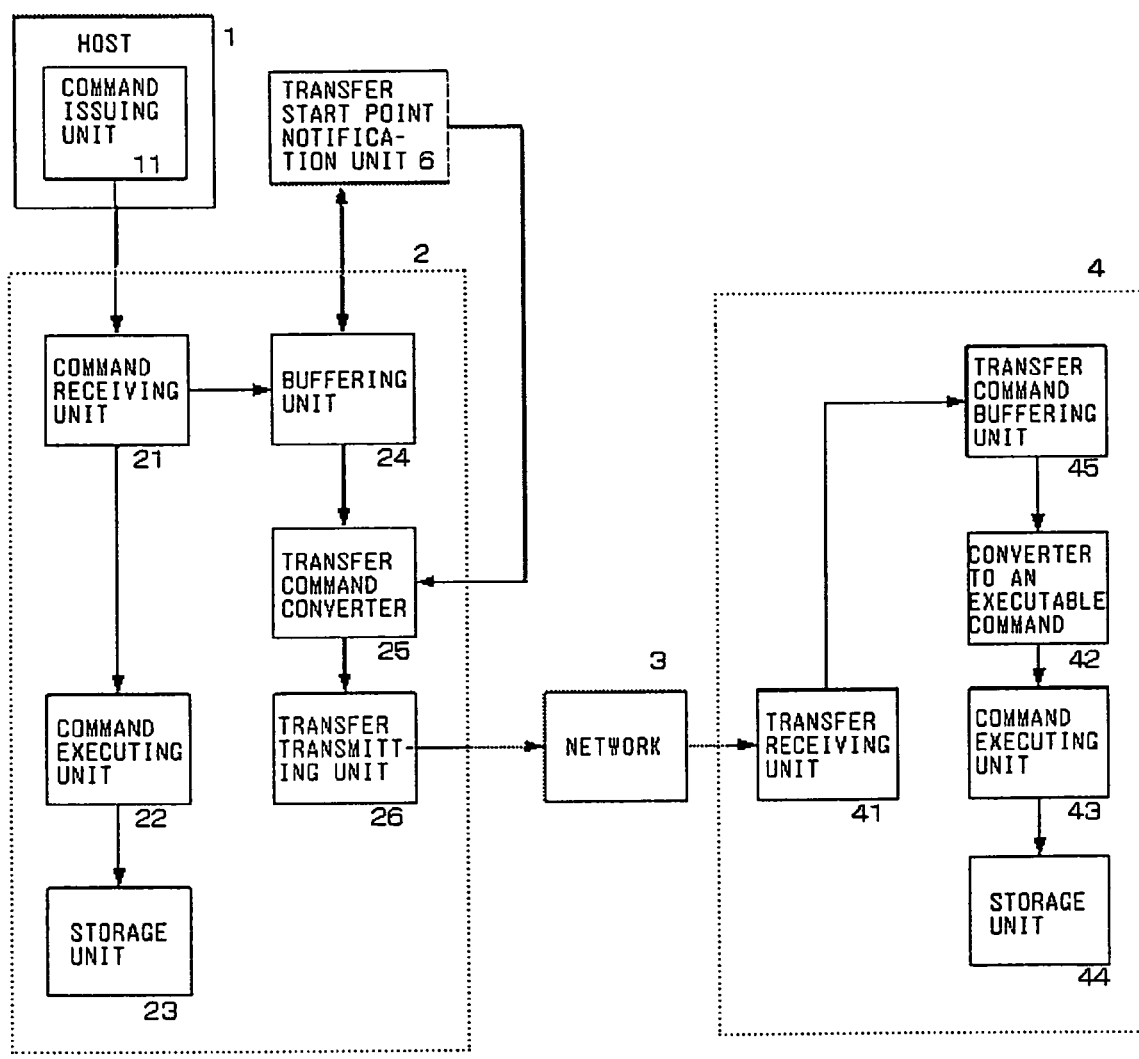
FIG. 22 is a block diagram showing the configuration in which transfer processing start point notifying unit 6 has been added in the third modification of the first embodiment of the present invention.

With the configuration shown in FIG. 22, a transfer start point notification unit 6 may notify the timing for starting the transfer processing. For example, the transfer processing may be started at a time point when a command that can be reduced has been stored in the buffering unit 24, as shown in FIGS. 8, 11 and 14.

The configuration of the third modification, shown in FIG. 22, differs from that of the first embodiment, shown in FIG. 22, in that there is provided a transfer start point notification unit 6. Hence, only this point will be described.

The transfer start point notification unit 6 has the function of notifying the transfer start point to the transfer command converter 25. The transfer start point notification unit 6 is capable of detecting the state of the buffering unit 24 to decide on the transfer timing.

The transfer start point notification unit 6 may be run on the host 1, in the storage system 2 or in a totally different device. The database run on the host 1 or the application may own the function, or the transfer start point notification unit may be a terminal to which a human operator issued definite instructions.

The operation and the meritorious effect of the present third modification will now be described. There may be obtained the following operation and the meritorious effect, in addition to the meritorious effect of the first embodiment.

If, in the present third modification, the execution of command in the storage unit 44 of the storage system 4 is suspended until the totality of commands ahead of the partition 246 is in order in the buffering unit 45 of the storage system 4, it is possible to guarantee the coincidence of logical data between the storage units 23 and 44 at the instant of the transfer momentum timing.

With the present third modification, the data transfer processing may be carried out at a timing the set of commands that may allow reduction in the amount of data transfer has been stored in the buffering unit 24. Hence, the meritorious effect of diminishing the amount of data transfer may be achieved as the follow-up delay of the storage unit 44 of the storage system 4 with respect to the storage unit 23 of the storage system 2 is reduced to a minimum.

Moreover, in the processing in the storage system 4, the command sequence of the set of commands stored in the transfer command buffering unit 45 may be interchanged between neighboring transfer momentum timings. Consequently, there is no necessity for guaranteeing the transfer sequence between neighboring transfer momentum timings in the transfer processing from the storage system 2, and hence the transfer may be carried out in accordance with a transfer system having superior transfer efficiency.

It is noted that the processing of changing the command sequence of the set of commands, stored in the transfer command buffering unit 45, between neighboring transfer momentum timings, in the storage processing in the storage system 4, needs to be carried out only insofar as there is the relationship of interdependence between the commands. The result is the relieved load in the sequence changing operations.

Fourth Modification of the First Embodiment

A fourth modification of the first embodiment of the present invention will now be described. The configuration of the fourth modification of the first embodiment of the present invention is similar to that of the first embodiment shown in FIGS. 1 and 2 and hence the corresponding explanation is dispensed with.

In the present modification, the command issuing unit 11 of the host 1 sends a command for notifying the timing, specifying a re-startable point, in addition to the commands for the storage system 2. The 're-startable point' means a time point convenient for re-starting in case the application and the operating system of the host 1 have been halted by some trouble. More specifically, it denotes a time point when the data stored in the storage system 2 are not in need of processing for re-creation or re-construction at a re-start time. In case services are re-started from the state in which the storage system has stored the data at the re-startable time point, the services may be re-started at an earlier time than if the services are re-started from the data at a time point other than the re-startable time point.

The host 1 issues a notification on the re-startable time point via command issuing unit 11. An example of the timing the notification on the re-startable time point is issued is the following. First, the application or the middleware on the host 1 incorporates the timing in the program to issue the notification. Moreover, in case the host 1 operates on plural CPUs or processes, the timing the notification on the re-startable time point may be issued at a timing when the barrier processing has been carried out on the storage unit or at a timing when the Semaphore value has been changed.

If the file or the storage area, decided on at the re-startable time point, is accessed, the re-startable time point may be notified at a timing when the file has been accessed.

If the file or the storage area, decided on at the re-startable time point, performs the processing, the re-startable time point may be notified at a timing when the process has come into operation.

Taking a database as an example, the timing when the journal log has been written is the timing when a commit command has been issued in an upper-order application, and may be thought of as being a re-startable time point. Hence, a notification for the re-startable time point is made when the write has occurred in the journal log file or in the volume or file in which the journal log file is stored.

Or, the notification for the re-startable time point may be made when the process of writing in the journal log file has come into operation.

Figure 23:
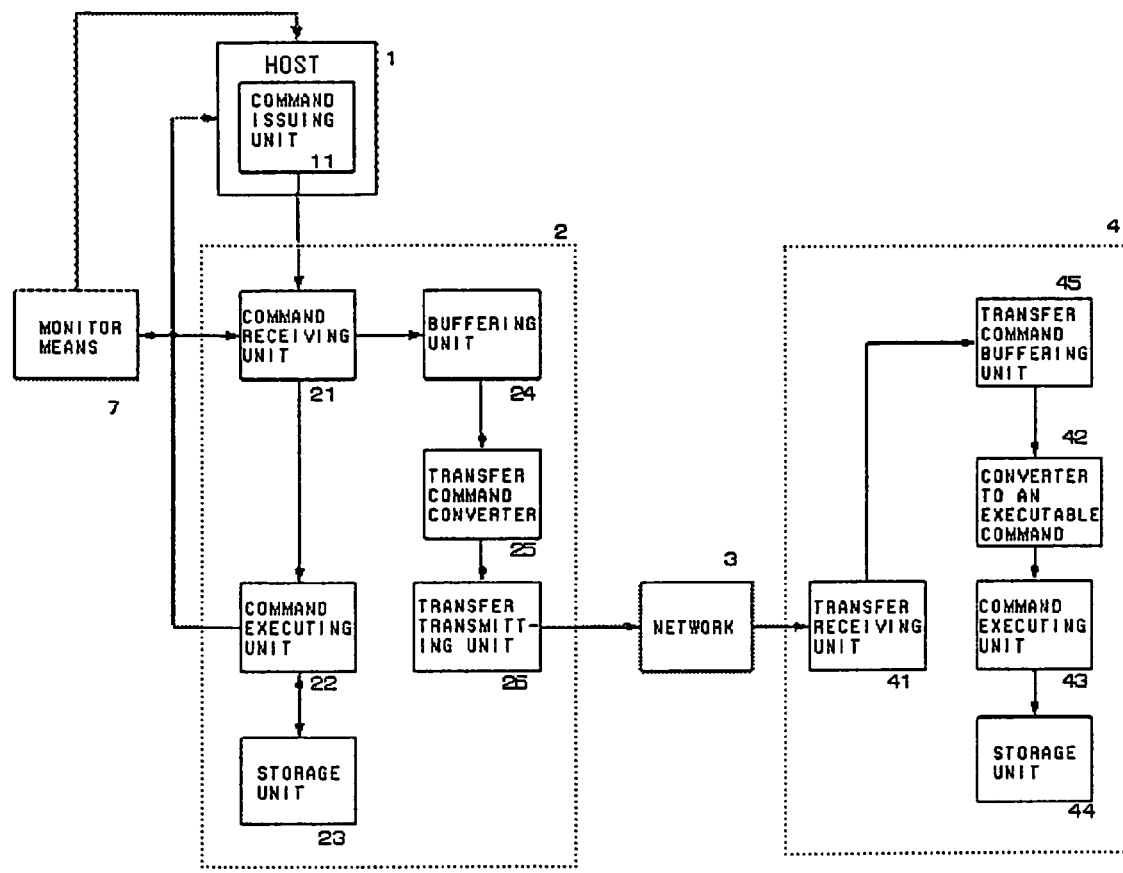
FIG. 23 is a block diagram showing the configuration in which monitor means 7 has been added in a fourth modification of the first embodiment of the present invention.

Alternatively, the notification for the re-startable time point may be made by a command issued by the command issuing unit 11 of the host 1. In this case, the configuration of the storage system, shown in FIG. 23, is used. Since the configuration of FIG. 23 differs from that of FIG. 2 in having a monitor means 7, this point is now described.

The monitor means 7 has the function of monitoring the operation of the host 1 or the command received by the command receiving unit 21 to recognize the re-startable time point to issue a notification of the re-startable time point. The monitor means 7 may be in operation within the host 1, on the storage system 2 or in other locations.

The monitor means 7 detects the aforementioned re-startable time point and issues a notification of the re-startable time point to the command receiving unit 21. For example, the monitor means 7 monitors the command issued by the host 1 and received by the command receiving unit 21 to insert a notification of the re-startable time point after occurrence of the command accessing a file (or a storage area). The monitor means 7 may also operate for notifying the re-startable time point on detection of a command which generates writing in the journal log.

The monitor means 7 may also monitor the process of the host 1. If the time is the re-startable time point when a given process has come into operation, the notification of the re-startable time point is made by the monitor means 7 at that time point.

Figure 24:
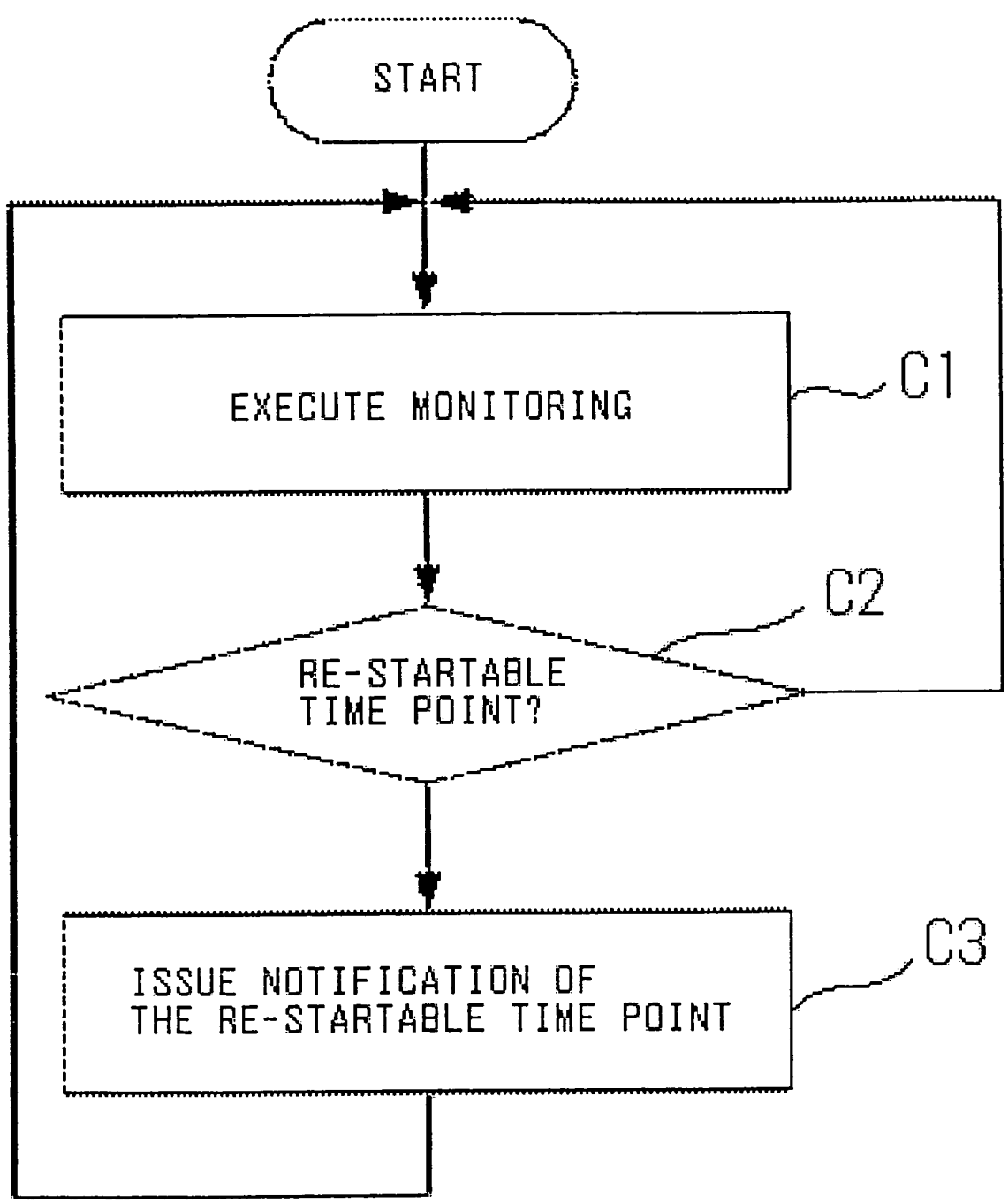
FIG. 24 is a flowchart fir illustrating the operation of monitor means 7 in the fourth modification of the first embodiment of the present invention.

The flow of the operations of the monitor means 7 will now be described with reference to FIG. 24.

First, the monitor means 7 monitors the object to be monitored (step C1). This object under monitoring is e.g. the command issuing unit 11 or the host 1. It may also be another unit, such as buffering unit 24. From the behavior of the object to be monitored, the monitor means 7 verifies whether or not the timing is the re-startable time point (step C2). If the timing is not the re-startable time point, the monitor means again monitors the object to be monitored. If it is determined that the timing is the re-startable time point, the monitor means issues a notification of the re-startable time point to the command receiving unit 21 (step C3).

The operation of the storage system 2 of the source of replication is now described with reference to FIG. 3. The operation of the storage system 2 is basically the same as that of the first embodiment shown in FIG. 3. The processing differs by the presence of the notification of the re-startable time point, as now described. Basically, the notification of the re-star-table time point may be handled as a normal command. In the step A2, the command executing unit 22 may carry out no processing on receipt of the notification of the re-startable time point, or may carry out the processing of taking a snapshot in the storage unit 23.

On the other hand, the notification of the re-startable time point is needed for transfer processing and hence has to be stored in the buffering unit 24. Similarly to the ordinary command that needs to be transferred, this processing of simply storing the command in the buffering unit 24 in the step A3 suffices. As for the timing for starting the transfer processing, the notification of the re-startable time point is exploited. If the notification of the re-startable time point has been stored in the buffering unit 24, the transfer processing is started.

The transfer processing of the step A5 will now be described.

Figure 25:
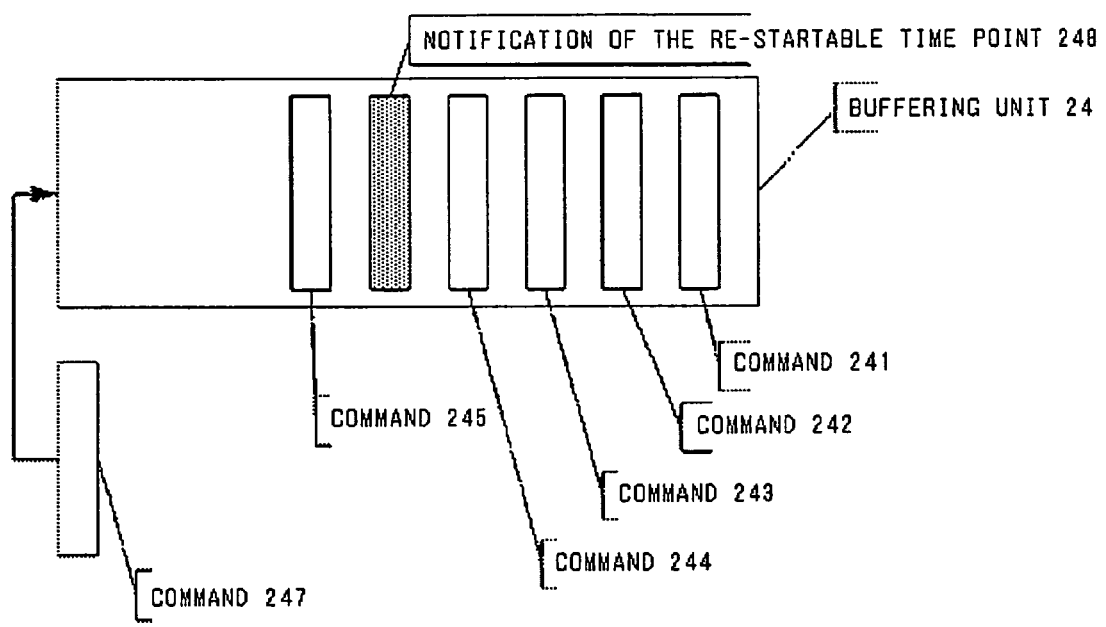
FIG. 25 illustrates an exemplary command stored in the buffering unit 24 in the transfer processing in the fourth modification of the first embodiment of the present invention.

It is assumed that a command shown in FIG. 25 has been stored in the buffering unit 24, and that the commands 241, 242 are converted into a command for transfer 249 which is transferred. The transfer processing is initiated at a stage where a notification of the re-startable time point 248 has arrived. Referring to FIG. 25, in case the command 245 has arrived after the notification of the re-startable time point 248, the command 245 is not transmitted for the current transfer processing. The command is controlled so as to be transferred when next the notification of the re-startable time point has arrived. For example, if the commands 245 and 244 undergoes conversion, the processing for conversion is not carried out.

Figure 26:
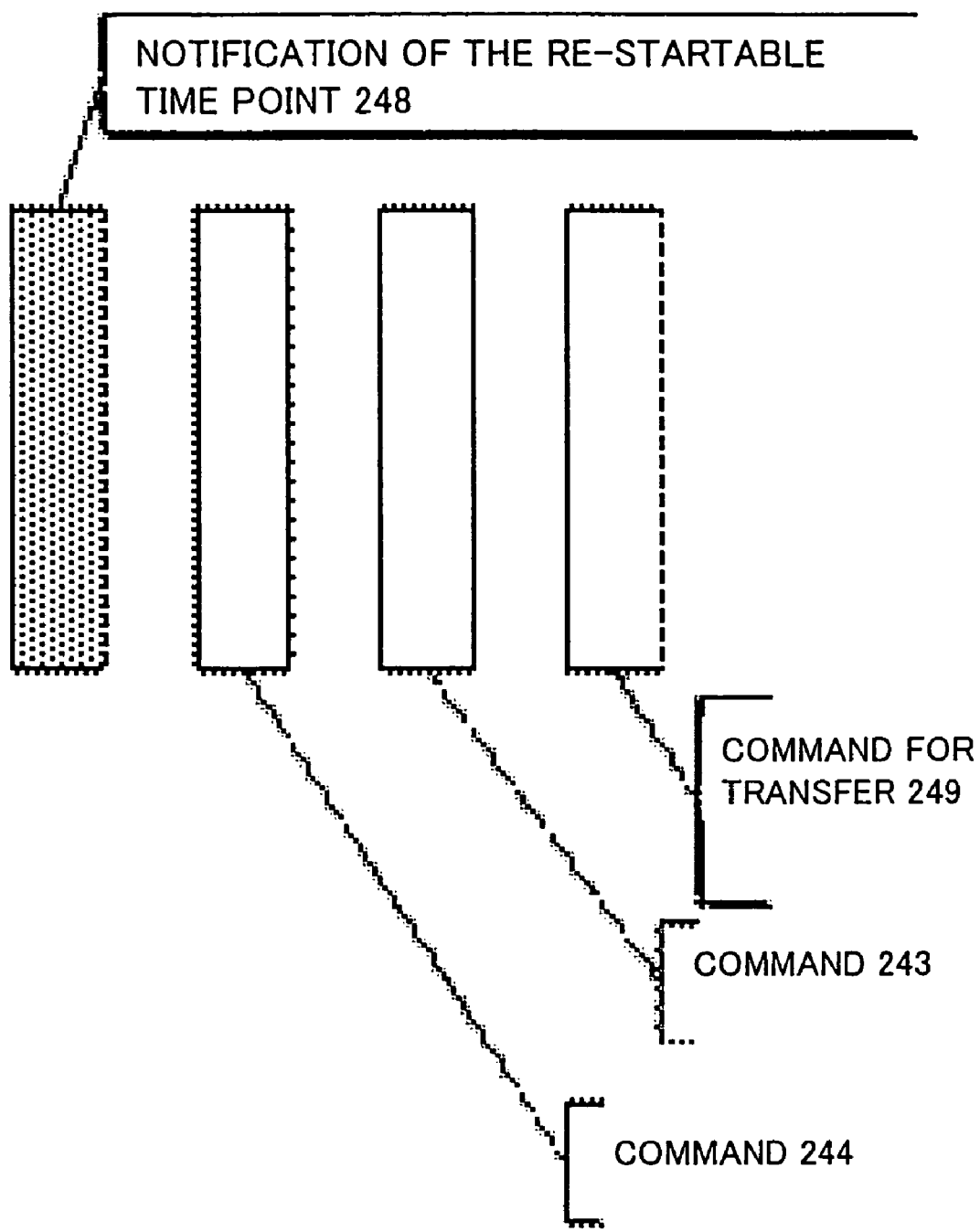
FIG. 26 shows a set of commands when the commands of FIG. 25 are transferred in the transfer processing in the fourth modification of the first embodiment of the present invention.

Hence, the command to be transferred is the command shown in FIG. 26. In the present instance, it is assumed that the transfer has been carried out in this sequence.

The processing flow of the storage system 4 of the destination of replication is shown in FIG. 6. The processing in the storage system 4 is the same as that in the first embodiment with the exception of the processing for the re-startable time point.

Figure 27:
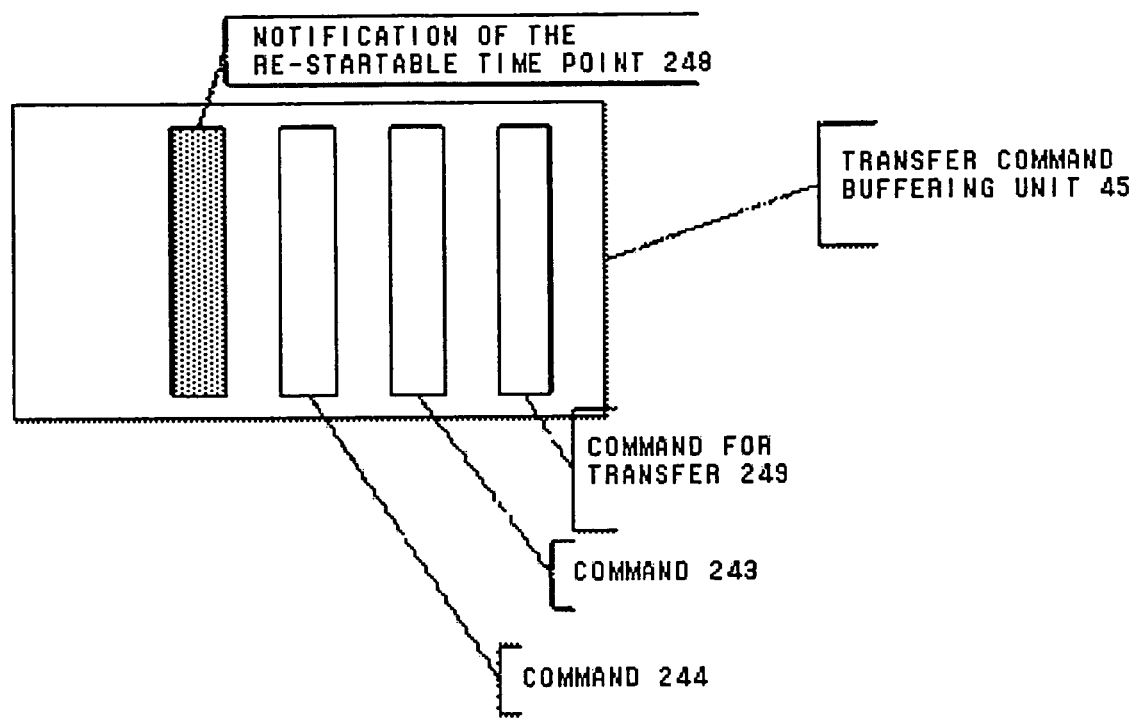
FIG. 27 shows the state of a transfer command buffering unit 45 on receipt of the command shown in FIG. 26 in the transfer processing in the fourth modification of the first embodiment of the present invention.
Figure 28:
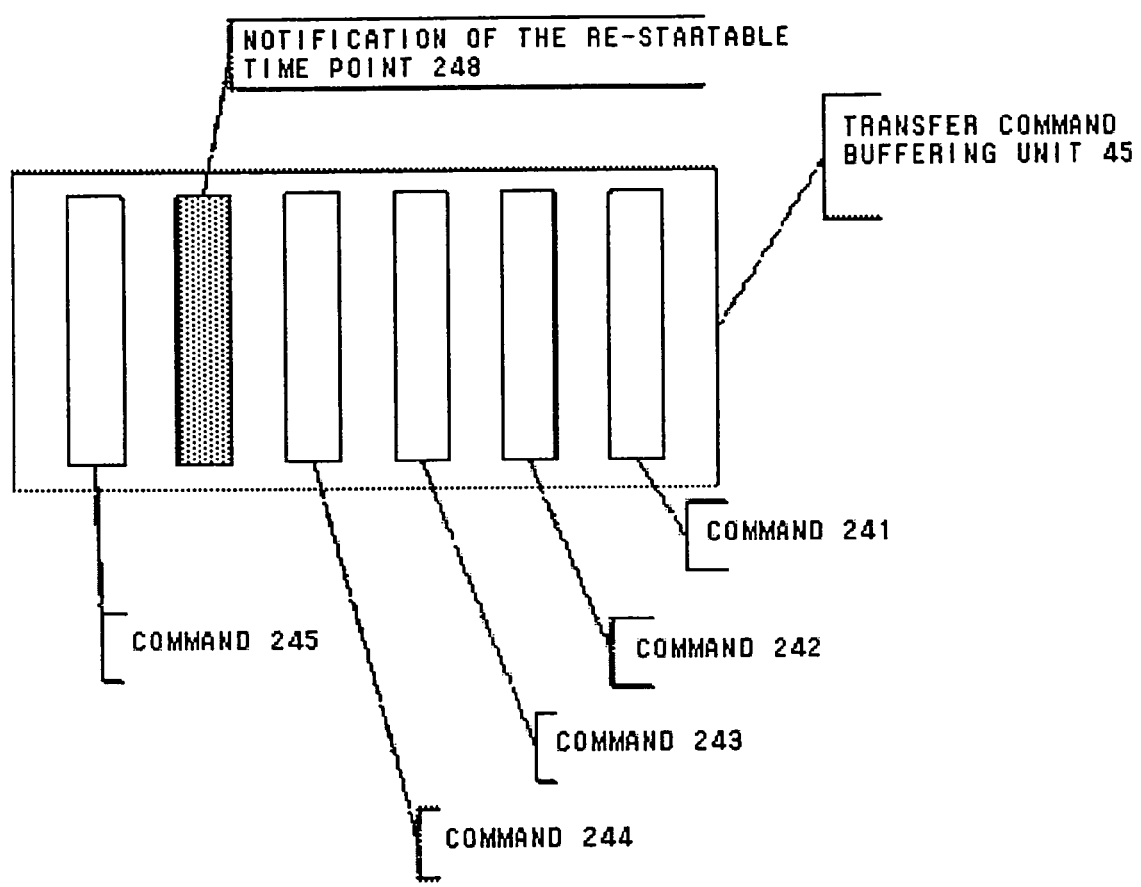
FIG. 28 shows the state of restoration of the command of FIG. 27 in the transfer processing in the fourth modification of the first embodiment of the present invention.

The processing of the step B2 is now described with reference to FIGS. 27 and 28. When the command shown in FIG. 26 has been transferred, the command received is stored in the transfer command buffering unit 45, as shown in FIG. 27. The command for transfer 249 is converted and restored to the original commands which are then stored in the storage unit 44. FIG. 28 shows a set of commands restored from the set of commands of FIG. 27. Although the commands converted 241, 242 are returned again to the transfer command buffering unit 45, this is not mandatory and the commands converted may directly be stored.

If, in carrying out the processing of the step B2, the commands received until the time point of receipt of the notification of the re-startable time point are stored, after receipt of the notification, in place of sequentially storing the commands after arrival of the command for transfer, the state of the re-startable time point may be guaranteed even in a storage system not having the snapshot function. Since the storage system 4 necessarily holds data at the re-startable time point, quick re-start may be achieved in case of re-starting the application using the storage system 4.

If the processing for storage is carried out sequentially, data are saved in the storage system 4 as matching is not assured as the storage processing proceeds.

On the other hand, data are retained in the storage system 4 at a timing other than the re-startable time point, such that much time is taken until services are re-started by the storage system 4.

Such a case is described in which, in converting commands in the step A5, the commands 241 and 243 undergo conversion. It is assumed that the commands 241 and 243 are converted into a command for transfer 250.

Figure 29:
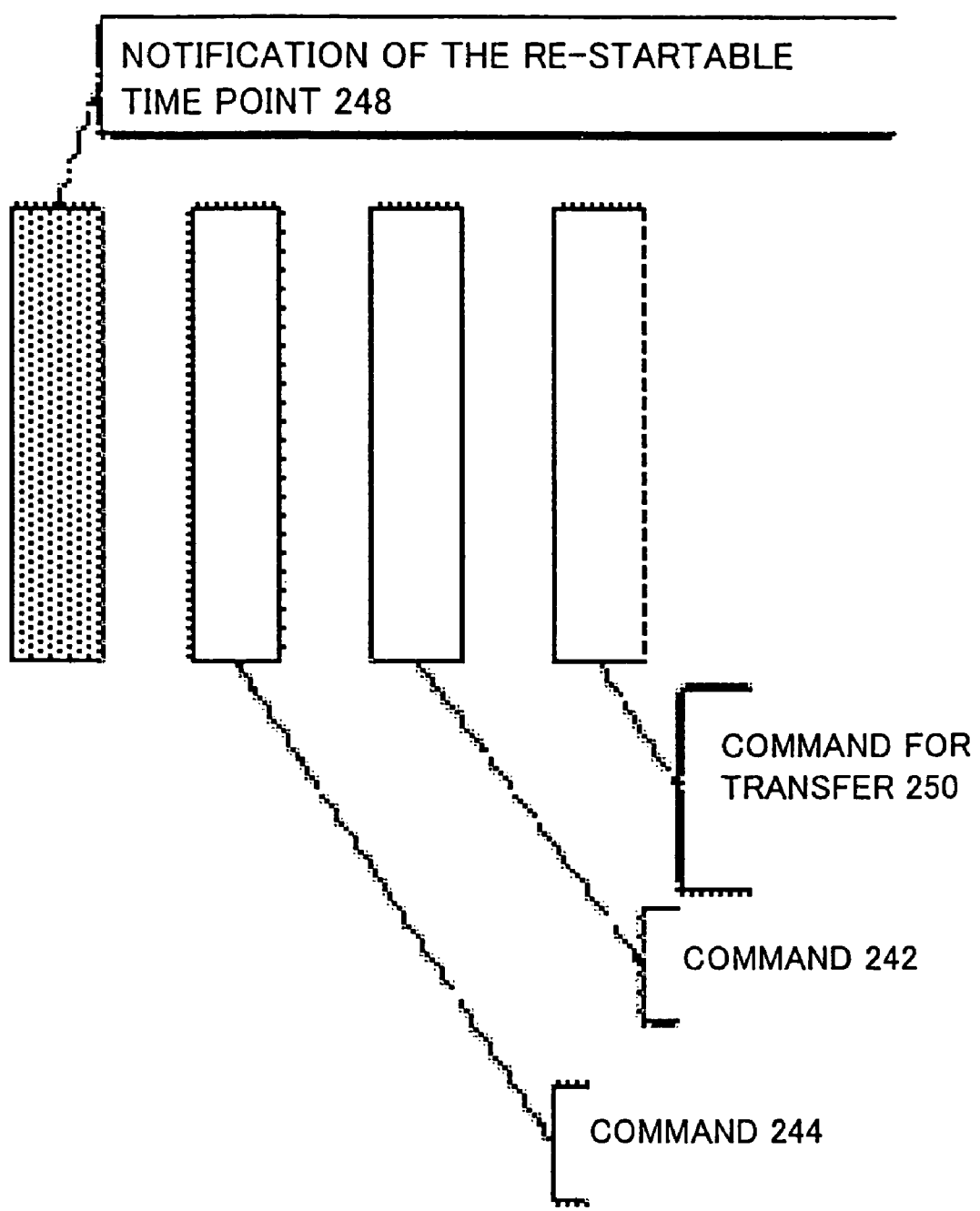
FIG. 29 shows a case where commands 241 and 243 were commands for conversion when transferring the command of FIG. 25 in the transfer processing in the in the fourth modification of the first embodiment of the present invention.
Figure 30:
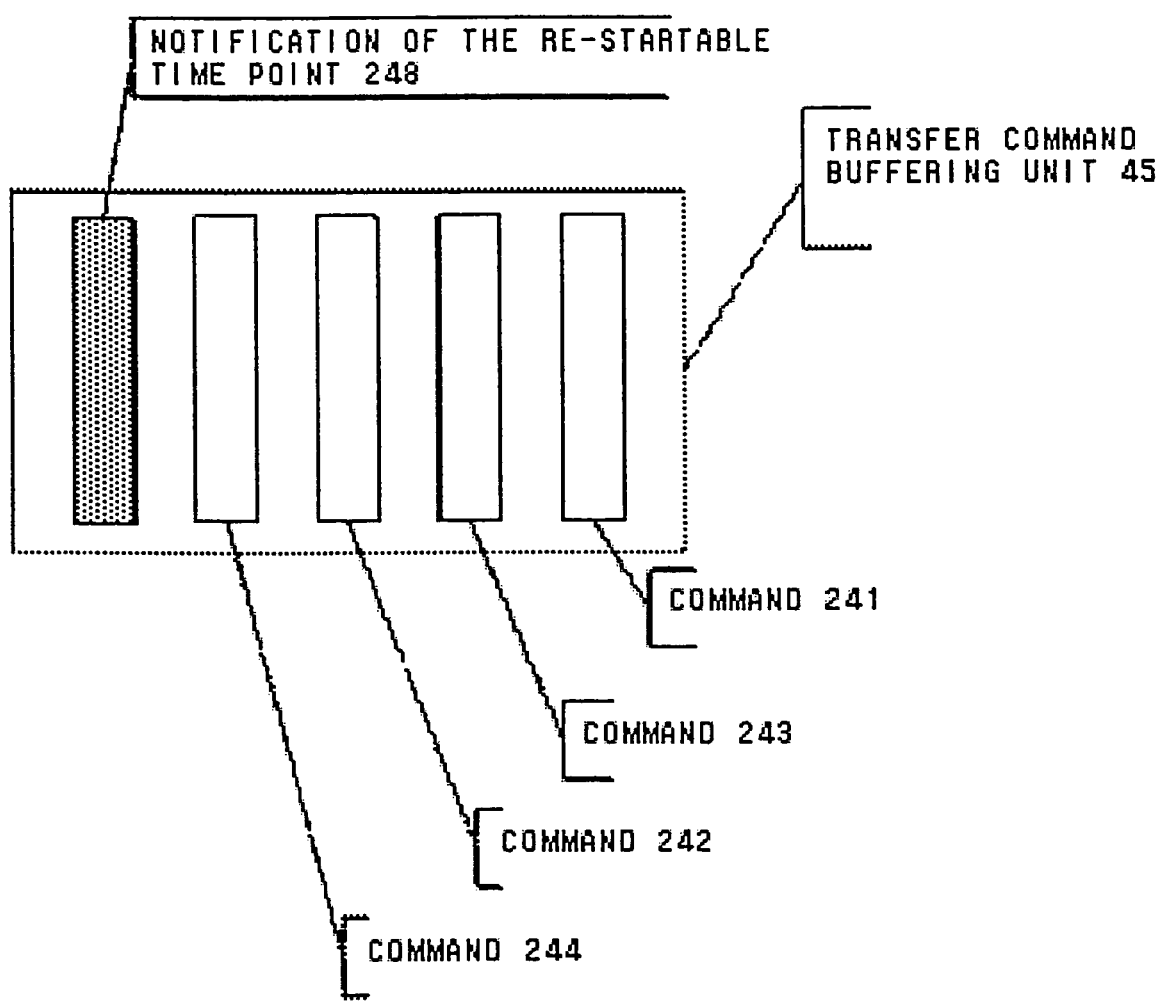
FIG. 30 shows a set of commands in case of restoration of the command of FIG. 29 in a step B2 in the transfer processing in the fourth modification of the first embodiment of the present invention.

The set of commands of FIG. 25 is then converted as shown in FIG. 29 and transferred. It is assumed that, when the commands of FIG. 29 have been transferred to the storage system 4, the command for transfer 250 is converted into the original commands 241 and 243. The state of the transfer command buffering unit 45, following the conversion in the step B2, is as shown in FIG. 30.

This state differs from the state shown in FIG. 25 in the command sequence. If, in this case, there is no relationship of interdependence between the commands 243 and 242, such as by being written in different storage locations, there is no necessity for interchanging the sequence of the commands 243 and 242 as long as the commands up to the re-startable time point 48 have been transferred in their entirety to the storage system 4.

However, should there be the relationship of interdependence between the commands 243 and 242, such as by being written in the same storage locations, the commands 243 and 242 need to be interchanged in their sequence.

In this case, the command sequence needs to be changed. It is sufficient in this case to add the information on the command sequence in the command for transfer or to add the information on the command sequence in the notification of the re-startable time point.

A variant of the transfer system in the step A5 will now be described. In the present modification, conversion and transfer are carried out, if necessary, for the commands up to the re-startable time point, on arrival of the notification of the re-startable time point.

Figure 31:
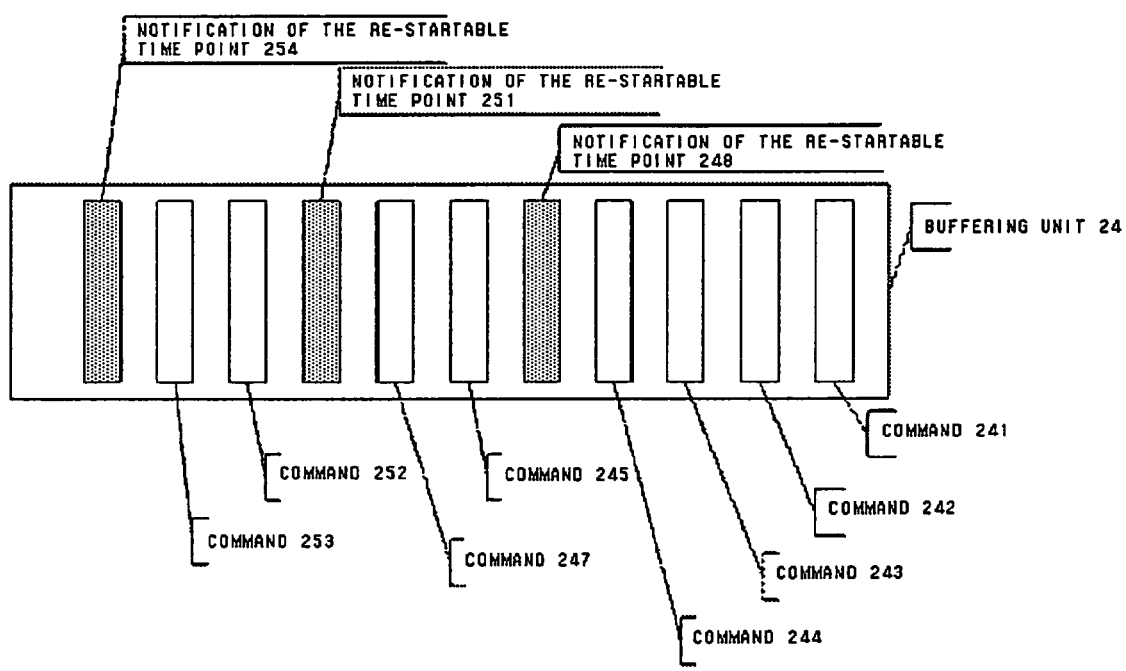
FIG. 31 shows a case where plural re-startable point notifications have been stored in the buffering unit 24 in the transfer processing in the fourth modification of the first embodiment of the present invention.

However, there is a probability that plural notifications of the re-startable time point may arrive as the first transfer processing is being carried out, as shown in FIG. 31. There are plural transfer systems for such case. An example where the set of commands shown in FIG. 31 is present in the buffering unit 24 is now described as an example.

Initially, the regular system is described. After transferring the commands ahead of the notification of the re-startable time point 248 (commands 241, 242, 243, and 244), the commands ahead of a notification of the re-startable time point 251 (commands 245 and 247), are transferred, and subsequently the commands ahead of a notification of the re-startable time point 254 (commands 252 and 253) are transferred.

The following system may also be used, only by way of illustration. The notifications of the re-startable time points 248 and 251 are ignored and the commands up to the notification of the re-startable time point 254 (commands 241, 242, 243, 244, 245, 247, 252, and 253) are handled as a set of commands for processing. In a regular system, if the commands 243, 245 have been converted into a command for transfer, this command for transfer cannot be converted. This conversion is possible with the present embodiment, thus assuring a higher efficacy in reducing the amount of data transfer.

The following system may also be used, only by way of illustration. The commands up to the notification of the re-startable time point 248 (commands 241, 242, 243, and 244) are initially transferred. On arrival subsequently of the notification of the re-startable time point 251, the commands up to the notification of the re-startable time point 251 (commands 241, 242, 243, 244, 245, and 247) are separately transmitted. On arrival subsequently of the notification of the re-startable time point 254, the commands as from the notification of the re-startable time point 248 until the notification of the re-startable time point 254 (commands 245, 247, 252 and 253) are separately transmitted, in case the initial transfer processing (up to the notification of the re-startable time point 248) has come to a close and the second transfer processing (up to the notification of the re-startable time point 251) has not come to a close when the notification of the re-startable time point 254 has arrived.

In the processing for storage of the step B2, processing for storage may be carried out as processing waits for the incoming of the notification of the re-startable time point 254, when the command of FIG. 31 is transmitted, in place of sequentially carrying out the storage processing up to each notification of the re-startable time point.

The operation and the meritorious effect of the fourth modification of the first embodiment is now described. The present modification has the following operation and meritorious effects, in addition to the operation and meritorious effects derived from the aforementioned first embodiment.

In the present fourth modification, in which data in the re-startable time point is held in the storage system 4, the processing for data reconstruction is unneeded in re-starting services in the storage system 4, with the consequence that the services may be re-initiated more promptly than with the conventional system.

The set of commands up to the notification of the re-startable time point may be sent in any suitable order as long as there is no relationship of interdependence among the commands, thus assuring transfer with high efficiency.

The restartable storage unit state may reliably be restored in the storage of the destination of replication by carrying out storage after confirmation of receipt up to the notification of the re-startable time point.

By having the notification of the re-startable time point issued by the application of the host 1, it is possible to get the storage state in the storage systems at a timing convenient for the application.

Moreover, the monitor means 7 may verify the timing, as a re-startable time point for the application, to make a notification, without the host 1 issuing the notification of the re-startable time point. This may be achieved by detecting the operation or the command pattern of the host 1.

If, in the transfer processing from the storage 2, a plural number of the notifications of the re-startable time point has been stored in the buffering unit 24, these may be collected together and transferred in a lump. Hence, there is the possibility of doing more conversion processing operations to reduce the amount of data transfer.

Moreover, in the present modification, the storage processing may be carried out in the buffering unit 45 as the command sequence of the set of commands up to the notification of the re-startable time point is adjusted in the storage processing in the storage system 4. Hence, there is no particular limitation in the transfer sequence between the re-startable time points in the transfer processing from the storage system 2, so that transfer may be carried out with a more satisfactory transfer order.

Fifth Modification of the First Embodiment

A fifth modification of the first embodiment is now described. The configuration of the first embodiment is shown in FIGS. 32 and 33.

Figure 32:
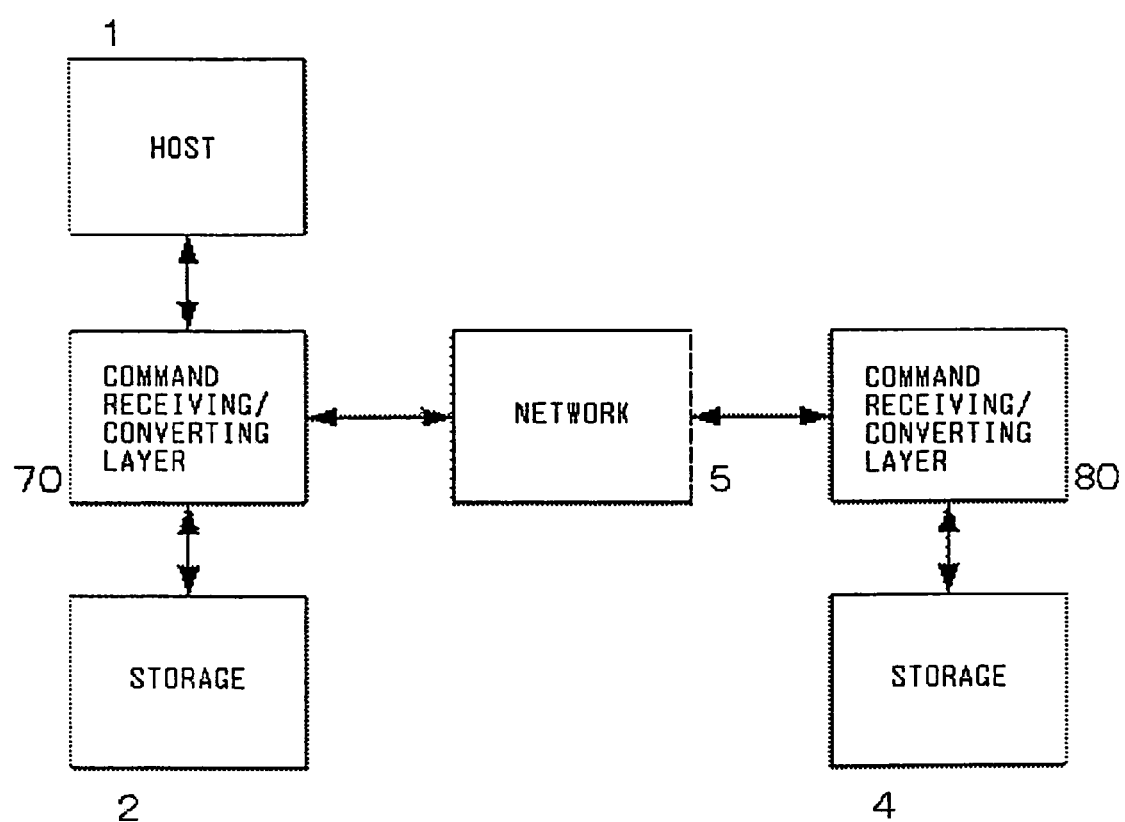
FIG. 32 is a block diagram showing an overall configuration of a fifth modification of the first embodiment of the present invention.
Figure 33:
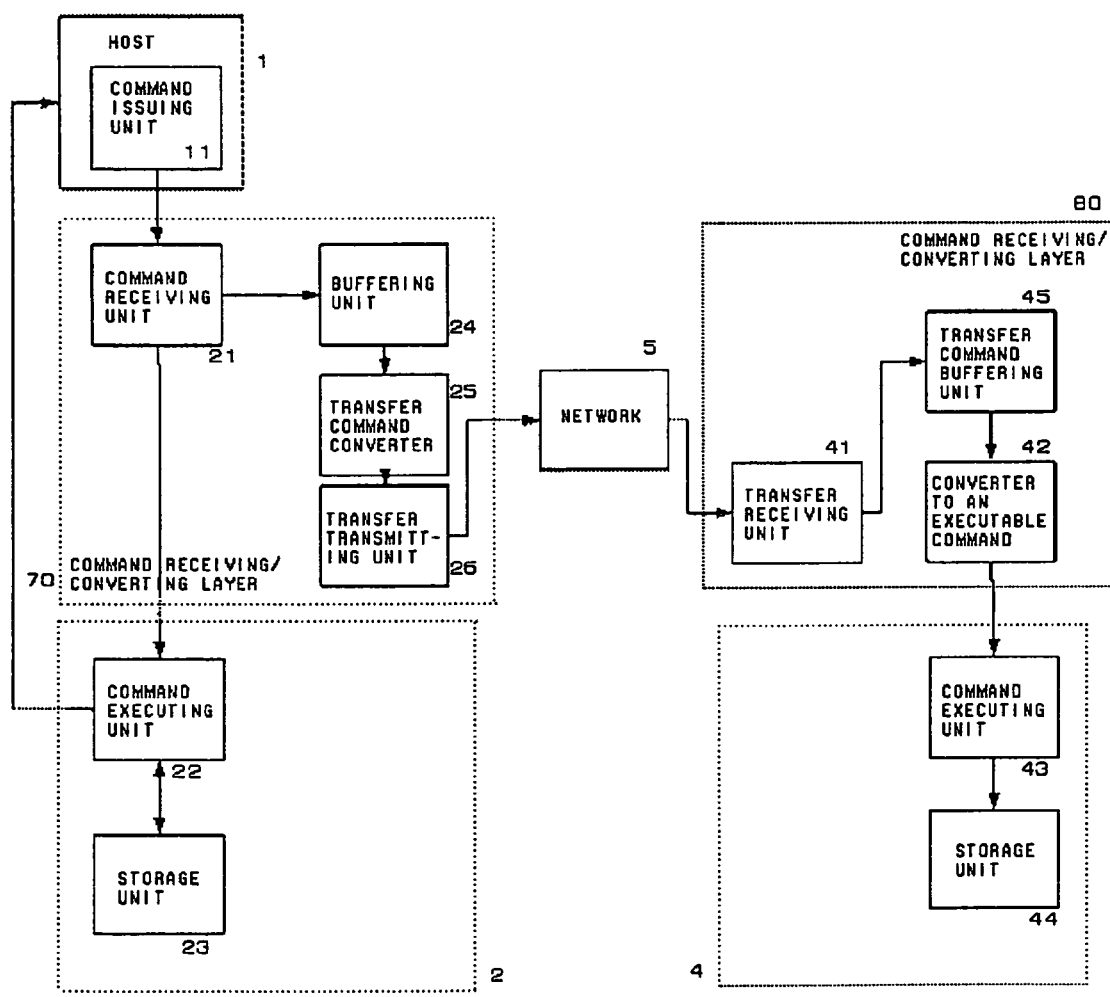
FIG. 33 is a block diagram showing the configuration of a host and storage systems in the fifth modification of the first embodiment of the present invention.

FIG. 32 shows the overall configuration of the fifth modification of the first embodiment. Referring to FIG. 32, the present modification comprises a host 1, a storage system 2 of the source of replication, a storage system 4 of the destination of replication, a network 5, a command receiving/converting layer 70, and a command receiving/converting layer 80. The overall system is a computer system capable of providing the same functions as those of the first embodiment. The present system differs from the first embodiment of FIG. 1 in that the command receiving/converting layer 70 is provided between the host 1 and the storage system 2, and also in that connection across the storage system 2 and the storage system 4 is via the command receiving/converting layer 70, network 5 and the command receiving/converting layer 80.

The host 1, the storage system 2 of the source of replication, sometimes referred to below as 'storage 2', and the storage system 4 of the destination of replication, sometimes referred to below as 'storage 4', are the same as those of the above-described first embodiment and hence the explanation is dispensed with.

The network 5 is similar to the network 3 with the exception that the network 5 is interconnecting the command receiving/converting layer 70 and the command receiving/converting layer 80. The network components, used in the network 5, include those interconnecting the storage systems, interconnecting the computers, and interconnecting the computers and switches. Specifically, these network components may be enumerated by internal buses interconnecting the computers, Ethernet (registered trademark), INFINIBAND and wireless networks.

FIG. 33 shows the detailed structure of the fifth modification of the first embodiment. Referring to FIG. 33, the command receiving/converting layer 70 and the command receiving/converting layer 80 play a part of the roll of the storage systems 2 and 4 in the configuration of the first embodiment shown in FIG. 2.

The command receiving/converting layer 70 includes the command receiving unit 21, buffering unit 24, transfer command converter 25 and the transfer transmitting unit 26 which are the same as those included in the storage system 2 in the configuration of the first embodiment.

The storage system 2 in the fifth modification includes only the command executing unit 22 and the storage unit 23. The command executing unit 22 is connected to the host 1 via a route over which the host 1 returns the result of execution of a command, such as WRITE command, issued by the host 1 for the storage system 2. Although the result of execution of the command may directly be returned to the host 1, the result may be returned to the host via the command receiving/converting layer 70.

The command receiving/converting layer 80 includes the transfer receiving unit 41 and the converter to an executable command 42 which are the same as those included in the storage system 4 in the first embodiment.

On the other hand, the storage system 4 in the fifth modification includes only the command executing unit 43 and the storage unit 44.

The command receiving/converting layers 70 and 80 may perform their functions in any device or program between the application and the storage system of the host 1. For example, the switch devices of a fiber channel or the Ethernet (registered trademark) may perform the role of the command receiving/converting layers 70 and 80. The command receiving/converting layers may also be implemented by the database software, volume manager, file system, operating system or the storage system. The command receiving/converting layers 70 and 80 may also be implemented in the storage systems, as in the configuration of the first embodiment.

The flow of operations of the fifth modification of the first embodiment is similar to that of the first embodiment described in FIGS. 3, 6 and 7 and hence is not described here specifically.

The operation and the meritorious effects of the fifth modification of the first embodiment will now be described. The present fifth modification has the following operation and meritorious effects, in addition to those of the first embodiment and the first to fourth modifications.

In the present modification, the storage systems 2 and 4 simply receive normal storage access commands and perform the processing on the storage units to return the result. Hence, when incorporating the functions of the present invention, it is unnecessary to remodel the storage devices or to use special storage devices.

In the present modification, it is unnecessary to directly interconnect the storage systems 2 and 4 by a network, and hence the cost in network connection may be reduced.

Sixth Modification of the First Embodiment

Figure 34:
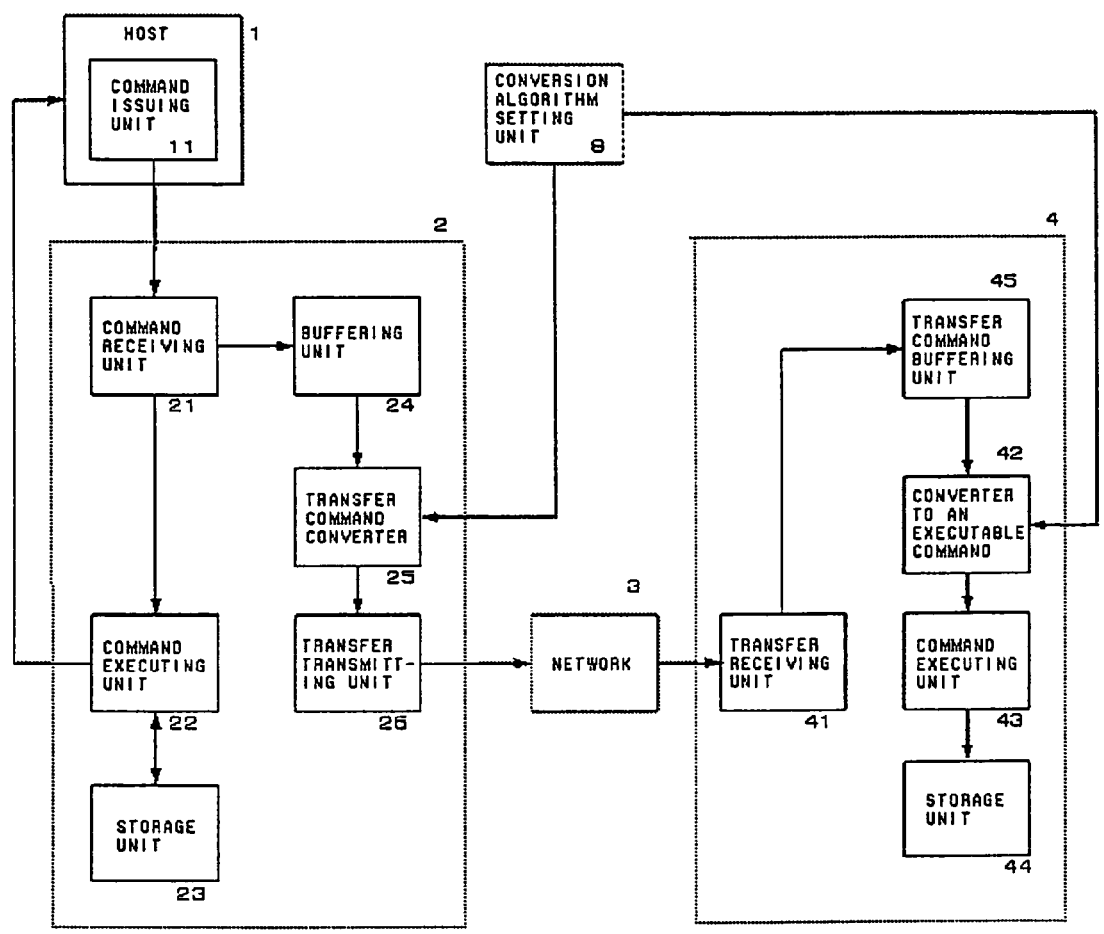
FIG. 34 is a block diagram showing the configuration of a sixth modification of the first embodiment of the present invention.

A sixth modification of the first embodiment is now described. The overall configuration of the present sixth modification of the first embodiment is the same as that of the first embodiment shown in FIG. 1 and hence is not described here specifically. FIG. 34 is a block diagram showing the detailed configuration.

The configuration shown in FIG. 34 differs from the detailed structure of the first embodiment, shown in FIG. 2, in having a conversion algorithm setting unit 8 for setting the conversion algorithm for the transfer command converter 25 and the executable command converter 42.

Although FIG. 34 is shown as a configuration annexed to the first embodiment, it may also be applied to the other modifications. For the converter to an executable command 42, a conversion algorithm setting unit 8 may separately be provided, or each one converter may be provided to the two layers, as shown in FIG. 33.

The processing flow shown in FIGS. 3, 6 and 7 is similar to that of the first embodiment and hence is not described here specifically.

The conversion algorithm setting unit 8 has the function of setting the conversion algorithm of the transfer command converter 25. This unit may be a computer program which sets the conversion algorithm when an administrator enters a command, or a tool which the user may set as policy, such as 'reduce overlapping WRITE data' or 'reduce transfer data of local copy processing'. It may also be run on the host 1, on the storage system 2, or on any other location, or may be built in, for example, a storage management software.

The conversion algorithm setting unit 8 may also be a computer program monitoring other statuses and autonomously controlling the operation of the transfer command converter 25 or the executable command converter 42.

For example, if the transfer command converter 25 includes several conversion algorithms, by the conversion algorithm setting unit 8, the administrator may select which of these conversion algorithms is to be executed. For example, setting may be made so that the conversion algorithm of the first embodiment is to be run and that of the first embodiment is not to be run.

The conversion algorithm may also be such that a computer program developed by the user may be installed by the conversion algorithm setting unit 8.

The transfer command converter 25 may also be such that which transfer momentum is to be used may be set. If transfer processing is to take place at a preset time interval, as in the third modification, which period is to be used is set by the conversion algorithm setting unit 8.

The conversion algorithm setting unit 8 may own the function of setting all parameters needed by the transfer command converter 25 or the executable command converter 42. For example, it is set to which volume the subject of the command for conversion as a write command is to be set.

The operation and meritorious effects of the sixth modification of the first embodiment will now be described.

With the present sixth modification, the system administrator may control the conversion algorithm or the transfer method.

With the present sixth modification, a conversion algorithm, developed individually, may be built into the transfer command converter 25.

With the present sixth modification, the administrator may set a policy to decide on the conversion algorithm used by the transfer command converter 25 or the executable command converter 42.

With the present sixth modification, the processing of the conversion algorithm may be performed in a shorter time by the administrator setting the parameter information which is needed for the operation of the conversion algorithm or which, if provided, will raise the efficiency of the processing.

Figure 35:
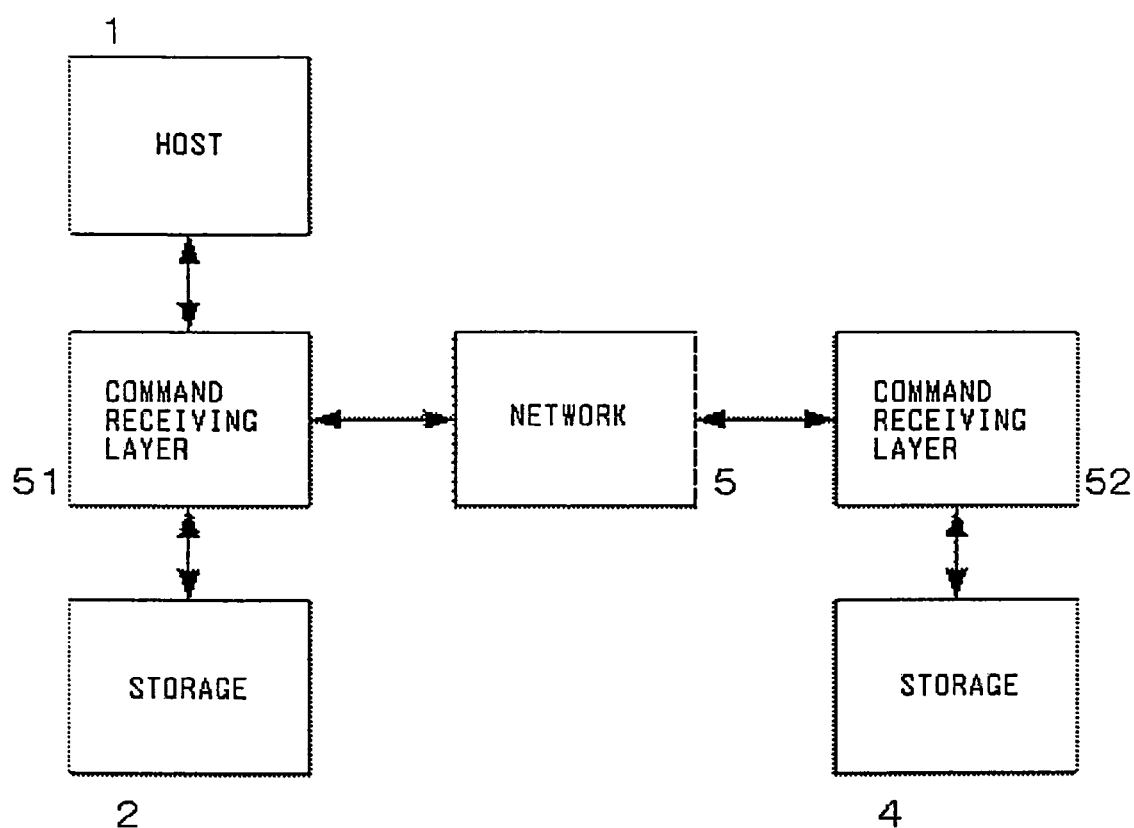
FIG. 35 is a block diagram showing the configuration of a second embodiment of the present invention.

A second embodiment of the present invention will be described with reference to the drawings. FIG. 35 is a block diagram showing the configuration of the replication system of the second embodiment of the present invention. Referring to FIG. 35, the system of the second embodiment of the present invention differs from the first embodiment shown in FIG. 1 in that a command receiving layer 51 is provided between the host 1 and the storage system 2, as the source of replication, sometimes referred to as 'storage' or 'storage system', and is connected to the network 5, and in that a command receiving layer 52 is connected to the storage system 4 as the destination of replication, sometimes referred to as 'storage' or 'storage system'.

The host 1 is a computer of the same configuration as that of the first embodiment, while the storage systems 2 and 4 are storage units which are the same as those of the first embodiment. Thus, the corresponding explanation is dispensed with.

The network 5 is a network interconnecting the hosts, interconnecting the hosts and the storage systems or interconnecting the storage systems, such as Internet or communication network, including dedicated lines, and may be the same as that described in the modification of the first embodiment. Thus, the corresponding explanation is dispensed with.

The command receiving layer 51 receives a command issued by the host 1 to issue the command to the storage system 2. Since the command issued by the host 1 is not necessarily executable by the storage system 2, it is converted into a command executable by the storage system 2, which command is issued. The command receiving layer 51 transfers the received command over the network 5 to the command receiving layer 52.

The command receiving layer 52 receives the command transferred from the command receiving layer 51. Similarly to the command receiving layer 51, the command receiving layer 52 converts the received command into a command executable by the storage system 4 to issue the latter command to the storage system 4.

The command receiving layers 51 and 52 may perform their functions in any device or program between the application of the host 1 and the storage system. For example, the switch devices of a fiber channel or the Ethernet (registered trademark) may perform the role of the command receiving/converting layers 70 and 80. The command receiving layers may be implemented by the database software, volume manager, file system, operating system or the virtual storage system. The command receiving/converting layers 70 and 80 may also be implemented in the storage systems, as in the configuration of the first embodiment.

There is no particular limitation to the protocol of the command received by the command receiving layer 51. It is possible to use protocols other than the protocol, in which the storage system is run on the block level, such as SCSI (Small Computer System Interface) or NFS (Network File System). That is, the storage systems 2 and 4 may be the NAS (Network Storage Systems) having a file system.

Figure 36:
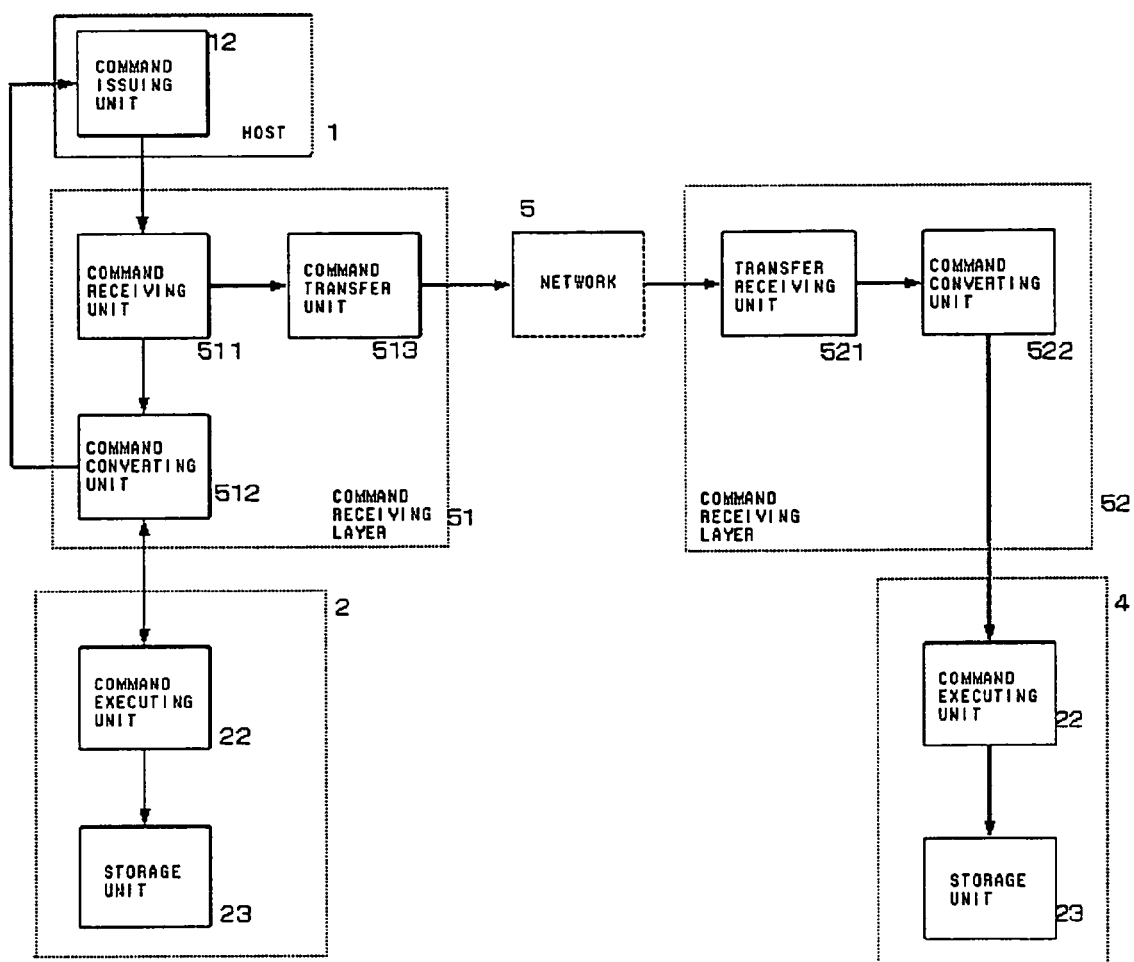
FIG. 36 is a block diagram showing the configuration of a host, storage systems and command receiving layers in the second embodiment of the present invention.

FIG. 36 is a block diagram showing the detailed configuration of the host, storage systems and the command receiving layers.

Referring to FIG. 36, the host 1 includes a command issuing unit 12. This command issuing unit 12 issues commands, pre-defined by the command receiving layer 51, in addition to commands, such as WRITE or READ, or other control commands, by the application, run on the host 1, middleware, such as database, or the operating system, run on the host 1.

The commands pre-defined by the command receiving layer 51 are now described. As described in the first embodiment, the application of the host 1, for example, may sometimes issue WRITE, which is redundant, in carrying out the replication. For example, the application of the host 1 may perform:

WRITE for software mirroring which writes the same data in plural locations (software mirroring WRITE processing) or local copying processing, which copies data, already present in the storage system 2, in other locations.

The host 1 may issue a command as usual and the replication system performs the processing in accordance with the command for the software mirroring WRITE processing or the local copying processing. In the software mirroring processing, the same data are transferred a plural number of times for replication. In the local copying processing, data transfer is carried out again even in case data to be copied is already present in the storage system of the destination of replication.

Instead of carrying out the above processing, a command for carrying out the software mirroring WRITE processing and a command for carrying out the local copying processing are pre-defined, in the present embodiment, and the host 1 issues the so defined command.

The command receiving layer 51 receives the so defined command and transmits the command as it is to the command receiving layer 52 on the storage system 4.

The command receiving layer 51 converts the command into a form executable by the storage system 2 to issue the so converted command to the storage system 2.

The so defined command is referred to below as 'storage access interface', abbreviated to 'SAI'. Although the above explanation has been made in connection with the software mirroring WRITE processing and the local copying processing, taken as examples, any suitable processing may be used which may be reduced in processing volume or transfer volume with SAI as compared to the command issued by the host 1 and transmitted to the storage of the destination of replication.

Since SAI has to be issued from the host 1 in accordance with a predetermined definition, it is definitely stated in e.g. a product manual. It is of course possible to set the SAI unique to the user based on program setting.

Figure 37:
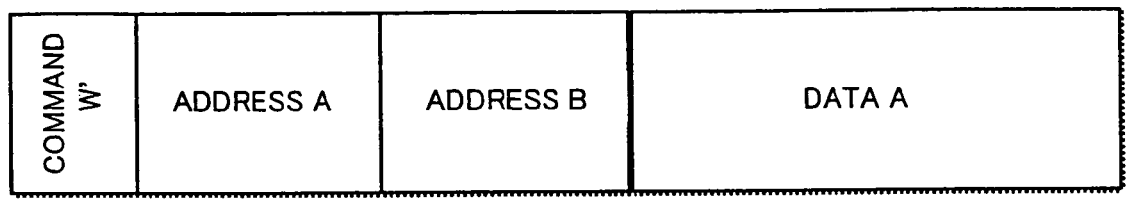
FIG. 37 is a diagram showing an example of SAI (software mirroring) in the second embodiment of the present invention.

FIG. 37 is a block diagram showing the concept of the SAI. The SAI concept shown in FIG. 37 is similar to the command format of FIG. 8 used in the first embodiment. FIG. 37 shows a command for carrying out software mirroring processing and data A is written (WRITE) in both the addresses A and B. When the host 1 issues a WRITE command without employing SAI, the command shown in FIG. 8 is usually issued.

Figure 38:
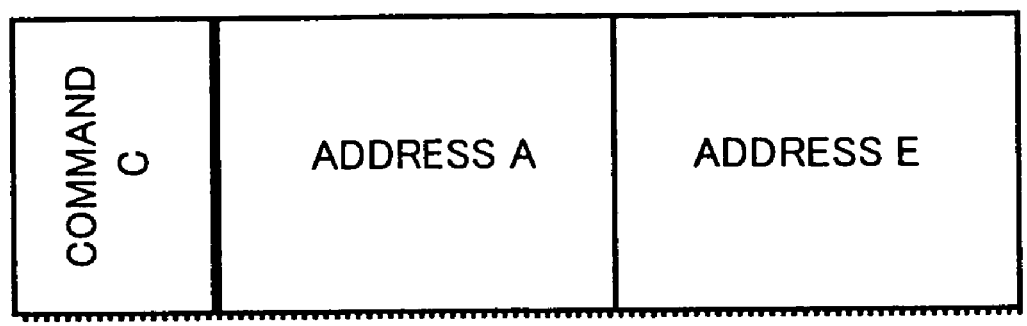
FIG. 38 is a diagram showing an example of SAI (processing of local copying) in the second embodiment of the present invention.
Figure 39A:
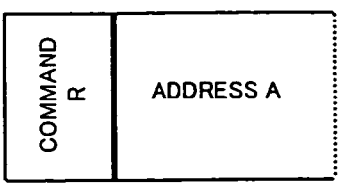
FIGS. 39A-39H are diagrams showing commands issued when a host 1 performs local copying processing in case of not employing the SAI of the present invention.
Figure 39B:
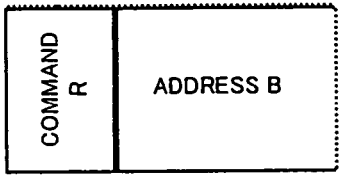
Figure 39C:
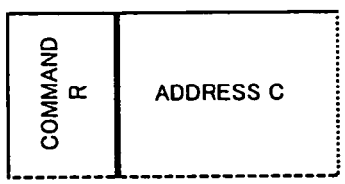
Figure 39D:
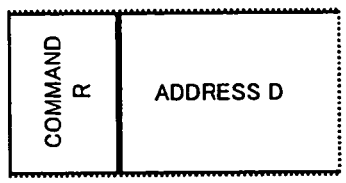
Figure 39E:
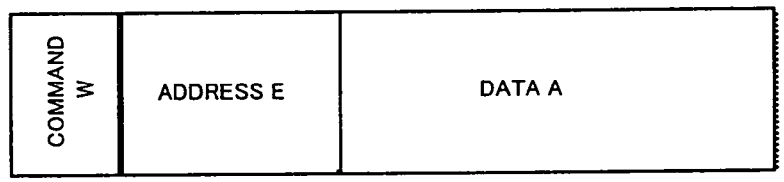
Figure 39F:
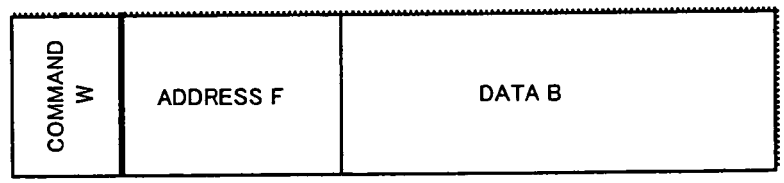
Figure 39G:
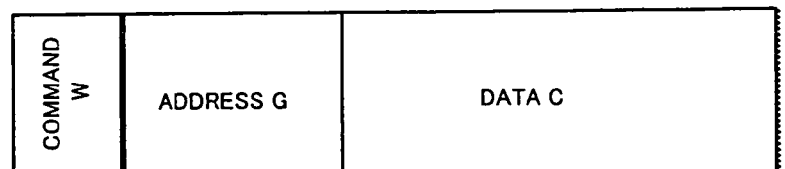
Figure 39H:
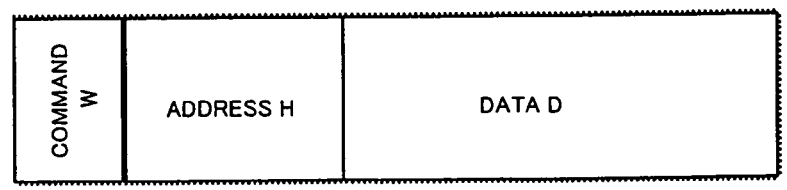

An example of SAI for local copying processing is shown in a diagram of FIG. 38. The command shown in FIG. 38 is the command of writing (WRITE) or copying data of a pre-defined capacity, beginning from the address A, in the address E. The data size may also be specified in the SAI.

In case the host 1 carries out local copying processing, without employing the SAI, the set of commands, shown in FIG. 39, is usually issued. In this case, the addresses A-D and the addresses E-H each stand for a continuous region.

The command receiving layer 51 is made up by a command receiving unit 511, a command converting unit 512 and a command transfer unit 513.

The command receiving unit 511 receives the SAI issued by the command issuing unit 12 or the normal storage access command, and delivers the SAI or command received to the command converting unit 512. Or, the command receiving unit delivers the SAI to be transferred or the normal storage access command to the command transfer unit 513. The processing may be delivered to the command transfer unit 513 after carrying out the processing delivered to the command converting unit 512 and after carrying out storage processing for the storage system 2.

The command converting unit 512 has the function of issuing the SAI received from the command receiving unit 511 or the normal storage access command to the command executing unit 22 of the storage system 2. The normal storage access command is delivered as it is to the command executing unit 22 and the results thereof are received from the command executing unit 22 and returned to the host 1. On the other hand, the SAI is converted into a command executable by the storage system 2 and delivered to the command executing unit 22. The result of the conversion is received and converted as the result of SAI which is then returned to the host 1.

The command transfer unit 513 sends the SAI to be transferred or the normal storage access command to be transferred over the network 5 to the command receiving layer 52. The SAI etc. may be buffered for some time and transferred in a lump, or may be transferred as it is received.

Similarly to the storage system 2 of the first embodiment, the storage system 2 of the present modification includes the command executing unit 22 and the storage unit 23, and is a normal storage unit. The command executing unit 22 and the storage unit 23 are similar to the corresponding components of the first embodiment and hence are not described here specifically.

The command receiving layer 52 includes a transfer receiving unit 521 and a command converting unit 522.

The transfer receiving unit 521 receives the SAI and the storage access command, sent from the command receiving layer 51, in order to deliver them to the command converting unit 522.

The command converting unit 522 plays the role of delivering the SAI or the storage access command, delivered from the transfer receiving unit 521, to the storage system 4, and performs the same functions as those of the command converting unit 512.

The storage system 4 includes the command executing unit 22 and the storage unit 23, and operates the same function as the storage system 2.

The operation of the replication system of the second embodiment of the present invention will now be described in detail.

Figure 40:
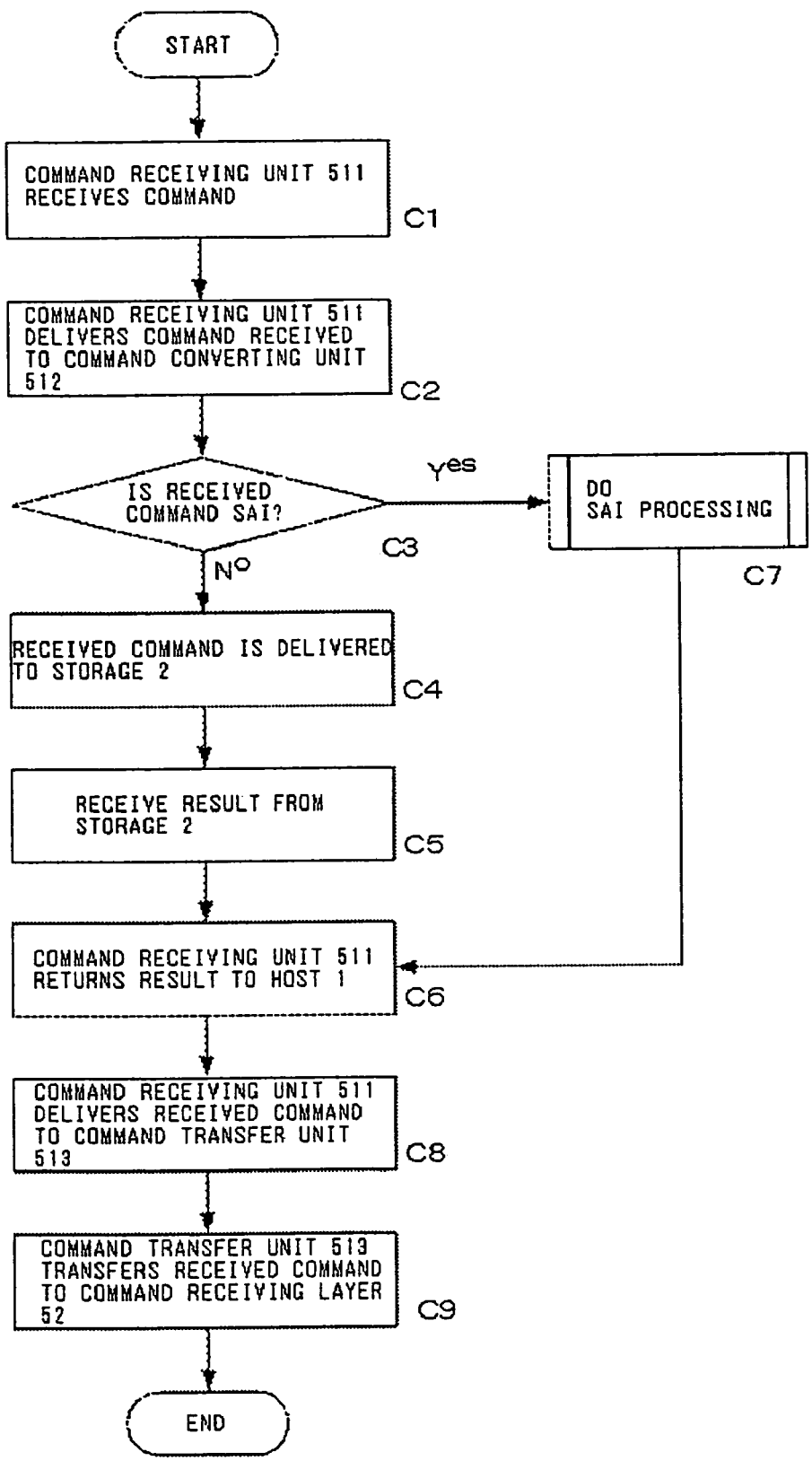
FIG. 40 is a flowchart for illustrating the operation of a command receiving layer 51 in the second embodiment of the present invention.

FIG. 40 is a flowchart for illustrating the operation of the command receiving layer 51.

Initially, the command issued by the command issuing unit 12 of the host 1 (normal storage access command or SAI) is received by the command receiving unit 511 (step C1).

The command receiving unit 511 then delivers the received command to the command converting unit 512 (step C2).

The command converting unit 512 decides whether or not the command received is SAI (step C3).

If the command received is not the SAI, the command converting unit 512 directly issues the received command to the storage system 2 (step C4). The storage system 2 executes the command as usual and returns the result to the command converting unit 512 as the issuing source. The command converting unit 512 receives the result (step C5). The result is directly returned to the host 1 (step C6).

If, in the step C3, the command received is SAI, the processing for SAI is carried out (step C7). The processing for the step C7 will be described subsequently. After completion of the processing of the SAI, the command converting unit 512 returns the result to the host 1 (step C6).

After the end of the step C6, the command receiving unit 511 delivers the received command to the command transfer unit 513 (step C8).

The command transfer unit 513 transfers the command received to the command receiving layer 52 (step C9).

Figure 41:
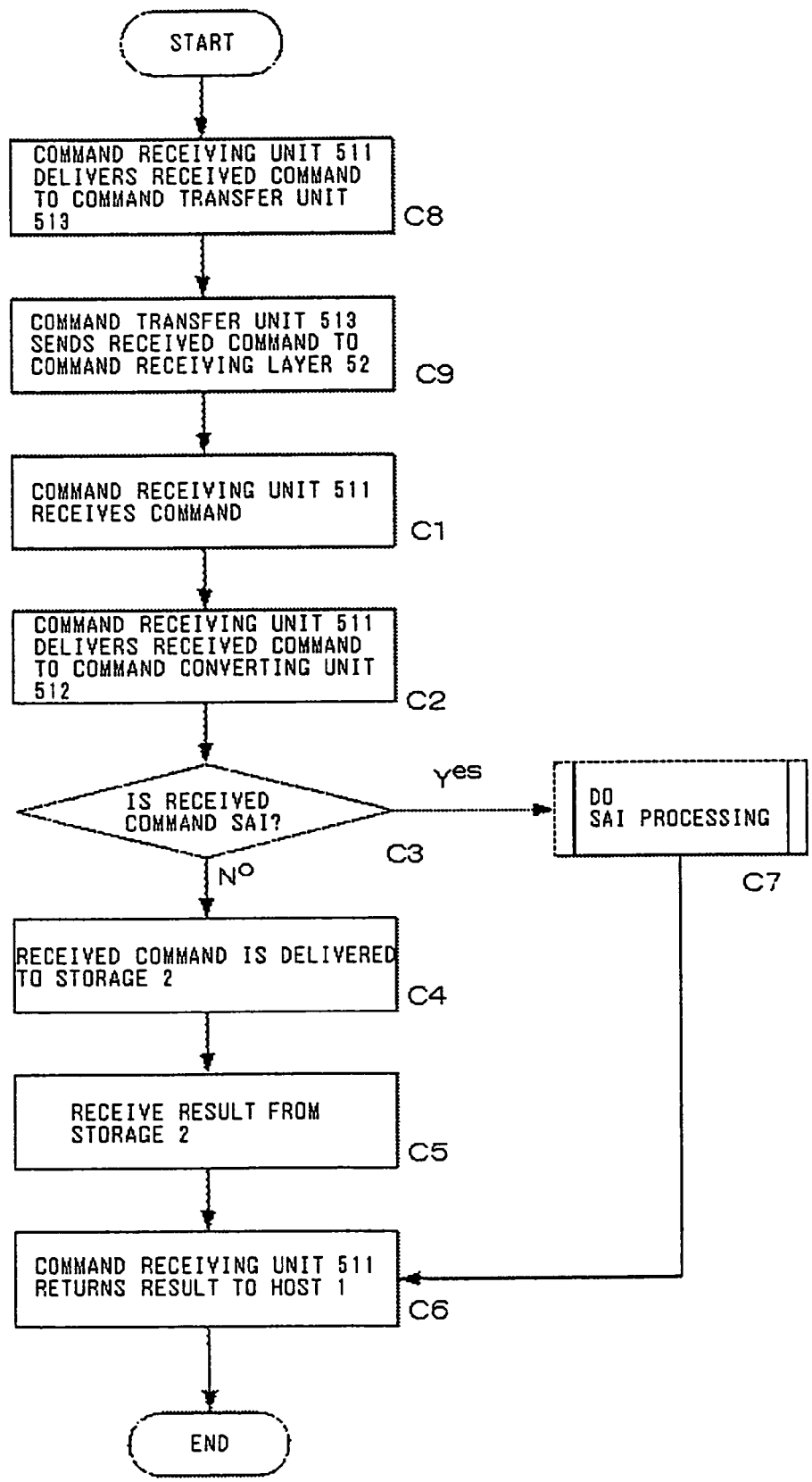
FIG. 41 is a flowchart for illustrating a modification of the flowchart of FIG. 40 in the second embodiment of the present invention.

The steps C8 and C9 may be carried out before proceeding to the processing as from the step C2, as shown in FIG. 41. The processing of the steps C8 and C9 and the processing of the steps C2 to C7 may be carried out independently of each other and hence may be executed in parallel.

The flowcharts of FIGS. 40 and 41 are premised on the asynchronous replication. However, the present embodiment may be executed in synchronous replication if the processing of the step C6 is carried out after confirming that the command transferred by the step C9 has been applied to the storage system of the destination of replication.

Figure 42:
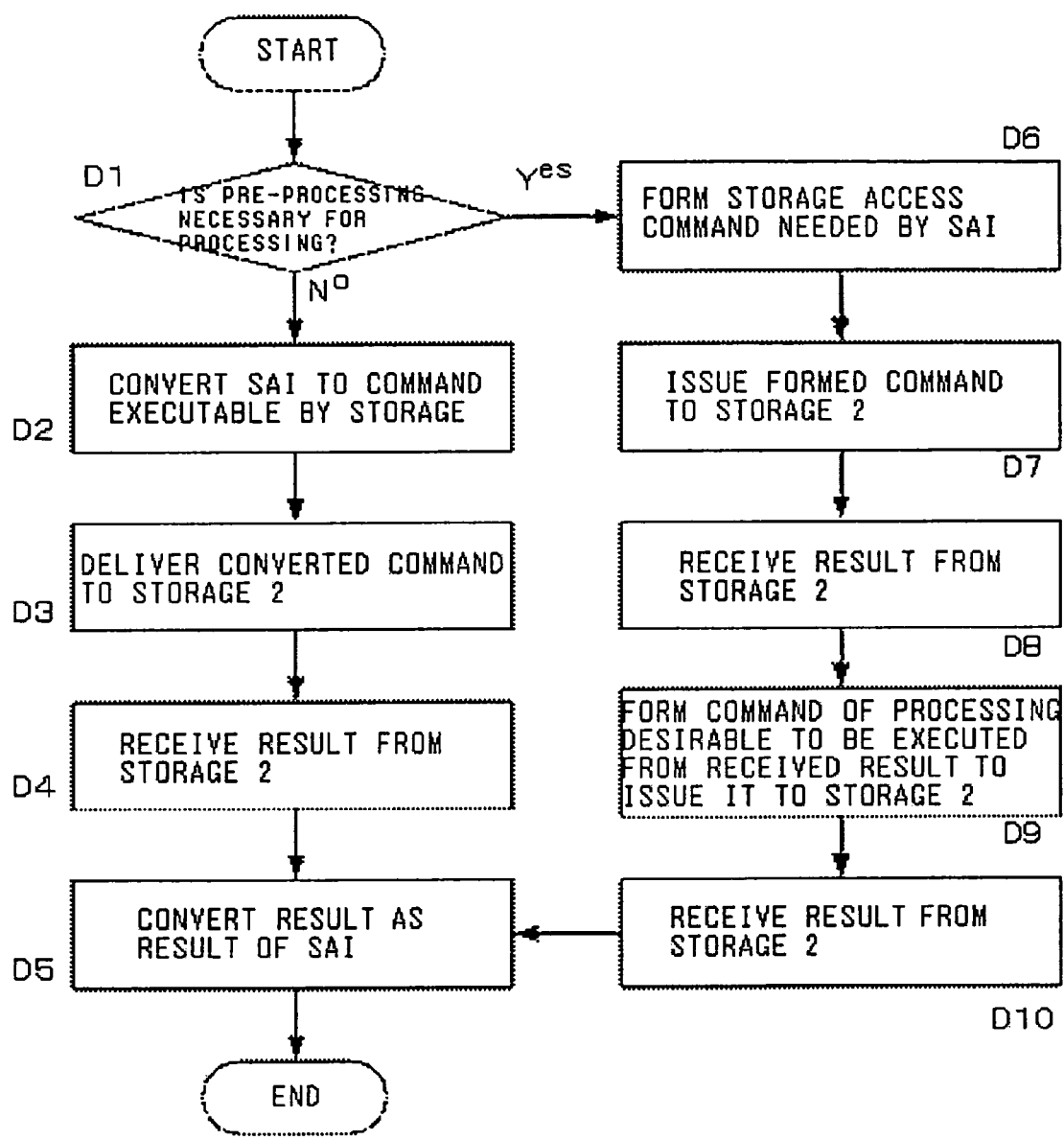
FIG. 42 shows the processing flow of SAI carried out by a command conversion unit 512 in the second embodiment of the present invention.

The SAI processing will now be described. FIG. 42 shows the processing of the step C7 of FIGS. 40 and 41, and specifically shows the processing flow of SAI carried out by the command receiving layer 512.

Initially, the command converting unit 512 performs the processing of deciding the sort of the SAI (step C1).

The SAI to be processed is roughly classed into two, one being an SAI for software mirroring processing shown in FIG. 37 (command W', address A, address B and data A). In this case, the SAI processing may be completed by simply converting the SAI into an ordinary storage access command. With the SAI, shown in FIG. 37, the software mirroring processing, as commanded by the SAI, may be carried out by converting the SAI into two WRITE commands shown in FIG. 43 (command W, address A and data A; command W, address B and data A).

The SAI that only has to be converted into the normal command is termed a 'SAI not in need of pre-processing'. With this SAI, the result of decision in the step D1 of FIG. 42 is NO.

Figure 44:
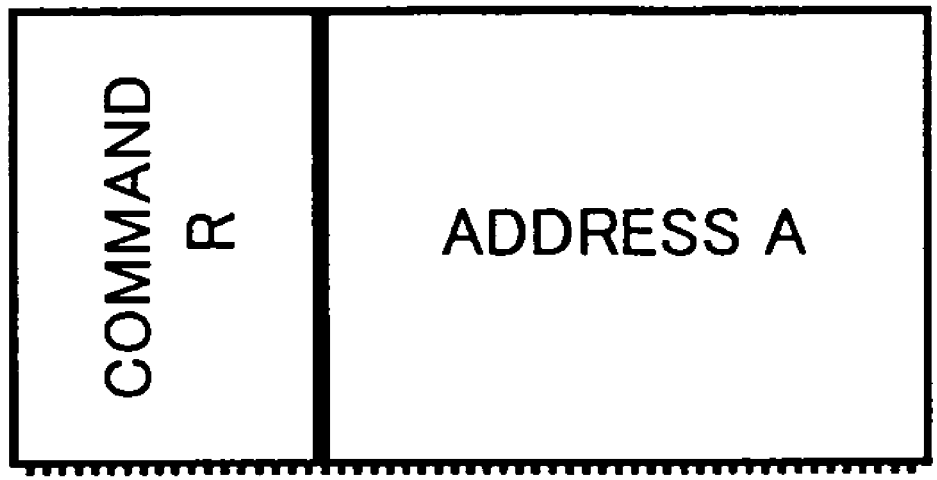
FIG. 44 is a diagram showing a command initially issued by the command conversion unit 512 when processing the SAI of FIG. 38 in the second embodiment of the present invention.

The other SAI is the SAI exemplified by local copying processing shown in FIG. 38 (command C, address A, address E). If, in this SAI, the SAI processing is to be completed, it is necessary to carry out the processing of receiving data of the source of copying, as data for WRITE, from the local storage system, herein the storage system 2, in the local copying processing, and to write the data. Thus, with the command shown in FIG. 38, the data entered in the address A has to be read in by a command (command R, address A) shown in FIG. 44. If necessary, the totality of data to be copied are read in similar manner. The result of the command of FIG. 44 is received from the storage system 2 to write (WRITE) the data. If, as a result of the command of FIG. 44, the data A has been received, a command for writing the data A in an address of local copying shown in FIG. 45 (command W, address E and data A) is issued.

Figure 43A:
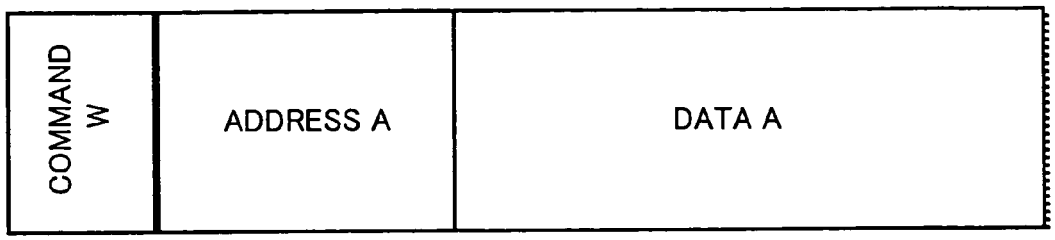
FIGS. 43A and 43B show a set of commands as converted from SAI of FIG. 37 by the command conversion unit 512 in the second embodiment of the present invention.
Figure 43B:
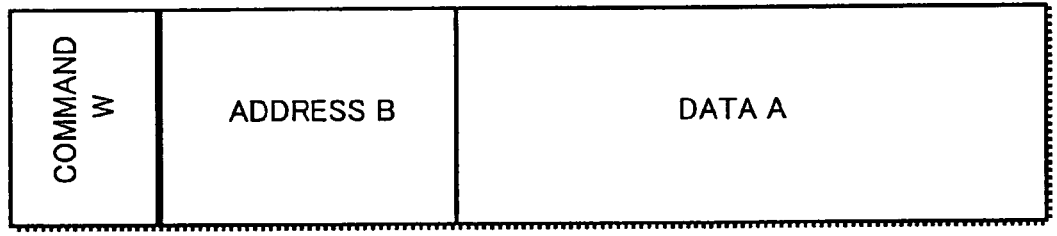

The SAI, in need of exchange with the storage system 2 for carrying out SAI processing, is termed the 'SAI in need of pre-processing'. With this SAI, the result of decision in the step D1 of FIG. 43 is YES.

The processing in which the result of decision of the step D1 in FIG. 42 is NO is described first of all. After decision in the step D1, the command converting unit 512 converts the SAI into a command executable by the storage system (step D2). This is the processing of converting the SAI of the software mirroring processing, shown for example in FIG. 37, into a normal storage access command shown in FIG. 43.

The storage access command, obtained by conversion, is then issued to the storage system 2 (step D3). The storage system 2 receives this command as usual and executes it for the storage unit 23 in order to return the result to the command converting unit 512 as the issuing source. The command converting unit 512 receives the result (step D4).

Since the received result is the result to the storage access command, obtained on the conversion, it is converted into the form of the results defined in SAI (step D5). For example, if the SAI is the SAI of the software mirroring processing, shown in FIG. 37, a success notification is returned if the two WRITE commands converted from the original command are both successful, whereas a failure notification is returned if the commands have resulted in failure.

It is sufficient that the command converting unit 512 returns the results, obtained on conversion in the step D5, to the host 1 in the step C6 of FIGS. 40 and 41.

The processing in which the result of the decision of the step D1 is YES will now be described. First, after the decision of the step D1, the command converting unit 522 creates a command of the processing initially required for carrying out the processing of SAI (step D6). This is the processing of initially reading in data of the source of copying from the storage system 2 in case the SAI is the SAI of the local copying processing shown for example in FIG. 38. That is, the command shown in FIG. 44 is created.

The command created in the step D6 then is issued to the storage system 2. The storage system 2 receives the command and executes it as usual to return the result to the command converting unit 512. The command converting unit 512 receives the returned result (step D8) and creates a command for execution by the SAI, from the received result to issue the commands (step D9). The command created by the step D9 for the instant case is a command shown in FIG. 45. By the command shown in FIG. 45, an actual WRITE command for the local copying processing is issued. The storage system 2 receives the command as usual and executes it to return the result to the command converting unit 522, which receives the result (step D10).

The result received by the command converting unit 522 stands for the result to the storage access command, obtained on the conversion, as in the case wherein the result of the step D1 is NO. Hence, the result is converted into the form of the result defined in SAI (step D5). For example, if the SAI is the SAI of the local copying processing, whether the processing has met success or failure may be returned as the result.

In FIG. 42, the processing is completed by carrying out the processing of the steps D6 to D10 only once. However, the processing of D6 to D10 may be repeated a number of times for carrying out one SAI.

The processing for the storage system 2 and the storage system 4 is now described. As for the storage systems 2 and 4, a command issued is received by the command executing unit 22, as the usual storage unit, the command is executed for the storage unit 23, and the result is returned. That is, the storage systems operate as normal storage systems.

Figure 46:
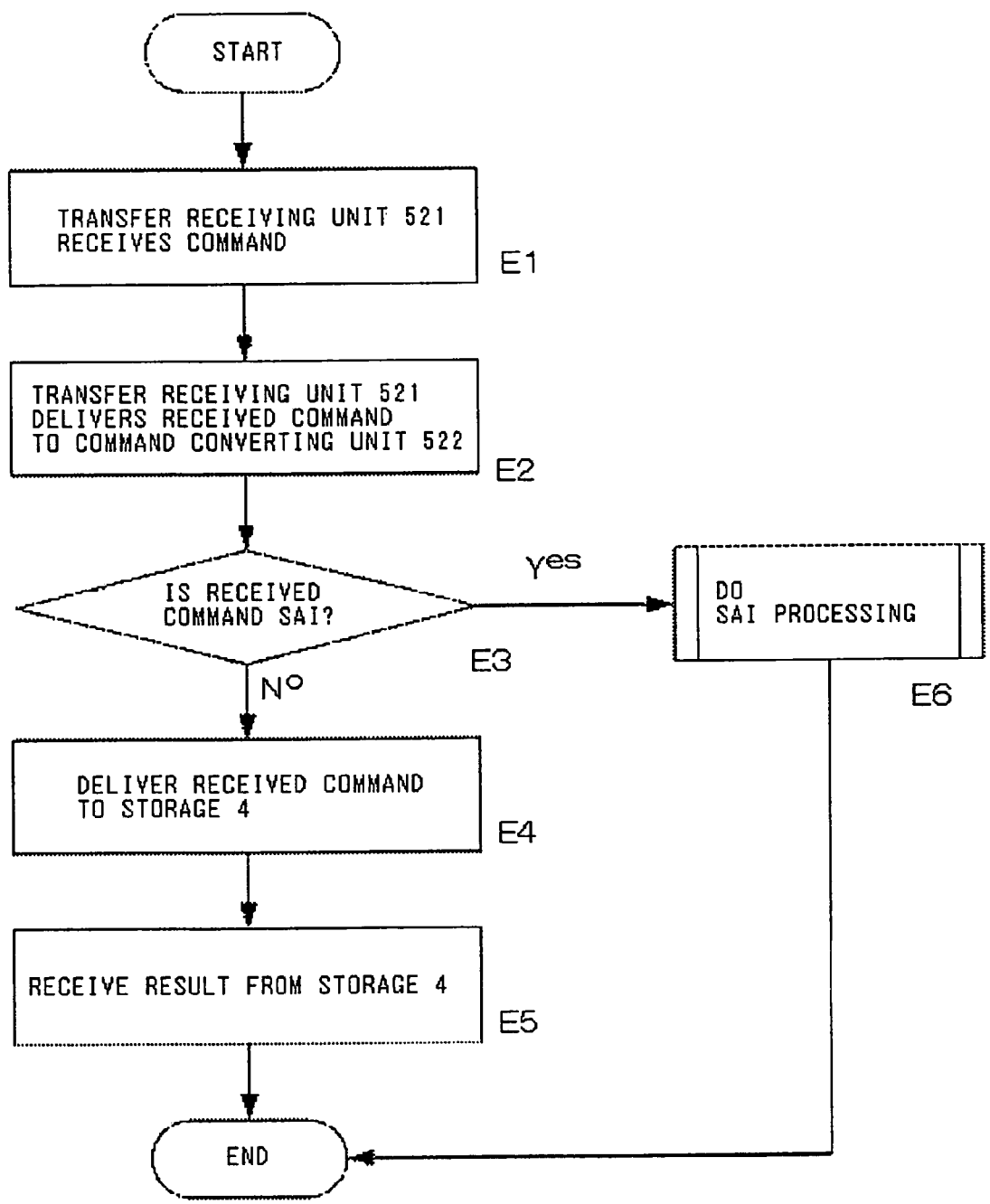
FIG. 46 is a flowchart for illustrating the operation of a command receiving layer 52 in the second embodiment of the present invention.

The operation of the command receiving layer 5 will now be described with reference to FIG. 46.

First, the transfer receiving unit 521 receives a command transmitted from the command transfer unit 513 (step E1).

The transfer receiving unit 521 then delivers the received command to the command converting unit 522 (step E2).

The command converting unit 522 then decides whether or not the command received is SAI (step E3).

If, as a result of the step E3, the command received is not SAI, the command received is directly issued for the storage system 4 (step E4).

Since the storage system 4 performs the processing of executing the received command as usual to return the result, the command converting unit 522 receives the result returned from the storage system 4 (step E5). If necessary, the result received in the step E5 is returned to the command receiving layer 51.

If the received command is the SAI, the SAI processing is carried out (step E6).

Figure 47:
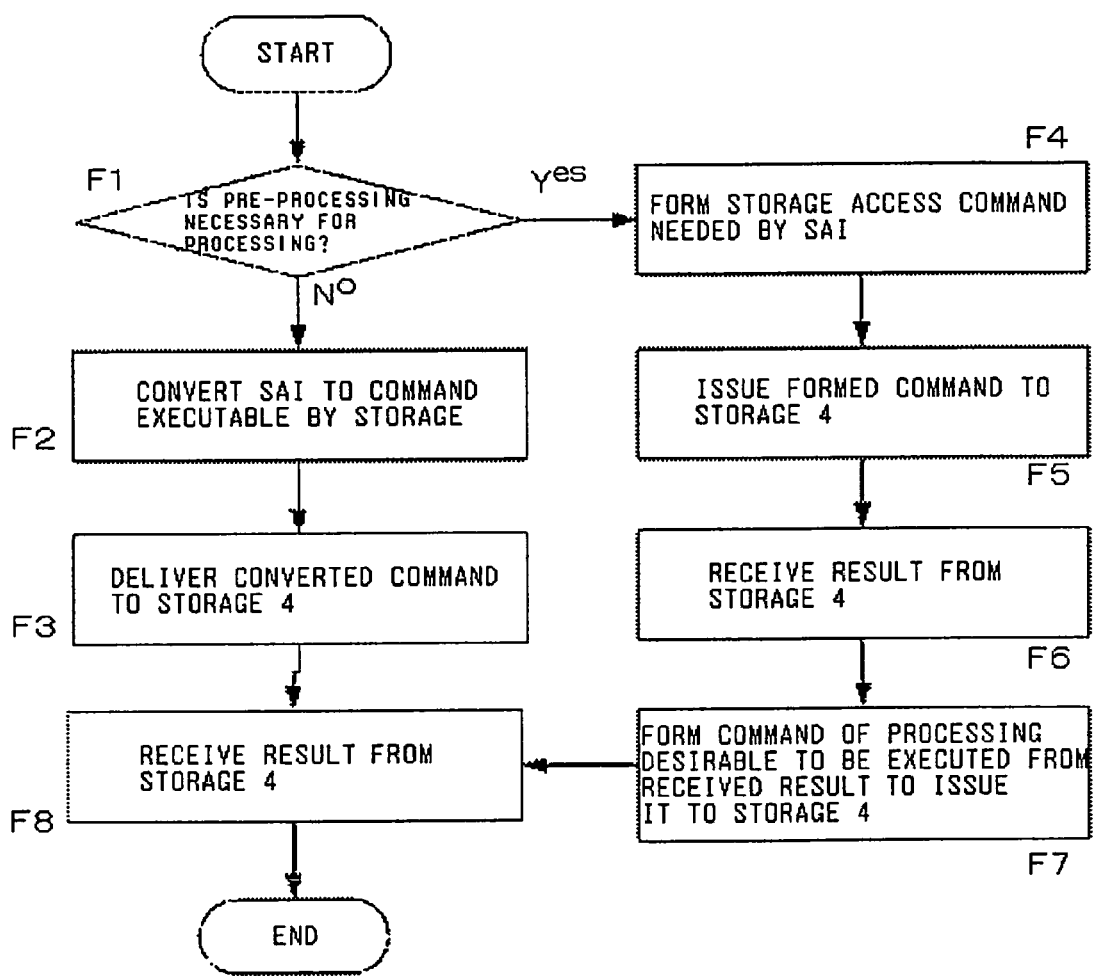
FIG. 47 is a flowchart for illustrating the operation of the processing of SAI of the command receiving layer 52 in the second embodiment of the present invention.

The SAI processing will be described with reference to FIG. 47.

Figure 45:
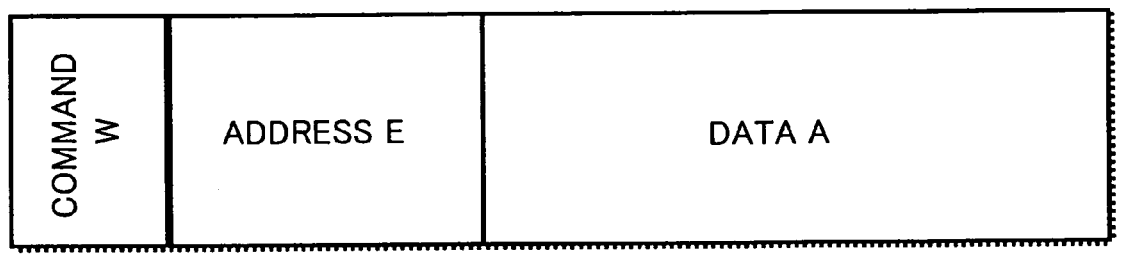
FIG. 45 is a diagram showing a command issued by the command conversion unit 512 after processing of FIG. 44 when processing the SAI of FIG. 38 in the second embodiment of the present invention.

The decision of the step F1 is similar to the step D1 of FIG. 45. Viz., it is checked whether or not accessing to the storage system 4 is required for carrying out the SAI processing (step F1).

If the result of the step F1 is NO, as when the SAI is the SAI of the software mirroring processing, the processing of converting the SAI into a command executable by the storage system is carried out (step F2). This processing is the same as the processing of the step D2 of FIG. 45.

The normal storage access command, obtained on the conversion, is issued to the storage system 4 (step F3). This processing is also similar to the step D3 of FIG. 45. The storage system 4 receives the storage access command as usual and executes it to return the result to the command converting unit 522. The result is received by the command converting unit 522 (step F8). If necessary, the result received is converted to the result of the SAI and returned to the command receiving layer 51.

When the result of the step F1 are YES, as when the SAI is the SAI of the local copying processing, the command for the storage access processing, as needed by SAI, is created (step F4). This processing is similar to the step D6 of FIG. 45.

The processing of the steps F5 to F7 is also similar to the steps D7 to D9 of FIG. 45.

The storage system 4 receives the storage access command as usual and executes it to return the result to the command converting unit 522. The result is received by the command converting unit 522 (step F8). If necessary, the result received is converted into the result of the SAI and returned to the command receiving layer 51.

The operation and the meritorious effects of the second embodiment of the present invention will now be described.

In the present second embodiment of the present invention, the host 1 uses the SAI for issuing a command, the amount of data transfer of which may be reduced, and hence it is unnecessary to transmit superfluous data. Consequently, the volume of data on the network may be decreased.

As compared to the first embodiment, it is only necessary to carry out conversion determined for the SAI, and hence it is unnecessary to consume excessive computational resources for the command receiving layer.

Moreover, as compared to the first embodiment, it is unnecessary to carry out command buffering in the source of replication, and hence the storage capacity as needed may be reduced.

Moreover, as compared to the first embodiment, it is unnecessary to carry out command buffering in the source of replication, and hence the present embodiment may readily be applied to the synchronous application.

Since it is only sufficient for the command executing unit 22 and the storage unit 23 of each of the storage system 2 and the storage system 4 to own the function of executing the commands normally issued from the host 1, the command executing unit and the storage unit may be similar to those of the pre-existing storage systems.

In the command converting unit 512 of the storage system 2 and in the command converting unit 522 of the storage system 4, the write position may be changed on the storage side by changing the storage locations to those that may be optimum for the storage systems 2 and 4. To this end, there is no necessity for modifying the application on the host 1.

With the second embodiment of the present invention, as compared to the aforementioned first embodiment, the amount of data transfer cannot be decreased only for the set of commands that may be recognized by the transfer command converter 25. However, with the second embodiment, the host 1 is able to recognize that the amount of data transfer can be reduced on the host side to issue the SAI, and hence the more desirable effect in diminishing the amount of data transfer may be achieved The present invention may be applied to e.g. an application system for saving data in a standby-based system, connected to the network, or to a computer program for implementation of the replication system. The present invention may also be applied for preparing for unforeseen disasters, for distributing the load for the normal site, for software version-up, for exploiting data mining, or for optimizing the data storage area of e.g. a database.

Although the present invention has been described with reference to preferred embodiments thereof, the present invention is not limited to these embodiments and may naturally comprise a variety of changes or corrections that may readily be arrived at by those skilled in the art within the scope of the invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An information processing system comprising:
    means for converting one or more commands for being directly transferred for replication from a source of replication to a destination of replication into one or more transfer-commands for transferring one or more data having a total amount of data transfer for replication less than another total amount of data transfer of said one or more commands being directly transferred for replication from said source of replication to said destination of replication; and
    means for transmitting said one or more transfer-commands from said source of replication to said destination of replication, wherein each of said one or more transfer-commands comprises one or more addresses and said one or more data, each address having a different data of said one or more data, wherein said source of replication includes a buffer for temporally storing commands accompanied by data transfer for replication and issued by a host; and wherein
    transfer processing is commenced when at least one of
    a preset command pattern is detected in plural commands stored in said buffer, and
    a combination of commands converted into said command for transfer has arrived,
    is met, and wherein
    on detection from a set of commands stored in said buffer of a combination of commands for writing a same data in a plurality of locations, a first command converting unit converts the combination of commands to a transfer-command of a form in which said same data need not be transmitted a plural number of times, said first command converting unit transmitting said transfer-command to said destination of replication; and wherein
    a second command converting unit converts said transfer-command to a command for execution and applying said command for execution to said destination of replication.

2. The information processing system according to claim 1, wherein
    said destination of replication receives one of said transfer-commands from said source of replication,
    converts said one transfer-command into a command of a form for said destination of replication, and
    executes said command of said form; and wherein,
    if said destination of replication is able to execute said one transfer-command, said destination of replication directly executes said one transfer-command without converting said one transfer-command.

3. An information processing system comprising:
    means for converting one or more commands for being directly transferred for replication from a source of replication to a destination of replication into one or more transfer-commands having a total amount of data transfer for replication less than another total amount of data transfer of said one or more commands being directly transferred for replication from said source of replication to said destination of replication; and
    means for transmitting said one or more transfer-commands from said source of replication to said destination of replication, wherein, when commands issued from a host or hosts to a storage of said source of replication are a plurality of write commands for writing a same data in a plurality of respective distinct areas, said source of replication converts said plurality of write commands into a sole transfer-command instructing writing the same data in a plurality of areas and transfers said sole transfer-command to said destination of replication, wherein said sole transfer-command comprises an address of the same data but not the same data, wherein said source of replication includes a buffer for temporally storing commands accompanied by data transfer for replication and issued by a host; and wherein transfer processing is commenced when at least one of a preset command pattern is detected in plural commands stored in said buffer, and a combination of commands converted into said command for transfer has arrived, is met, and wherein on detection from a set of commands stored in said buffer of a combination of commands for writing a same data in a plurality of locations, a first command converting unit converts the combination of commands to a transfer-command of a form in which said same data need not be transmitted a plural number of times, said first command converting unit transmitting said transfer-command to said destination of replication; and wherein a second command converting unit converts said transfer-command to a command for execution and applying said command for execution to said destination of replication.

4. An information processing system comprising:

means for converting one or more commands for being directly transferred for replication from a source of replication to a destination of replication into one or more transfer-commands having a total amount of data transfer for replication less than another total amount of data transfer of said one or more commands being directly transferred for replication from said source of replication to said destination of replication; and means for transmitting said one or more transfer-commands from said source of replication to said destination of replication, wherein, if commands issued from a host or hosts to a storage of said source of replication are a plurality of write commands for writing a same data in a plurality of respective distinct areas, said source of replication converts said write commands into a plurality of transfer-commands, one of said plurality of transfer-commands transmitting real data and at least one of said plurality of transfer-commands not transmitting real data, wherein an ID indicative of a first write command of said plurality of write commands is included in subsequent write commands, wherein a sole transfer-command not transmitting real data comprises an address of the real data, wherein said source of replication includes a buffer for temporally storing commands accompanied by data transfer for replication and issued by a host; and wherein transfer processing is commenced when at least one of a preset command pattern is detected in plural commands stored in said buffer, and a combination of commands converted into said command for transfer has arrived, is met, and wherein on detection from a set of commands stored in said buffer of a combination of commands for writing a same data in a plurality of locations, a first command converting unit converts the combination of commands to a transfer-command of a form in which said same data need not be transmitted a plural number of times, said first command converting unit transmitting said transfer-command to said destination of replication; and wherein a second command converting unit converting said transfer-command to a command for execution and applying said command for execution to said destination of replication.

5. An information processing system comprising:

a host;

a source of replication;

a destination of replication; and means for converting one or more commands for being directly transferred for replication from said source of replication to said destination of replication, into one or more transfer-commands for transferring one or more data having a total amount of data transfer for replication less than an amount of data transfer of said one or more commands being directly transferred for replication from said source of replication to said destination of replication; wherein said host issues said one or more transfer-commands to said source of replication;

said one or more transfer-commands are transmitted from said source of replication to said destination of replication; and wherein said source of replication and said destination of replication apply said one or more transfer-commands, either directly or following a restoration, to respective storage systems, wherein each of said one or more transfer-commands comprises one or more addresses and said one or more data, each address having a different data of said one or more data, and wherein on detection from a set of commands stored in a buffering unit of a combination of commands for writing a same data in a plurality of locations, a first command converting unit converts the combination of commands to a transfer-command of a form in which said same data need not be transmitted a plural number of times, said first command converting unit transmitting said transfer-command to said storage system of the destination of replication; and wherein a second command converting unit converts said transfer-command to a command for execution and applies said command for execution to said storage system of the destination of replication.

6. An information processing system comprising:

a host;

a storage system for a source of replication;

a storage system for a destination of replication;

said host pre-defining a command for which software mirroring processing is to be carried out; said host issuing said pre-defined command;

means for converting said pre-defined command into a form command of a form executable by said storage system of said source of replication, for issuing said form command to said storage system of said source of replication, and for directly transferring the issued form command to said destination of replication; and means for receiving said transferred form command, for converting said transferred form command into a command of a form executable by said storage system of said destination of replication, and for issuing the executable command to said storage system of said destination of replication, wherein said form commands comprises one or more addresses and one or more data, each address having a different data of said one or more data, and wherein on detection from a set of commands stored in a buffering unit of a combination of commands for writing a same data in a plurality of locations, a first command converting unit converts the combination of commands to a transfer-command of a form in which said same data need not be transmitted a plural number of times, said first command converting unit transmitting said transfer-command to said storage system of the destination of replication; and wherein a second command converting unit converts said transfer-command to a command for execution and applies said command for execution to said storage system of the destination of replication.

7. An information processing system comprising:
a host;
a storage system of a source of replication; and
a storage system of a destination of replication connected for communication to said storage system of the source of replication, said storage system of the source of replication including a buffering unit for temporally storing commands accompanied by data transfer for replication issued from said host to said storage system of the source of replication, and a first command converting unit for converting the command stored in said buffering unit into a preset transfer-command suited to transfer;

said storage system of the source of replication transferring said transfer-command to said storage system of the destination of replication, said storage system of the destination of replication including a second command converting unit for receiving said transfer-command transmitted from said storage system of the source of replication, and for converting said transfer-command for transfer to a command executable by said storage system of the destination of replication; and monitoring means for monitoring the host and the storage system of said source of replication, said monitoring means monitoring an operation of said host or the command received by said storage system of the source of replication to recognize a re-startable time point stored in the buffering unit to issue a notification of the re-startable time point, wherein the re-startable time point is a time point for re-starting in case at least one of an application on the host, and the host have been halted, and wherein on detection from a set of commands stored in said buffering unit of a combination of commands for writing a same data in a plurality of locations, said first command converting unit converts the combination of commands to a transfer-command of a form in which said same data need not be transmitted a plural number of times, said first command converting unit transmitting said transfer-command to said storage system of the destination of replication; and wherein said second command converting unit converts said transfer-command to a command for execution and applies said command for execution to said storage system of the destination of replication.

8. An information processing system comprising:
a host;
a storage system for a source of replication;
a storage system for a destination of replication;
a first command receiving and converting layer provided in association with the storage system of the source of replication; and a second command receiving and converting layer provided in association with the storage system of the destination of replication;

said first command receiving and converting layer including:

a buffering unit for temporally storing commands issued from said host to said storage of the source of replication; and a first command converting unit for converting the command stored in said buffering unit to a transfer-command suited for transfer;

said second command receiving and converting layer including:

a second command converting unit for converting the transfer-command sent from said first command receiving and converting layer to a command executable by said storage system of the destination of replication; and monitoring means for monitoring the host and the storage system of said source of replication, said monitor means monitoring an operation of said host or the command received by said storage system of the source of replication to recognize a re-startable time point stored in the buffering unit to issue a notification of the re-startable time point, wherein the re-startable time point is a time point for re-starting in case at least one of an application on the host, and the host have been halted, and wherein on detection from a set of commands stored in said buffering unit of a combination of commands for writing a same data in a plurality of locations, said first command converting unit converts the combination of commands to a transfer-command of a form in which said same data need not be transmitted a plural number of times, said first command converting unit transmitting said transfer-command to said storage system of the destination of replication; and wherein said second command converting unit converts said transfer-command to a command for execution and applies said command for execution to said storage system of the destination of replication.

9. The information processing system according to claim 7, wherein said first command converting unit converts a write command having redundancy information, said write command in said buffering unit, to the transfer-command in which data restorable in said storage system of the destination of replication are deleted, said first command converting unit transferring the transfer-command to said storage system of the destination of replication;

said second command converting unit directly executing said transfer-command or converting said transfer-command to an other write command; said second command converting unit applying said other write command to said storage system of the destination of replication.

10. The information processing system according to claim 7, wherein said host includes a command issuing unit for issuing a command to said storage system of the source of replication;

said first command converting unit monitors a system log information and detects whether or not processing of reducing the amount of data transfer is carried out in replication; said first command converting unit effecting conversion to the transfer-command based on the detected information.

11. The information processing system according to claim 7, wherein
transfer processing is carried out when said first command converting unit exploits the notification of the re-startable time point issued on monitoring the command to said storage system issued by said host, and issued by said host.

12. The information processing system according to claim 11, wherein
said second command converting unit confirms receipt of all commands up to the notification of the re-startable time point; said second command converting unit re-arraying commands exhibiting the relationship of inter-dependence in the order in which they were issued and subsequently applies re-ordered commands to said storage system of the destination of replication.

13. An information processing system comprising:
a storage system of a source of replication;
a storage system of a destination of replication;
a host exploiting said storage system of the source of replication;
a first command receiving layer provided in association with said storage system of the source of replication; and
a second command receiving layer provided in association with said storage system of the destination of replication; wherein
said first command receiving layer includes a first command converting unit for converting a command received to a converted command executable by said storage system of the source of replication;
said second command receiving layer includes a second command converting unit for converting a transfer-command to a converted transfer-command executable by said storage system of the destination of replication;
said host issues a predefined command for decreasing an amount of data transfer to be smaller than with a usual command;
said first command converting unit converts said predefined command for decreasing the amount of data transfer into a command of a form executable by said storage system of the source of replication, and delivers the command resulting from the conversion to said storage system of the source of replication;
said predefined command for decreasing the amount of data transfer is transferred to said storage system of the destination of replication; and wherein
said second command converting unit converts said command for decreasing the amount of data transfer into a command of a form executable by said storage system of the destination of replication, and delivers the command resulting from the conversion to said storage system of the destination of replication, wherein each of said one or more converted transfer-commands comprises one or more addresses and one or more data, each address having a different data of said one or more data, and wherein on detection from a set of commands stored in a buffering unit of a combination of commands for writing a same data in a plurality of locations, said first command converting unit converts the combination of commands to a transfer-command of a form in which said same data need not be transmitted a plural number of times, said first command converting unit transmitting said transfer-command to said storage system of the destination of replication; and wherein
said second command converting unit converts said transfer-command to a command for execution and applies said command for execution to said storage system of the destination of replication.

14. A computer readable medium having computer readable program for operating on a computer for executing a system for replication from a source of replication to a destination of replication, said program comprising instructions that cause the computer to perform the steps of:
converting one or more commands for being directly transferred for replication from said source of replication to said destination of replication, into one or more transfer-commands for transferring one or more data having a total amount of data transfer for replication less than another total amount of data transfer of said one or more commands being directly transferred for replication from said source of replication to said destination of replication; and
transmitting said one or more transfer-commands from said source of replication to said destination of replication, wherein each of said one or more transfer-commands comprises one or more addresses and said one or more data, each address having a different data of said one or more data, wherein said source of replication includes a buffer for temporally storing commands accompanied by data transfer for replication and issued by a host; and wherein
transfer processing is commenced when at least one of
a preset command pattern is detected in plural commands stored in said buffer, and
a combination of commands converted into said command for transfer has arrived,
is met, and wherein
on detection from a set of commands stored in said buffer of a combination of commands for writing a same data in a plurality of locations, converting the combination of commands to a transfer-command of a form in which said same data need not be transmitted a plural number of times, transmitting said transfer-command to said destination of replication; and
converting said transfer-command to a command for execution and applying said command for execution to said destination of replication.

* * * * *